US010143058B2

(12) United States Patent
DeMayo et al.

(10) Patent No.: US 10,143,058 B2
(45) Date of Patent: Nov. 27, 2018

(54) ARTIFICIAL LIGHT COMPENSATION SYSTEM AND PROCESS

(71) Applicant: LITEGEAR, INC., Burbank, CA (US)

(72) Inventors: Albert DeMayo, Santa Clarita, CA (US); Alex Vazquez, Monrovia, CA (US); Lee Parker, Turlock, CA (US); Sean Goossen, Sherman Oaks, CA (US); James David Smith, Raleigh, NC (US)

(73) Assignee: LITEGEAR INC., Burbank, CA (US)

( * ) Notice: Subject to any disclaimer, the term of this patent is extended or adjusted under 35 U.S.C. 154(b) by 0 days.

(21) Appl. No.: 15/614,596

(22) Filed: Jun. 5, 2017

(65) Prior Publication Data

US 2017/0354013 A1    Dec. 7, 2017

Related U.S. Application Data

(60) Provisional application No. 62/344,996, filed on Jun. 3, 2016.

(51) Int. Cl.
  *H05B 37/02* (2006.01)
  *H05B 33/08* (2006.01)
(52) U.S. Cl.
  CPC ....... *H05B 33/0863* (2013.01); *H05B 33/086* (2013.01); *H05B 33/0845* (2013.01)
(58) Field of Classification Search
  CPC .......................... H05B 33/086; H05B 33/0857
  USPC .............................................. 315/185 R, 291
  See application file for complete search history.

(56) References Cited

U.S. PATENT DOCUMENTS

| | | | |
|---|---|---|---|
| 4,298,869 | A | 11/1981 | Okuno |
| 6,016,038 | A | 1/2000 | Mueller |
| 6,211,626 | B1 | 4/2001 | Lys |
| 6,788,011 | B2 | 9/2004 | Mueller |
| 7,744,242 | B2 | 6/2010 | Kramer |
| 8,513,900 | B2 | 8/2013 | Yau |
| 8,569,969 | B2 | 10/2013 | Moss |
| 8,587,205 | B2 | 11/2013 | Ter Weeme |

(Continued)

FOREIGN PATENT DOCUMENTS

| | | |
|---|---|---|
| WO | WO2106/026153 A1 | 2/2016 |
| WO | WO2016022612 A1 | 2/2016 |

OTHER PUBLICATIONS

REC 709. https://en.wikipedia.org/wiki/Rec. 709, download Feb. 15, 2018.

(Continued)

*Primary Examiner* — Thuy Vinh Tran
(74) *Attorney, Agent, or Firm* — Lewis Brisbois Bisgaard & Smith LLP; Jon Hokanson

(57) ABSTRACT

Systems and methods for compensating, controlling, mixing and saturating/desaturating colors produced by or emitted from LED artificial light sources through use of multiple channel, LED controllers to control the proportion of constituent colors each to the other, to control the intensity level of the total light output of the mixed, desaturated light during and after color mixing and/or saturation/desaturation by simultaneously increasing and decreasing power to the constituent color LEDs at the same rate, and once a desired color has been produced, changing the intensity/brightness and/or degree of saturation of the produced color without changing the hue of the produced color.

12 Claims, 36 Drawing Sheets

(56) References Cited

U.S. PATENT DOCUMENTS

| | | | |
|---|---|---|---|
| 8,710,754 B2 | 4/2014 | Baddela | |
| 8,724,051 B2* | 5/2014 | Adachi | G09G 3/3413 |
| | | | 349/61 |
| 9,521,721 B2* | 12/2016 | Beczkowski | H05B 33/0866 |
| 9,560,714 B1 | 1/2017 | Hjerde | |
| 2014/0062313 A1* | 3/2014 | Ootsubo | H05B 33/0869 |
| | | | 315/158 |
| 2014/0197750 A1* | 7/2014 | Cash | H05B 33/083 |
| | | | 315/192 |
| 2015/0029713 A1 | 1/2015 | Fieberg | |

OTHER PUBLICATIONS

REC 2020. https://en.wikipedia.org/wiki/Rec/. 2020, download Feb. 15, 2018.
REC 709 v RGB,https://www.image-engineering.de/library/technotes/714-color-spaces-rec-709-vs-srgb, download Feb. 15, 2018.
REC 709, http:www.itu.int/rec/R-REC-BT.709/en, currrent release Jun. 17, 2015.
REC 2020, https://www.itu.int/rec/R-REC-BT.2020/en, current release Oct. 14, 2015.

\* cited by examiner

PRIOR ART

SETTING USER INTERFACE DATA VALUES
*RAW HUE (LITENET)*
Hue_val = Hue_target * (P1_max + 1)
if (Hue_val = 0 to 4369)
    R_max = 4369
    RED_val = P2_max
    AMBER_val = (Hue_val / R_max) * P2_max
    GREEN_val = 0
    BLUE_val = 0

AMBER_val = AMBER_val * P2_max / (RED_val +
        AMBER_val)
    RED_val = P2_max – AMBER_val
if (Hue_val = 4369 to 8738)
    R_max = 8738
    RED_val = (Hue_val / R_max) * P2_max
    AMBER_val = P2_max
    GREEN_val = 0
    BLUE_val = 0

AMBER_val = AMBER_val * P2_max / (RED_val +
        AMBER_val)
    RED_val = P2_max – AMBER_val
if (Hue_val = 8739 to 15292)
    R_max = 15292
    RED_val = 0
    AMBER_val = P2_max
    GREEN_val = (Hue_val / R_max) * P2_max
    BLUE_val = 0

GREEN_val = GREEN_val * P2_max / (AMBER_val +
        GREEN_val)
    AMBER_val = P2_max – GREEN_val
if (Hue_val = 15293 to 21844)
    R_max = 21844
    RED_val = 0
    AMBER_val = (Hue_val / R_max) * P2_max
    GREEN_val = P2_max
    BLUE_val = 0

GREEN_val = GREEN_val * P2_max / (AMBER_val +
        GREEN_val)

FIG. 18B

SETTING USER INTERFACE DATA VALUES *(cont.)*
RAW HUE (LITENET) (cont.)
    AMBER_val = P2_max − GREEN_val
if (Hue_val = 21845 to 32766)
    R_max = 32766
    RED_val = 0
    AMBER_val = 0
    GREEN_val = P2_max
    BLUE_val = (Hue_val / R_max) * P2_max BLUE_val = BLUE_val * P2_max / (GREEN_val +
        BLUE_val)
    GREEN_val = P2_max − BLUE_val
if (Hue_val = 32767 to 43688)
    R_max = 43688
    RED_val = 0
    AMBER_val = 0
    GREEN_val = (Hue_val / R_max) * P2_max
    BLUE_val = P2_max BLUE_val = BLUE_val * P2_max / (GREEN_val +
        BLUE_val)
    GREEN_val = P2_max − BLUE_val
if (Hue_val = 43689 to 54610)
    R_max = 54610
    RED_val = (Hue_val / R_max) * P2_max
    AMBER_val = 0
    GREEN_val = 0
    BLUE_val = P2_max RED_val = RED_val * P2_max / (BLUE_val +
        RED_val)
    BLUE_val = P2_max − RED_val
if (Hue_val = 54611 to 65535)
    R_max = 65535
    RED_val = P2_max
    AMBER_val = 0
    GREEN_val = 0
    BLUE_val = (Hue_val / R_max) * P2_max

FIG. 18C

ARTIFICIAL LIGHT COMPENSATION SYSTEM AND PROCESS

CROSS REFERENCE TO RELATED APPLICATION

This application claims the benefit of and incorporates by reference U.S. provisional patent application 62/344,996, filed Jun. 3, 2016.

FIELD OF INVENTION

The invention relates generally to systems and processes for compensation of light produced by artificial light sources and light sensed by digital camera light sensors, or light sensed by conventional film cameras using conventional film stock so that the resulting object image light mimics natural light when viewed by humans on media such as television, motion pictures and computer monitors. Thus, the present systems and processes compensate for artificial light sources and for digital camera sensors, as well as for conventional cameras/film stock so that the object image shown on the display appears to the human viewer to have the same hue, intensity, and saturation value as does the actual object when illuminated by natural light.

BACKGROUND

From the early days of the film industry, lighting has been an integral part of the movie making experience. Due to lack of sensitivity to light inherent in the types of film stock then used, artificial lighting was required in order to produce images on the screen that looked normal to the average human eye. The amount of light required for those early productions as excessive by today's standards, but was necessary in order to produce a realistic scene. Even today, the most technologically advanced, fully digital cameras, which are more sensitive to light than prior cameras, require some amount of light. Controlling this light is essential in order to produce images that reproduce well on theater screens, on televisions and on computer monitors. Each of the new, sophisticated movie digital cameras and still digital cameras respond to light and color in its own particular way. This is due to differences in which each camera manufacturer develops and adapts the photo sensors used in its cameras. Detailed information on the different types of and methods of configuring sensor arrays, and technical specifications for sensor arrays and technical specifications for commercially available cameras are publicly available.

As used herein, the term "luminaire" or "fixture" or "light source" refers to a complete light source, a light emitting device or a light fixture including control circuitry, if used. As is well known to those skilled in this field, the light output from commercially available luminaires varies in intensity and color, depending on the technology used, such as incandescent, fluorescent, high intensity discharge, etc. Even within the same technology variations from one luminaire to another are common. For example, variations in color and intensity of light are very noticeable even when comparing a new bulb to a same technology bulb made by the same manufacturer and that is at or near its end of life. As is well known to those skilled in this field, several fixtures from differing technologies are often used to illuminate a movie set and the talent, people and objects on the set. In recording any scene on the set, one typical goal is to have the light look as if it is emitted from an identical or similar source. In order to achieve this "similar source look" lighting technicians typically rely on conventional mechanical devices that assist in diminishing the luminance from a particular light source, or they modify the color emitted and as required for a particular shot. These devices include filters of various densities, gels of varying colors and densities, diffusion panels, scrims, intensifiers, and louvers. Also, many conventional lighting fixtures provide integrated focusing mechanisms that are used in combination with special lenses that allow "flood" and "spot" control of the light emitted from the fixture. "Flood" control produces a soft light that in turn produces soft shadows. "Spot" control focuses the emitted light into a narrow, tight, intense beam to highlight a particular section of the set.

Various other conventional methods of electronically dimming, that is lowering or raising the intensity of the light and rudimentary forms of color mixing are available to lighting technicians for trying to achieve the desired light intensity and color. However, conventional dimming is limited in use and is problematic in that it can produce undesired effects such as flicker and audible noise. Conventional color mixing, that is, rapid changes from one color to another color, is achieved by use of color wheels, gel color scrollers or eye strips that are remotely controlled, usually via DMX or RDM protocol, as is well known to those skilled in this field. Also, in order to desaturate a color, a second, unfiltered unit, usually a white source, is placed next to the unit producing the color and is lowered or raised in intensity in order to produce the intended hue and/or degree of desaturation. This conventional solution in turn typically creates an intensity problem, and requires additional, typically by trial and error, efforts to achieve an acceptable intensity of the combined or mixed color. In the final stage of addressing these conventional problems is the problem of increasing or decreasing the intensity (ies) of the constituent colors in order to achieve the desired color at the desired intensity.

Color Mixing Problems Associated with Conventional LED-Based Lighting and Conventional, Adjustable Luminaire Settings With the introduction of LED technology into this lighting field, more sophisticated controls for color and intensity have been developed. When used in combination with conventional means of light control mentioned previously, these sophisticated controls provide a more flexible and repeatable way of controlling the color and intensity of the light emitted from the source. New LED chips are continuously being developed, and these LED light sources typically provide higher lumen output while providing many, well-saturated color combinations and the ability to desaturate these colors as needed. However, known conventional methods for LED light control also have problems. These problems are essentially the same problems as found with conventional methods of color control described herein. When mixing, saturating or desaturating a specific color, the intensity of the light is typically either raised or lowered, and this light intensity change can potentially change the way the color is processed by the camera sensors, with variations on a camera-by-camera basis. As used herein the terms "light intensity" or "intensity" refers to the brightness of light emanating from a light source, and is measured in terms of "lumens", with the term "lumen" defined to mean "a unit of luminous flux in the International System of Units, that is equal to the amount of light given out through a solid angle by a source of one candela intensity radiating in all directions." As used herein the term "luminance" refers to and means candela per square meter ($cd/m^2$). Luminance is a photometric measure of the luminous intensity per unit area of light traveling in a given direction, that is, the amount of light that passes through, is emitted or reflected from a particular area, and falls within a given solid angle. As is used herein the term "power" refers to the power that is input to a light source, measured in "watts" ("W") and with the term "watt" defined to mean the amount of work done by a circuit in which one ampere of current is driven by one volt. As used herein the term "efficacy" means lumens per watt. Thus, as used herein the term intensity refers to the brightness of a light source, the term luminance refers to the intensity of light per unit area in a given direction, the term power refers to the electrical energy supplied to, or used by the light source to produce light and the term efficacy refers to the efficiency or capability of the light source to convert electrical energy into light. Also, as used herein the term "color" refers to and includes the concepts of "hue" or what is generally referred to as the color of something, the intensity, as referred to above, and the degree of "saturation" of a color, which means the degree or amount of white light that is mixed with some other color. For the purposes of the present systems and processes, a mixed white light, that is, a mixture of a relatively warm white and a relatively cool white light is preferably used. More specifically, as used herein white LED light is light that is produced by an LED that has one of several phosphor coatings, depending on the degree of warmness or coolness of the white desired.

Because of the wide variations in light sensors and in processing electronic signals corresponding to the light sensed from digital camera to digital camera, controlling the light sensed and then output from digital cameras presents additional problems in this field. More specifically, mixing colors including red, green, blue (RGB), amber (A), cool white and warm white represents specific problems for electronic shutter image capture devices, e.g., digital cameras. Different cameras from different manufacturers capture and process color differently from each other. These differences in color capturing and processing are considered to be significant differentiators between manufacturers and devices, and cause additional problems when cameras from different manufacturers are used on the same set.

To process color in a conventional digital camera, light is exposed to light-sensitive "pickups", or sensors in the camera. The camera typically includes filters that separate full spectrum light into discrete red, green, and blue channels. Different designs for different cameras have different ratios of each red-, green-, and blue-filtered pickups in an attempt to create what each design considers the best or most desirable final image that is to be viewed by humans. Just as humans have "sensors" to perceive color and intensity in a particular way, so too do the various models of camera, varying from manufacturer to manufacturer. As a result there is variety in the color representations in the final image output from the cameras for the same input. In other words, for the same scene having the same lighting, different color will be output from different digital cameras. Because of these different color output differences that result from different design choices, no camera from one manufacturer will render a color representation image equal to the color representation image of any camera from another manufacturer, for the same object under the same lighting conditions. In other words the final image output will be different when different digital cameras are used to record the same scene under the same lighting conditions, regardless of the source(s) of the light.

In this field conventional RGB color mixing is typically performed by adjusting the intensity of each color using one of several electronic control methods commonly available. One such example is an LED-based RGB arrangement of LEDs, i.e., a light source using a conventional, 8-bit control, referred to as DMX, offering 256 discrete levels of intensity per color (including the absence of output or absence of power, which is the first level or "0" setting). One exemplary conventional system uses colors produced by one or more circuits supplying equal power to the LED(s), with each color in an individual circuit channel and each color controlled by an individual channel controller. In this example, when all three channels are operating at full power, the resulting blended color is a relatively low resolution variation of white based on the constituent wavelengths of light emitted from each of the colored LEDs, the power supplied to each LED and the relative efficacy of each LED. Even slight variations in wavelength of emitted light, power supplied to and/or efficacy of each LED can result in significantly different results in terms of intensity and/or color of light emitted from the light source(s). Because different cameras have different sensitivities to, and outputs for red, green and blue, respectively, each camera has the capability to capture and output any of 16,581,375 available, slightly different colors when using conventional 8-bit DMX protocol.

Another source of problems with color control for cameras, both digital and non-digital, relates to reproducing the color white. As is well known in this field, many different "white" lights are known, that is, many shades or variations of white are known, such as warm white and cool white. In this field the various white colors are associated with a specific Kelvin (K) temperature and typically referred to as correlated color temperature (CCT). As is also well known in this field, when producing an image from light reflected from an object, a photographer or cinematographer typically must choose a single CCT white to be used as a neutrally exposed, non-colored region of the desired image. As an example, choosing a 3200K film stock or selecting the same setting on an electronic shutter-based camera results in a perfect white, non-colored image when photographing a non-colored white object being illuminated with a 3200K light source. However, in the real world of photography and cinematography, particularly in this field, many different sources of "white" light are available and used. Many such sources of white light—both natural and artificial sources— would not appear "white" on a camera balanced for only a particular CCT, such as 3200K.

With respect to the color white problem or issue, at present, several different Kelvin temperature film stocks currently are commercially available and a wide range of white balance settings are available on conventional, electronic shutter-based cameras. Use of different film stocks and/or different camera settings are necessary if, for instance, the warm glow "white" from a sunset or a campfire is to appear colorless and white on camera while the same camera must also be able to render the cool "white" from an office fluorescent light to be colorless and white. A growing trend in image capture-intended luminaires is the integration of multicolor sources (such as RGB LEDs) within each luminaire and light from these sources is blended to produce a desired, white CCT. The blending typically is accomplished through use of conventional electronic control devices such as pulse width modulation (PWM) controllers or similar devices. The blended output of these multicolor luminaires can be adjusted for Kelvin temperature, hue, saturation and other parameters. In the present state of the color blending art these adjustments are made manually and relative only to the capabilities of the luminaire(s)—not to the camera—because, as is well known in this field, adjusting these parameters for a particular camera's color sensitivity is not intuitive.

Also, as is well known, in many specific lighting control situations, calibration of the camera(s) is needed or used. In a general, conventional lighting control stance, one level of hue, brightness and white balance control is provided by controlling the light output of the luminaires. Within this context, in some situations, the luminaire controls are set or fixed, but yet there is a need to further control or adjust one or more of hue, brightness, white balance, and such additional control can be achieved by controlling or calibrating aspects of the camera(s) used to record images. Conventional cameras can, and, in many instances must, be calibrated either in coordination with luminaire control or separately in order to achieve the desired color that is displayed on an output device, such as a monitor. Conventional camera calibration processes and techniques present additional challenges and problems in environments where color mixing, white balance control and saturation/desaturation are needed either in conjunction with luminaire control or independently of luminaire control. As is presently believed, in the conventional solution to the above-stated problems, for each "type" or "brand" of digital camera, calibration is accomplished manually and through trial and error efforts to compensate for the hue, brightness and white balance, based on the camera's known color sensitivity. The aspect of conventional color compensation though camera calibration is made on a per camera basis because of the differences in color sensitivity and processing among manufacturers and sensor types. The resulting, final image (after being processed by the camera) displays the color the photographer or cinematographer originally intended, which typically is the color as it would appear to the human eye under natural lighting conditions. An example of the importance of such color compensation or color rendering would be the capturing of a prominently featured red dress on the lead actress of a feature film. The subtleties of which shade of red or the consistency of the red color of the dress under different lighting conditions may have significant bearing on the success of the film. Capturing and uniform rendering of the color of the red dress, without color compensation and under different lighting conditions, such as day photography, night photography, the use of natural lighting, artificial lighting, or a mix of the two typically would create significant challenges because the final red color rendering of the dress would be different under each lighting condition.

White Light Problems Associated with Conventional Color Mixing Processes for LED Light Sources—And Compensated Color Mixing with Kelvin-Adjustable Desaturation Solutions Conventional LED-based lighting systems and color mixing processes have several problems associated with color mixing and use of white light in color mixing. Four of these known problems that are addressed by the present systems and processes relate to problems associated with (i) brightness of colors that result from color mixing, (ii) quality of white light produced when color mixing is used to produce white light, (iii) mixing of different sources of white light and (iv) desaturating a non-white color light with white light.

Color Mixing Brightness Problem

Regarding conventional mixing of colors to yield a new color, such as mixing red and green to produce yellow, achieving accurate control of the brightness of the produced color is a problem that the conventional systems and processes have not been able to adequately solve. Consider, for example, mixing of primary red with primary green to yield yellow, to yield the correct brightness of the resulting yellow is an example of this problem. In conventional processes, the brightness of the resulting yellow color would be the sum of the brightness of the two constituent colors. In this example, the brightness of the red added to the brightness of the green used to create a particular shade or hue of yellow and could be as high as twice the brightness or double the brightness of the two mixed colors, such as when full power red is mixed with full power green. This conventional color mixing process in turn causes problems during filming or recording of specific scenes, due to varying brightness of differently mixed colors, and uneven capturing and reproducing colors on digital cameras and output media. For, example, a yellow produced by mixing of red at 100% of power with green at 100% of power could yield a yellow at twice the brightness of the constituent colors, but a different hue of yellow produced by mixing, for example, red at 100% with green at 50% power would yield a different hue of yellow and at a brightness of possibly 1.5 times the brightness of the red and three times the brightness of the green. This color mixing brightness problem occurs when mixing a non-white color with any shade of white color, and with mixing two or more shades of white with each other. The mixing of a pure non-white color with varying amounts of a white color is also referred to as "desaturation," and is described in greater detail herein. This color brightness problem also occurs when mixing two or more different shades of white colors, as also described herein. In general, and in common for this type of problem, the conventional process simply adds one or more colors of light, each having its own intensity or brightness, to the chosen, base light, with its own intensity. The result of this typical mixing is that the brightness or intensity of the final, mixed color is the sum of the intensity (or brightness) of each component color and is greater than the individual intensity of any one of the component colors, regardless of whether the component colors are non-white and non-white; non-white and white; or white and white. The specific shade or Kelvin temperature of white used in any of these types of mixing introduces another set of problems, as also described herein.

Color Mixing to Produce White Light Problem

Regarding conventional production of white light from non-white colors of light, it is well known that tri-stimulus color mixing (RGB) provides a very broad range of blended final colors, including the mixing of colors to produce white light. However, as is well known in this field, when LED-sourced colors are mixed to create white light, a relatively low resolution and low quality white light results. Because high quality white light is made up of the entire visible spectrum, it is not possible to create high quality white light simply by blending only red, green, and blue light. Also, while it is known that the addition of light from another source, such as from a phosphor-white colored LED source, can help improve the quality of the final white light produced, this option is very limited in practice and is not capable of producing the highest quality of white light.

While the conventional solution to the color mixing to produce white light problem is use of multicolored light sources, and offers flexibility for adjusting the final output color white so that the final white light is within the human visible spectrum, this solution comes with a significant cost, i.e., relatively low quality of the white light produced. Also, while single, non-adjustable colored lights may be desired for some uses in which only a single, specific shade of white light is needed, the entertainment-based image capture field has historically desired and needed the ability to change the output parameters of lighting to meet ever-changing needs, including the need to produce various shades of high quality white light. This white light quality problem is believed to be solved with the presently disclosed systems and processes, as described in detail below.

From a photographic and cinematic point of view, artificial lighting is used to simulate the white produced by natural sources such as the sun, or fire, and white produced by other artificial light sources. As is well known in this field, natural white light from the sun from the point of view of a human standing on earth at midday or at sunset provide vastly different shades of white, and simulation of these vastly different shades of white presents significant challenges in the current state of the art. Because all or virtually all cameras used in this field, including film cameras, require the operator to choose the desired shade of white to appear "white" on camera during image capture, the differences between shades of white, and the ability to adjust for different shades of white under different conditions (such as early morning, midday or sunset, for example) is very important in this field. In the image capture market, the particular shade of white used by a camera is referred to as "white balance" and choosing and adjusting for differences in shades of white light requires the camera operator to choose a specific white balance, typically by choosing a specific setting on a camera, with the settings representing a wide range of shades of white. Such settings are typically found on cameras used in the cinematic, entertainment and photographic image capture field or markets.

Desaturation of a Non-White Color with White Light Problem

In current desaturation processes, otherwise unused portions of red, green, and blue light are typically employed to desaturate a chosen or predetermined base-color. As referred to herein, the terms "saturated" and "desaturated" mean and refer to the percentage of pure light of a predetermined, base color as compared to the percentage of light of the predetermined, base color after the base color has been mixed with white light regardless of the quality of the white light. Thus, for a predetermined, base color of light that is 100% pure of that predetermined color, that light is said to be saturated, fully saturated or 100% saturated. As a first example of saturation/desaturation, if the predetermined, base color is primary red and the light under consideration is 100% primary red, then that light is referred to as saturated, fully saturated or 100% saturated red. If a predetermined, base color of light, such as primary red, is mixed with white light such that 50% of the light is primary red and 50% is white light, then that light is referred to as 50% saturated red or 50% desaturated red. As a second saturation/desaturation example, if the predetermined, base color is primary blue and the mixed light has 40% primary blue light and 60% white light, the resulting color is referred to as either 60% desaturated blue, or 40% saturated blue light. As a third saturation/desaturation example, consider a predetermined, base color to be a shade of yellow. Yellow is the color resulting from mixing primary red and primary green, and a particular predetermined or base color that is a shade of yellow may be created from the many shades of yellow possible, depending on the percentage of red and green, respectively, used to create the base color yellow. Thus, for a particular base color of yellow, if that yellow was 75% desaturated, that yellow color would have 25% of the base shade of yellow light and 75% of white light, and could also be referred to as 25% saturated yellow.

The problematic effects of conventional color mixing are particularly noticeable when RGB is mixed for the purpose of producing white light and then using white light to desaturate a base color. One conventional process of producing desaturated light typically comprises using the unused portions of red, green, and/or blue to create white light and then using that white light to desaturate the chosen base color of light. A second, alternate conventional process of producing desaturated light is mixing RGB with an additional white LED-sourced light. As is known to those skilled in this field, this second desaturation technique does result in a better quality white than the first technique. However, the quality requirements for the cinema and television industries are very stringent for white light, and the goal of any artificial lighting system is accurate mimicking of natural light. While mixing RGB with or without an additional source of white light may be reasonable and acceptable for commercial or residential lighting, it is widely considered to be unacceptable for high-end applications such as for motion pictures, television, museums, etc.

As is well known to those skilled in this field, many variations of white light exist, with each hue of white associated with a specific Kelvin temperature (K). Also mixing of different Kelvin temperature white light is known in this field, and is commonly referred to as bi-color white mixing. One commercially available system and process of color mixing of white light has been available since 2010 from LiteGear, Inc., as its Hybrid™ brand white light. In one example of white light mixing, a 3000K (warm) white light could be mixed with a 6000K (cool) white light from two separate channels of LED emitted white light, resulting in a 4500K white light. This process of mixing could take place on a single printed circuit board, with two different channels of white light crossfaded to achieve the desired Kelvin temperature white light. In this example, the 3000K white light emitters would be powered from a first, single channel and start at, for example one watt of power (which could be defined or referred to as full power), and the 6000K white light emitters would be powered from a second, single channel and start at zero power output. During cross fading, as the power of the 3000K emitters is decreased, the power of the 6000K emitters is increased at the same rate, while the total output power would be maintained at one watt. In this example of white light mixing, the Kelvin temperature of the white light output changes from a relatively warm white to a relatively cool white, until the chosen or desired Kelvin temperature white is reached. However, use of such mixed or Hybrid™ white light has not been previously used to desaturate a fully saturated color, regardless of whether the fully saturated color is a primary color or a non-white, mixed color.

In sum and substance, several significant problems exist with conventional color mixing including varying of brightness during color adjustment, color mixing to produce white light, mixing of different hues of white and desaturating colored light. These problems associated with conventional color mixing processes in turn cause problems during filming of scenes, due to varying brightness, quality and hue of the mixed colors, and can and often do result in uneven capturing and reproducing of colors on digital cameras, and on output media.

As is readily apparent, needs exist to address the problems that currently exist with mixing of and controlling artificial light sources; and controlling color output from digital cameras as well as conventional film camera that record images illuminated by artificial light sources.

SUMMARY OF INVENTION

The systems and processes according to the present disclosure are referred to as compensated color mixing, and overcome the above described drawbacks of known artificial light mixing and light correction systems and processes by maintaining the intensity or brightness level of light produced from mixing of light from different sources, producing high quality blended white light, saturating/desaturating a predetermined or base light, regardless of whether the base light is a primary color or a mixed color. In general, the presently disclosed systems and processes achieve these results by gradually lowering the intensity of/power to the source of the original or base color while increasing the intensity of/power to the source of the second color. Once the desired, mixed color has been established or set, the resulting, mixed light can be dimmed or made brighter without changing the color, that is, without changing the hue. These compensated color mixing processes work for color-mixing, blending of white colors and for saturating/desaturating colored light regardless of whether the base color is primary or mixed.

In general, camera calibration is an important aspect of the presently described systems and processes, with exemplary embodiments set forth below. Camera calibration data are collected from the published specifications of the camera's sensor(s), from real-world testing and/or from data provided by the digital imaging technician (DIT). These collected data are then typically stored in non-volatile memory in an electronic control circuit and are used in an algorithm that enables adjustment of or changes in the intensity of light produced by each of the red, green, and blue color channels, along with any additional provided colors, such as amber or white, in order to provide color accuracy for the desired subject or application under various lighting conditions. Then, once the intensity of each of the chosen colors has been set and when capturing the image, the DIT need only choose the desired calibration setting on each multicolored light source. In this process, the algorithms that control, change or manipulate the intensities of the constituent colors in a conventional, multicolor LED-based or other type of luminaire will cause colors suited to a particular camera's sensors and settings to be produced.

Embodiments, examples, features, aspects, and advantages of the present disclosure will become better understood with regard to the following description, appended claims and accompanying drawings.

BRIEF DESCRIPTION OF THE DRAWINGS

The foregoing aspects and the attendant aspects of the present disclosure will become more readily appreciated by reference to the following detailed description, when taken in conjunction with the accompanying drawings, wherein:

FIG. 18B is the second, continuing part of the FIG. 18A flow chart;

FIG. 18C is the third, continuing part of the FIGS. 18A and 18B flow charts;

Figure 1:
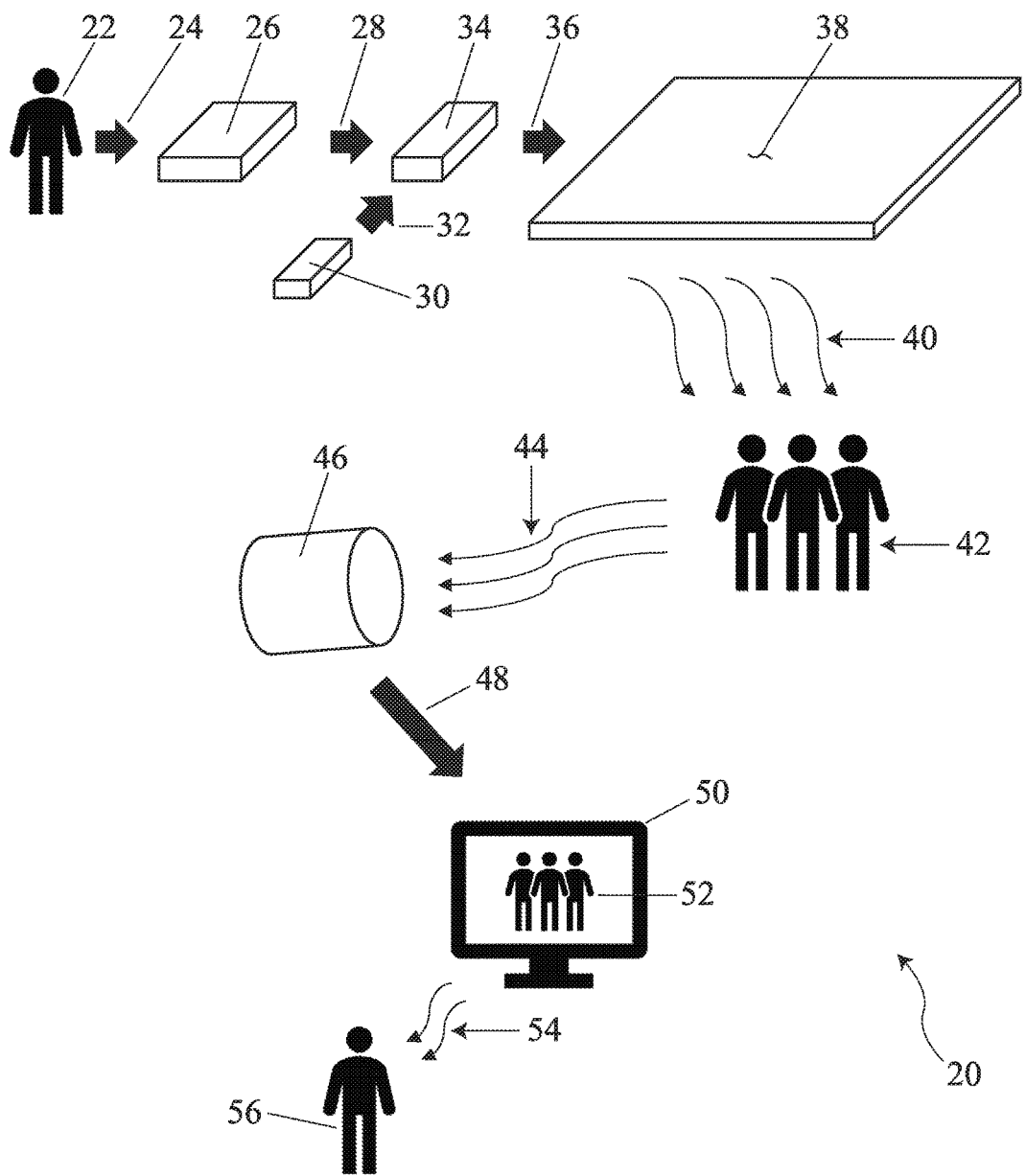
FIG. 1 is a schematic overview of a conventional LED lighting system.

Reference numerals, symbols or names are used in the figures to indicate certain components, aspects or features shown therein. Reference symbols common to more than one figure indicate like components, aspects or features shown therein.

DETAILED DESCRIPTION

Figure 4:
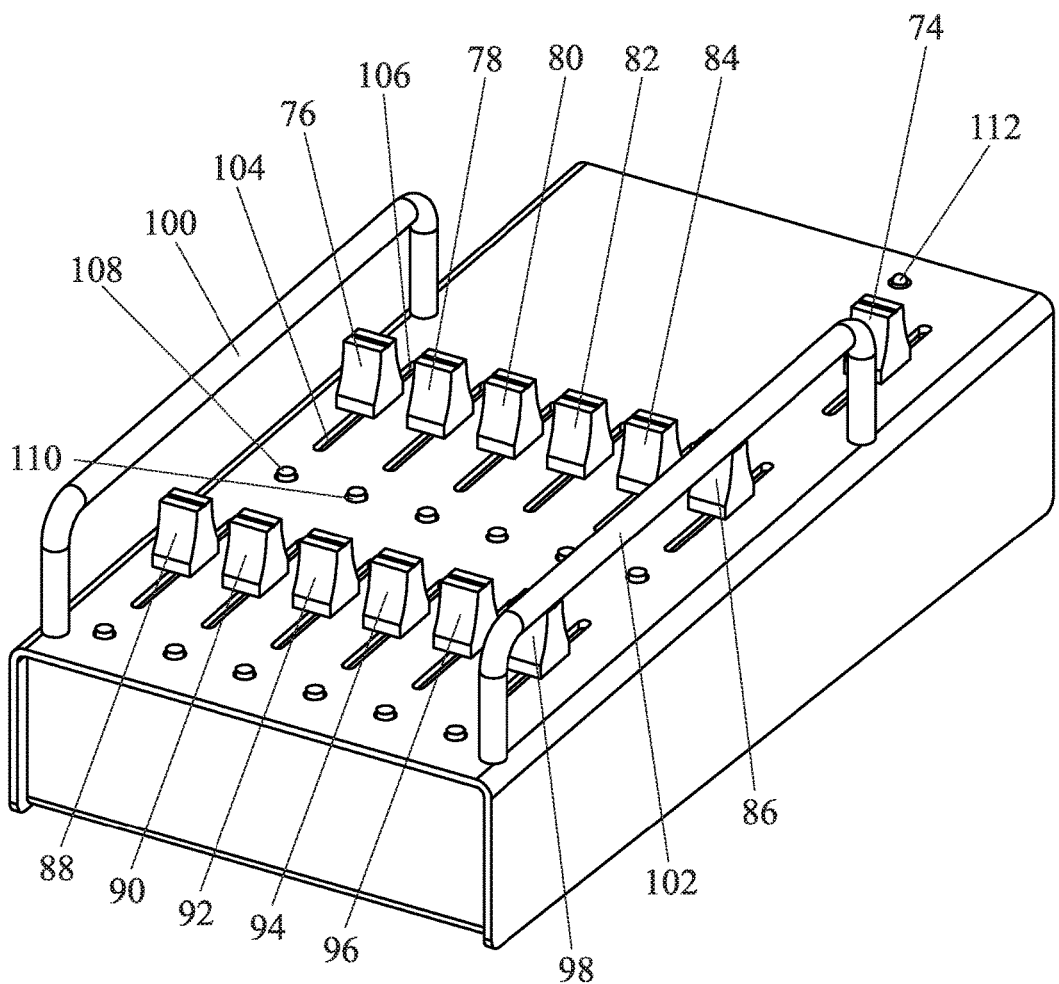
FIG. 4 is top, front perspective view of a conventional lighting console for the conventional 8-bit DMX512 standard digital data transmission protocol.
Figure 5:
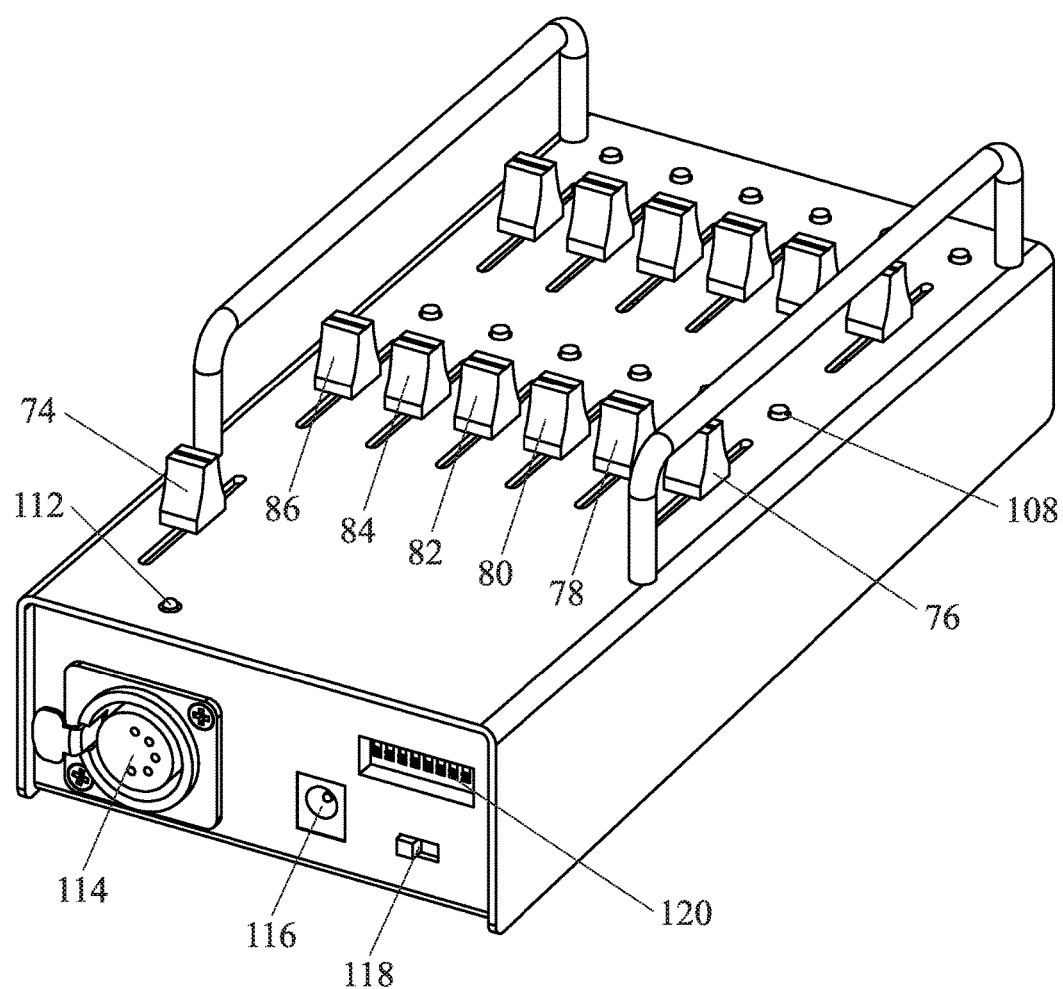
FIG. 5 is a top, rear perspective view of the FIG. 4 console.

With reference to FIG. 1, a conventional camera and lighting system 20 includes a user 22, who alternatively and conventionally may be referred to as the filmmaker or cinematographer even though present technology typically uses electronic media for recording and storing images rather than using film. User 22 operates, as shown by arrow 24, a console 26, which may be a conventional 8-bit DMX console, such as a DMX-IT 512 brand console, as shown in FIGS. 4-5. This console includes functionality that enables both conventional lighting systems and the presently described, inventive systems and processes. Alternatively, a conventional laptop or desktop computer having a conventional operating system, and a conventional lighting control application may be used for both conventional and the presently described inventive lighting systems. For example, the conventional FreeStyler DMX™ brand software, which is Windows®-based DMX-512 lighting control software for a PC, is such an application, and is essentially a virtual DMX console. Console 26 connects, as shown by arrow 28, to a controller 34, which may be a conventional 8-bit DMX512 controller. Conventional power supply 30 also connects, as shown by arrow 32 to controller 34. Conventional LED light panel 38 is driven or powered by controller 34, through conventional input leads 36 (shown as an arrow). Light panel 38 emits LED-sourced light 40 and illuminates object(s) or person(s)/people 42 in real-time. Light 44 reflected from the object(s) or people 42 is captured and initially processed by conventional camera 46, which may be a film camera or a digital camera. Initially processed and recorded conventional image data 48 is then displayed on a conventional display 50, which may be a computer monitor, television monitor or reflective screen. Display 50 projects virtual image(s) 52 of the real-time object(s) or people 42, as shown by arrows 54 for viewing by human viewer 56. As will be appreciated by those skilled in this field, one goal of conventional lighting systems is to have the colors of the virtual image(s) 52 as seen by viewer 56 appear to be the same colors as a human viewer 56 would see the real-time object(s)/person(s) 42 under natural lighting conditions. As will also be appreciated by those skilled in this field, the presently described systems and processes address known problems with conventional lighting systems and processes, and enable greatly improved capability for the colors of such virtual image(s) 52 to accurately correspond to the actual colors of the real-time object(s)/person(s) 42 when illuminated under natural lighting conditions.

Figure 2:
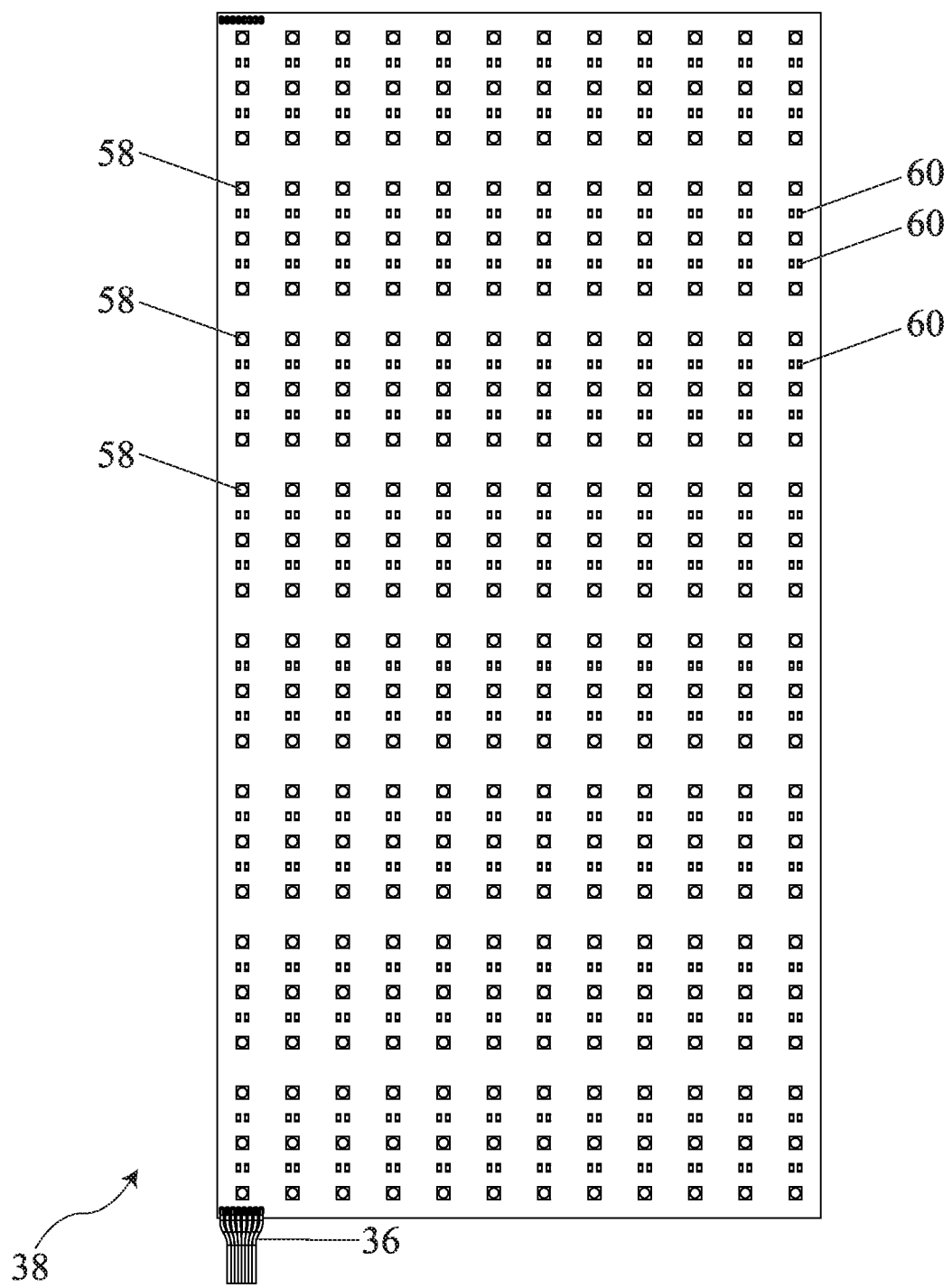
FIG. 2 is a top, front surface view of a conventional Red, Green, Blue, Amber (RGBA) LED lighting panel.

With reference to FIG. 2, conventional light panel 38 includes a plurality of 5050 RGBA LEDs 58, 58, 58, etc., and a plurality of resistors 60, 60, 60, etc., connected in a conventional circuit, as is well known. Conventional positive and negative input leads 36 provide power from an LED controller (shown in FIGS. 6A and 6B).

Figure 3:
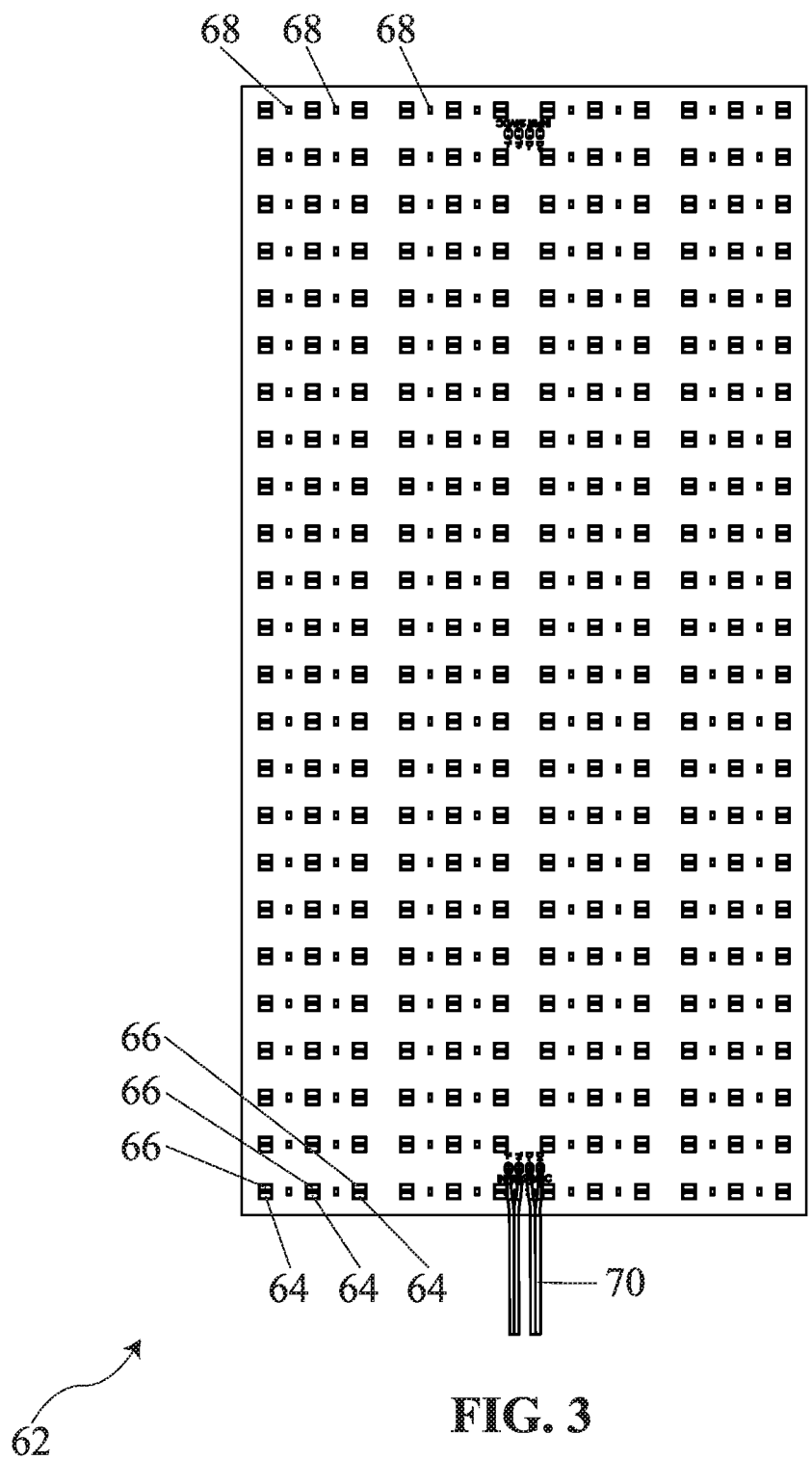
FIG. 3 is a top, front surface view of a conventional white LED panel having two types of phosphor-white LED light sources.
Figure 6A:
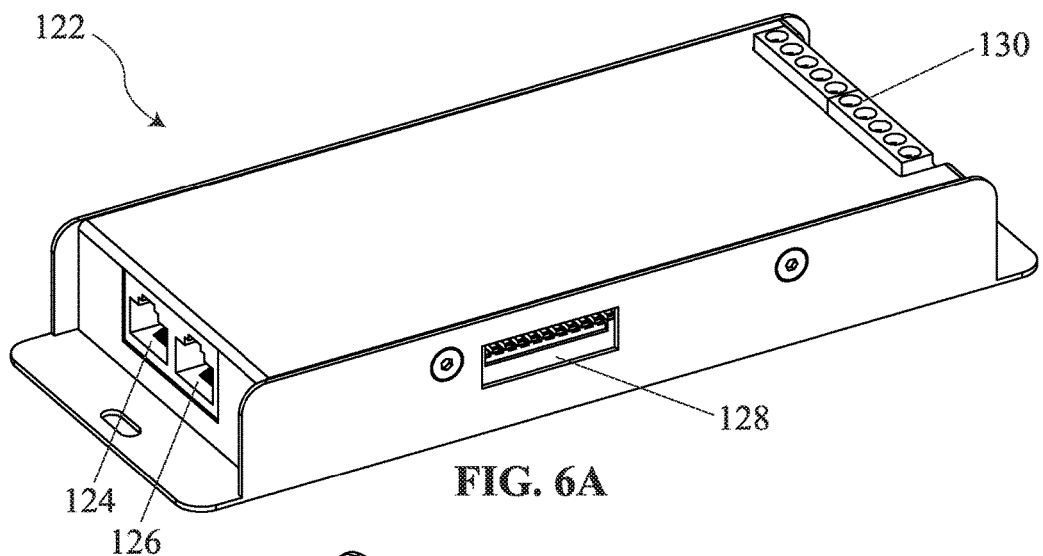
FIG. 6A is a top, first end perspective view of a conventional 8-bit DMX512 controller showing DMX512 input and output ports, DIP switches and the top of a PCB terminal block, and with the controller containing a DMX512 decoding module and a lighting control (dimmer) module.
Figure 6B:
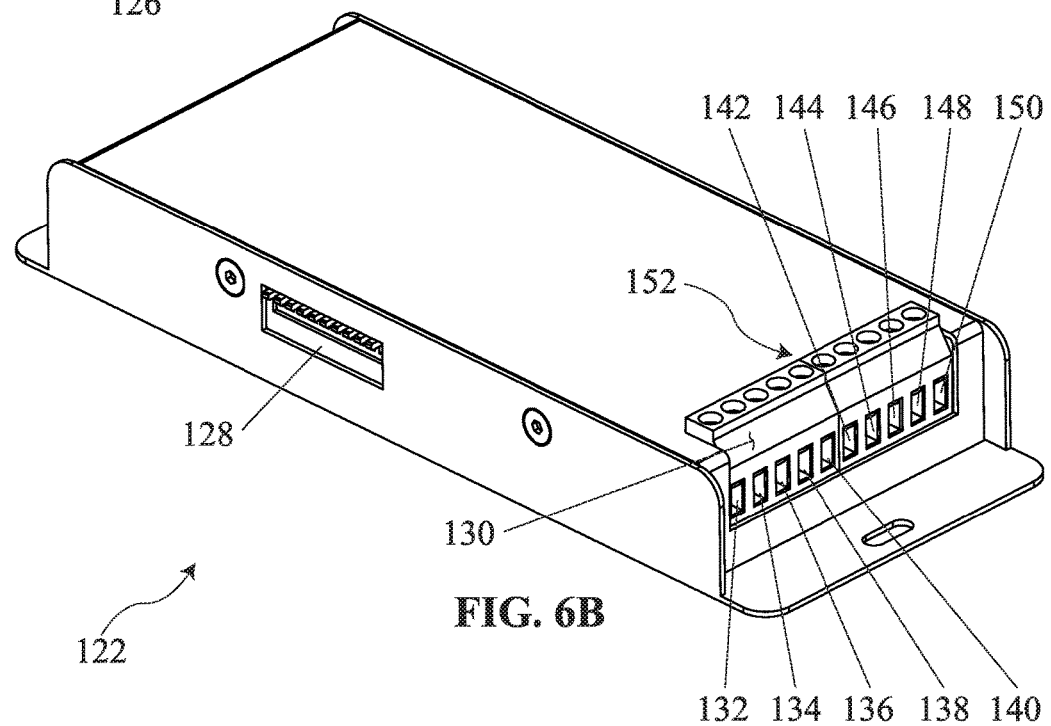
FIG. 6B is a top, second end perspective view of the FIG. 6A controller showing the ports of the PCB terminal block.

FIG. 3 illustrates a conventional, hybrid white, or bi-color light panel 62, that includes only white light emitting diodes. Some of the LEDs, identified as 64, 64, 64, etc., emit "warm" white light and some of the LEDS, identified as 66, 66, 66, etc., emit "cool" white light, as is well understood by those skilled in this field. Panel 62 also includes resistors 68, 68, 68, etc., and positive and negative input leads 70 that provide power from an LED controller, such as shown in FIGS. 6A and 6B.

FIGS. 4 and 5 illustrate a conventional 8-bit DMX console 72, which corresponds to console 26 in FIG. 1, and which generates signals in accordance with conventional 8-bit DMX protocol. Such consoles and the DMX protocol are commonly used in the entertainment, television and motion picture industries. A conventional DMX console and DMX protocol also may be used in the presently described systems and processes. A currently used, well-known conventional 8-bit protocol is the DMX512 protocol, also referred to as the DMX512 1990 protocol, with a conventional 8-bit DMX console, as illustrated in FIGS. 4-5. As is also well known, the DMX512 protocol has a particular set of parameters, with 512 channels maximum, each channel transmitting 8-bit data, meaning that a maximum of 256 steps per channel (steps numbered 0-255) are available. Depending on different design parameters, each channel may refer to or control different, predesignated functions. For example, each channel may refer to, or control a circuit that in turn controls an LED or a set of LEDs of a particular, predetermined color, such as red, green, blue, white, or, in some instances, other colors such as amber. The number of such steps in conventional lighting systems typically refers to resolution, or the number of increments of power, or current that may be supplied to each channel to control the intensity of a single LED or a group of like LEDs (such as R, G, B, A or W). In some conventional systems, the channels may be used to control uncompensated hue, saturation, intensity and conventional desaturation. Also, and for example, when a channel controls the color of a single LED or group of LEDs emitting the same color, then, typically the "0" step refers to zero power, i.e., that the LED has no input power and is therefore "off." Typically, step or "setting" "255" refers to the maximum current or power supplied to a particular color of LED(s). In the description of preferred embodiments herein, a nominal 1 W is used as full power in examples, but other values of maximum power to a particular circuit or to particular LED(s) may be used, as will be appreciated by those skilled in this field.

Again referring to FIGS. 4 and 5, DMX console 72 includes a master control slide switch 74 and twelve channel slide switches 76, 78, 80, 82, 84, 86, 88, 90, 92, 94, 96 and 98. These slide switches are also commonly referred to as "faders". Side rails or handles 100, 102 primarily function as guards to prevent accidental knocking and moving any of the slide switches, and also function as handles for picking up the console. Each of channel slide switches corresponds to and control a DMX channel in 256 steps, i.e., steps 0 to 255, for a total of 256 steps. Referring to channel slide switch 76, the bottom of the slide, shown at 104, corresponds to the value 0 or the 0 step. At the opposite end of the slide, shown at 106, when the channel slide switch is at this position, the corresponding value is 256, or full or maximum value. Depending on how the associated software or firmware is coded, the functionality of what each channel slide switch controls will vary, which type of coding and how they operate are known to those skilled in this field. For example, for a conventional LED DMX controller and the FIG. 4 consul channel slide switch 76 could control the intensity of a red LED, and the value of 0 could mean that the intensity of the red LED is 0, that is, the LED is "off" or without any power. When the channel switch 76 is at the top of the slide, that is, at value 255, the red LED would be on and at maximum power, brightness or intensity. In other applications or embodiments, instead of the 256 values corresponding to intensity of a single LED, the controller could employ a method of color control that is referred to as HSI (hue, saturation, intensity) control. In such an embodiment, the value 0 could mean that the hue or color output from an LED lighting panel would be red, a value of 255 could mean that the hue or color output from the LED lighting panel would be blue, a value of 12 could mean that the hue/color output would be green, a value of 80 could mean that the hue/color output is yellow, etc. In the same embodiment, a value of 128 on a slide switch could mean 50% saturation while a value of 64 could mean 25% saturation, and so on. In other embodiments, depending on the functionality of the DMX controller, the value/position of a console channel slide switch may have one of other, different meanings.

Console 72 also has conventional "bump" buttons, two of which are shown at 108, 110. Operation of bump buttons is well known to those skilled in this field. In general, bump buttons function, when pressed, to increase the value to 100% from whatever the current or set value is at the time the bump button is pushed. For example if a channel slide switch, such as switch 76 was set at 50% of its maximum value and the bump button 108 was pushed then the value of whatever was controlled by switch 76 would increase from 50% to 100%. Console 72 also includes a power on/off indicator light 112.

One end of the console 72 includes several connectors and switches; including the MIX signal output connector 114, power connector 116, power switch 118 and dual-in-line (dip) switches, shown at 120. The DMX output connector 114 is preferably a conventional 5-pin XLR, panel mount, female connector, with a conventional locking tab mechanism (not numbered). DMX signals output from the console 72 are sent from the connector 114 of the DMX console to the downstream DMX controller. DC power input, barrel connector 116, and on/off switch 118 are also shown in FIG. 5. The console 72 may also be provided with an internal battery power supply. The dip switches 120 function to permit setting the starting addresses of each of the channel slide switches or faders. As will be appreciated by those skilled in this field, due to the number of slide switches being twelve as shown on console 72, a user would have access to only twelve channels at one time, even though a total of 512 channels are available. In actual use, while 512 channels of control signaling are available to control a lighting fixture, typically a relatively small number of controls, such as 15-16 DMX channels per fixture are needed or actually used to control a lighting fixture or group of fixtures. For example, for a fixture configured not only to emit light, but also to have motion and animation capabilities, there may be 15 channels used to control various aspects of that fixture. In such an example, fader 76 might control the hue/color of the light emitted from the fixture, fader 78 might control the intensity/brightness of the light, fader 80 might control the pan of the fixture, fader 82 might control the tilt of the fixture, etc., up to any number of parameters. Setting the start address enables effective communication between the controller and the fixture, in other words, effectively controlling the signaling for different aspects of the operation of the fixture so that the signals are the same type of signaling (same wavelength, frequency, etc.) and the devices actually communicate with each other, analogous to each speaking to the other in the same language.

Again referring to FIGS. 4 and 5, a preferred DMX console 72, which corresponds to console 26 from FIG. 1, is commercially available from "Integrated Controls, Inc." as its stand-alone, model DMX-IT 512 controller. For use in the presently disclosed inventions, 4 addresses preferably are used to control 5 or 6 channels in the processes disclosed herein. In the case of use of 5 channels, one channel each to power red, green and blue LEDs, and two channels to power different Kelvin temperature white LEDs are used. As will be appreciated by those who are skilled in this field other conventional, stand-alone consoles having varying types of functionality may be used with DMX, or other protocols. Also, as will be appreciated by those skilled in this field, the DMX protocol and as well as other protocols may be implemented on software that can be operated from conventional computing devices such as desktops, PCs, Apple brand computers, etc., to enable the presently described processes. For example, the presently preferred communication protocol is a 16-bit protocol, provided as Appendix 1 herein. Other protocols can be created, and other known protocols can be used in the present system and processes, and creation and used of such protocols is within the skill of those skilled in this field. Also, for example, in a simple system according to the principles of this disclosure, a useable protocol could be as simple as a control circuit having four conventional variable resistors with an analog signal to a conventional controller for a luminaire. As shown in FIG. 4, the DMX-IT 512 console includes 12 "faders", meaning that this console can control up to 12 channels of DMX at one time, with values from 0 to 255 for power to each of the channels. The console also includes a master control capability.

Referring to FIGS. 6A and 6B, the exemplary controller 122 corresponds to the controller 34 of FIG. 1. DMX signaling input connection 124 receives, via a conventional Ethernet cable (not shown) DMX signals from the DMX output 114 from DMX console 72 as shown in FIG. 5. The connection 124 is configured to receive a conventional RJ45 connector that is also commonly used for Ethernet cables and Ethernet protocol. Conventional CAT5, CAT5E and CAT6 Ethernet cables are typically used for this type of DMX controller. DMX output connection 126 is also shown in FIG. 6A. DMX output signals are sent from output connection 126 to downstream devices within an overall lighting system. Controller 122 also has a set of dip switches 128. The dip switches 128 are used to correlate the channel set-up in the console 72 with the channel set-up in each of the controllers, one of which is shown as controller 122 in FIGS. 6A and 6B. In a relatively small lighting system, for example, only a single controller would be used, and only a few channels would be used out of the total 512 available channels. In relatively large lighting systems there may be several controllers scattered throughout the movie set, with each controller having one or more lighting fixtures connected to it. In those relatively large lighting systems, the dip switches 128 are used to set up or coordinate communications among the console, controllers and lighting fixtures so that all the lights are properly controlled. For example, when it is desired that a predesignated number of like lighting fixtures are intended to perform the same function, then the controllers for all those lights will be set to have the same start address. In such an example, for a group of lighting fixtures controlled by the FIGS. 6A, 6B controller 122 and controller 122 having a starting address of 256 set on the dip switches, then all of those lighting fixtures would function in unison upon receipt of a corresponding DMX signal, such that all of those fixtures would increase intensity at the same rate and to the same level of intensity. In another example, if a DMX controller such as controller 122 was controlling an RGB LED; one channel would be assigned to control each of red, green and blue, for a total of three channels, such as channel setting 254, 255 and 256. The starting address for the next device would then be set to address 257. In this example, if the next device is a conventional hybrid, or bi-color white light panel, then that DMX controller would use two channels, one for the cool white LED and one for the warm LED, and the starting addresses would be 257 and 258, respectively.

Also shown in FIG. 6B, controller 122 has a ten-position conventional block connector 130, sometimes referred to as a "Phoenix" connector. The ten positions are shown at 132, 134, 136, 138, 140, 142, 144, 146, 148 and 150. The various positions of a block connector can be used for various functions, depending on the manufacturer, model and how it is configured. In an exemplary lighting control system, using the FIGS. 6A and 6B embodiment connector 122, positions 132 and 134 are for negative DC power in; positions 136 and 138 are for positive DC power in, and in this embodiment also function as the positive output for the LEDs, because the positive DC power in and positive output for the LEDs can be shared considering the fact that the circuitry responsible for the LED dimming on this particular controller is placed on each of the dedicated negative outputs 140, 142, 144, 146, 148, and 150 and not on the positive output(s). Also, positions 140 (red), 142 (green), 144 (blue), 146 (amber), 148 (tungsten) and 150 (daylight) would be outputs to the LEDs. In this exemplary embodiment, the fixtures use a common positive (anode), so that positions 136 and 138 function as double positive outputs for the LEDs. In this exemplary system, positions 140 (red), 142 (green), 144 (blue), 148 (tungsten or "warm" white) and 150 (daylight or "cool" white) would be LED outputs, because a common cathode (common negative) system is not used. Rather, the exemplary system is a common anode (common positive) system, so that power is sent though one of the negative leads to complete the circuit and power "on" all of the LEDs on that panel. The block 130 is attached to the controller and the connections are made secure by set screws, collectively identified by arrow 152. An example of such a controller 122 is a LiteGear™ brand DMX 6×6-V2 controller, also referred to as a 6×6-V2 that is presently commercially available and may be used in the conventional system, such as conventional system 20 from FIG. 1.

Figure 7:
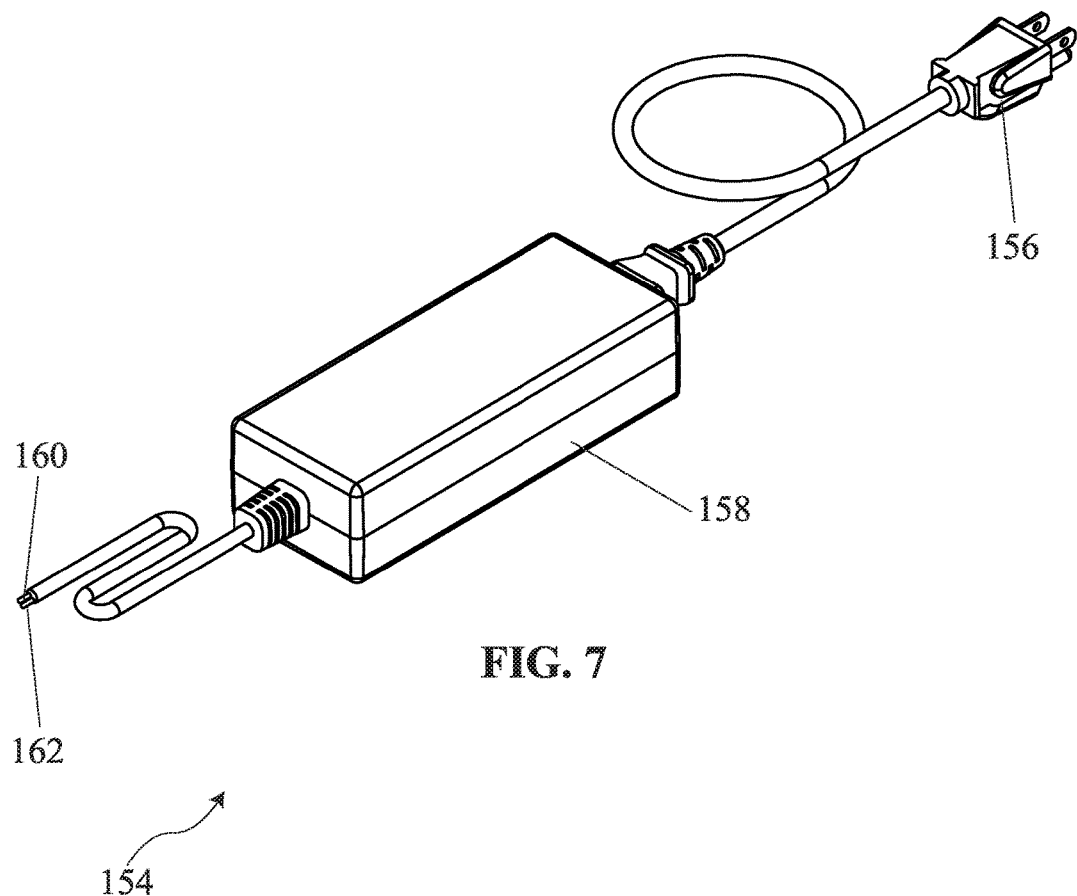
FIG. 7 is a top, perspective view of an conventional power supply that may be used to provide DC voltage to the FIGS. 6A and 6B controller.

Referring to FIG. 7, conventional power supply 154 includes a conventional connector, or plug 156, (which may be a NEMA 5-15P AC input connector), housing 158, DC positive output lead 160 and DC negative output lead 162. The power supply 154 corresponds to power supply 30 as shown in FIG. 1, and converts line voltage AC to 12, 24, 48 or other volts DC. In the exemplary embodiment, positive lead 160 would be connected to block 122 (FIG. 6B) at 136 and/or 138, and negative lead 162 would be connected to controller block 122 at 132 and/or 134.

Referring to FIGS. 2, 3, 6A and 6B, the DC power leads 36 of FIG. 2 and/or 70 of FIG. 3 would be, for example, connected to terminal block 130 of controller 122 as shown in FIGS. 6A and 6B. More specifically, the negative leads from the FIG. 2 leads 36 from the lighting panel RGBA LEDs would be connected at 140, 142, 144 and 146. The negative leads of the leads 70 from the FIG. 3 panel hybrid white LEDs would be connected at 148 (warm) and 150 (cool). The positive leads from leads 36 and 70 would be paralleled with each other and with the power supply and be connected at 136 and/or 138.

Figure 8:
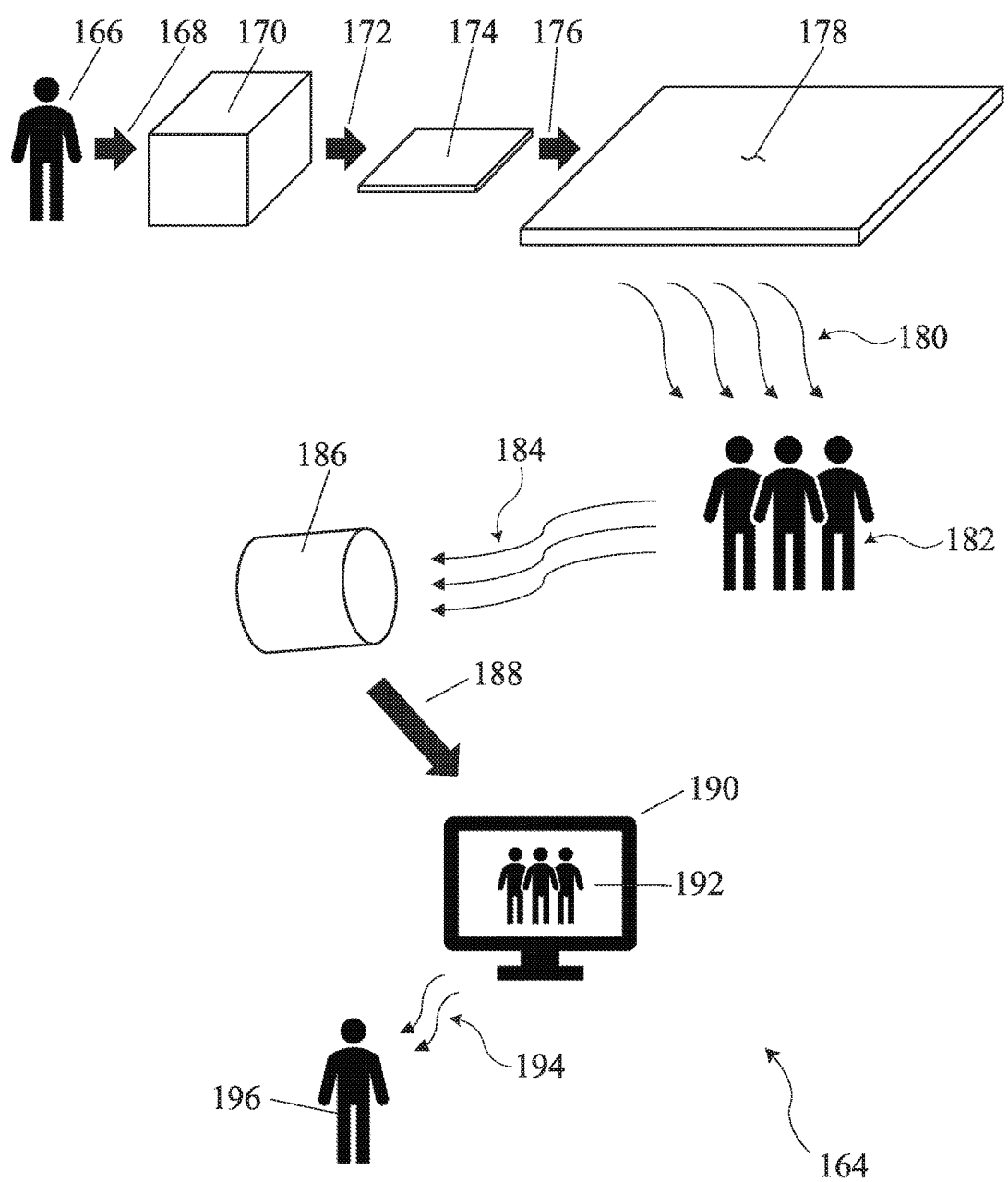
FIG. 8 is a schematic overview of a preferred embodiment of the present system.

With reference to FIG. 8, a block diagram of components of an embodiment of the presently described lighting control system is shown. User 166, corresponding to user 22 as shown in FIG. 1, operates (as shown with arrow 168) a user interface 170 of the present system, as shown and described in greater detail with respect to FIGS. 11A-11H. In general, the user 166 operates the interface 170 via onboard encoders, buttons, dials and/or switches. In other embodiments, a DMX console, such as console 72 from FIGS. 4 and 5 may be used between user 166 and user interface 170. Interface 170 generates signals, as shown by arrow 172, via a four-wire connection, preferably including a serial data pair, a positive DC power wire and a negative DC power wire. User interface 170 includes some of the functionality provided by console 26, power supply 30 and controller 34 as shown in FIG. 1 for a conventional lighting system, but with significant differences. The presently disclosed, exemplary user interface 170 and lighting panel control unit (dimmer unit) 174, combine functionality similar to that of conventional controller 122 and power supply 154 of FIGS. 6A, 6B and 7. Dimmer unit 174 receives serial date and DC power, shown by arrow 172 from the user interface 170, decodes the data, converts the data into PWM values, such as for example six PWM values for a 6-color system, and then sends the PWM values to a lighting panel, such as LED light panel 178. As described in detail below, the number of PWM values will depend on the complexity of the lighting system and the number of different colors of LEDs used in particular lighting system. As will be understood by those skilled in this field, while the conventional console and controllers illustrated herein can use 8-bit DMX protocol and DMX signaling, other types of signaling and other protocols may be used, with the presently described 16-bit protocol preferred.

Figure 9:
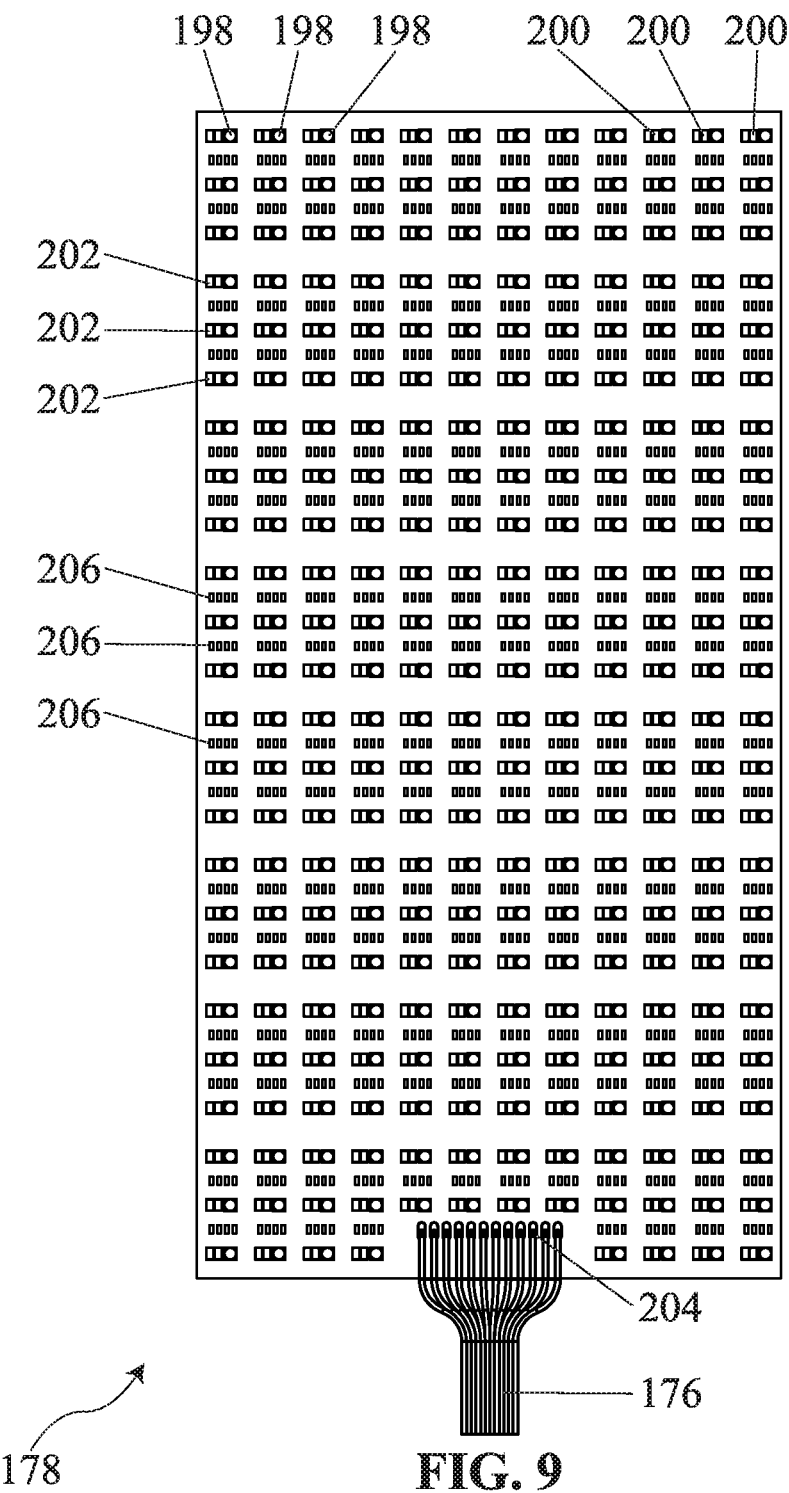
FIG. 9 is a top, front surface view of a preferred embodiment LED lighting panel of the present system that includes Red, Green, Blue, Amber (RGBA) and two types of phosphor-white LED light sources.
Figure 10:
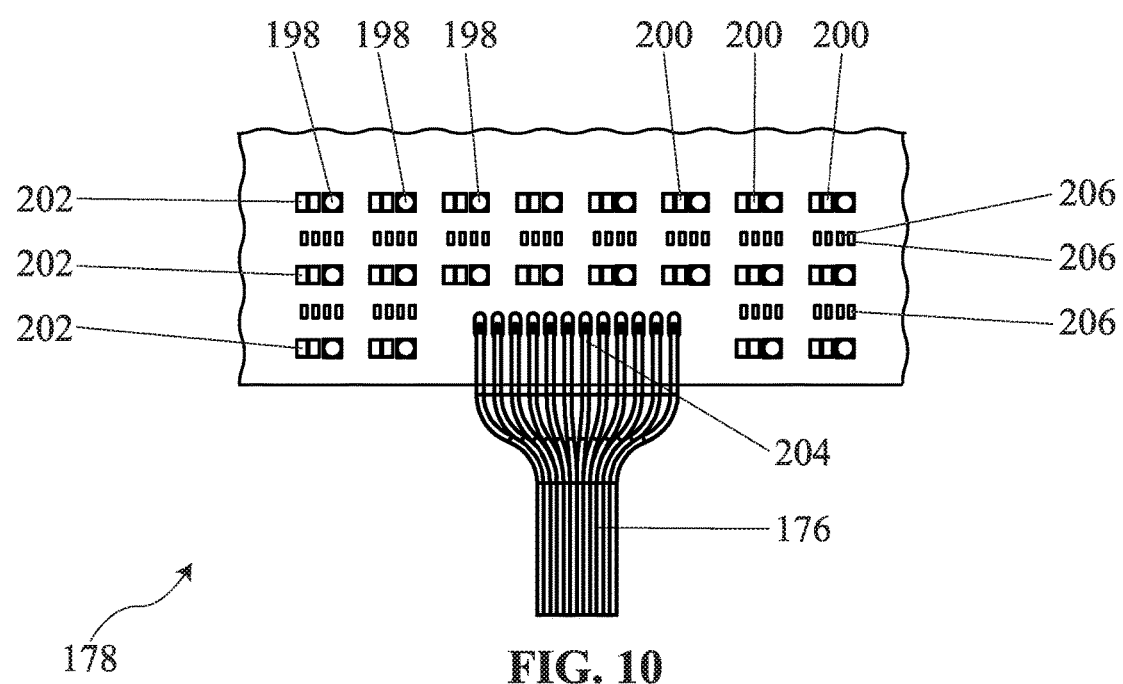
FIG. 10 is an enlarged, cut-out view of a part of the FIG. 9 embodiment, showing details of the LEDs, resistors and connections from the controller to the lighting panel.

Referring to FIGS. 8, 9, and 10, six-color lighting panel 178 includes red, green, blue, amber, warm white (tungsten) and cool white (daylight) LED light sources. Lighting panel 178 combines the LEDs of the FIG. 2 lighting panel and the LEDs of the FIG. 3 lighting panel into a single panel. Light emitted from panel 178 illuminates the objects or persons 180 in real time, much like the light emitted from panel 38 shown in FIG. 1 illuminates the objects and persons shown in FIG. 1 in real time. Light 184, reflected from the objects and/or persons 182 is then captured by camera 186. Camera 186 processes the reflected light and sends corresponding data signals 188 to monitor 190, where virtual images 192 corresponding to the real objects or persons 182 are displayed.

Combining the LEDS of the conventional FIG. 2 and FIG. 3 panels onto a single panel 178 provides advantages not inherent in or possible from use of the separate FIGS. 2 and 3 panels. For instance, panel 178 provides for equal spacing between and among like LED emitters, which in turn provides for significant improvement and advantages in certain use situations. In panel 178 the RGBA emitters and the two types of white emitters are evenly spaced with respect to each same type of emitter. This even spacing provides for uniform light distribution, and, importantly, eliminates a problem with conventional LED lighting systems that is well known in this field, and referred to as light "banding". Elimination of the banding problem means that in a particular lighted scene, should a reflection be created, the reflection would be an even reflection, and would not exhibit bands of different colors/intensities. Reflections are very important in field, especially when close-up photography is used or needed, such as when it is desired to show a reflection in a person's eyes. In conventional lighting systems, this banding problem is typically addressed by use of diffusion. Diffusion refers to the use of textile or plastic panel(s), having of several degrees of opaqueness that function to diffuse the light, that is, to make the output light appear to be evenly blended and be of uniform color, consistency and intensity. In the present lighting systems, an even, symmetrical physical distribution of the constituent LEDs enables an even distribution of light output when the panel is energized, and thus eliminates the need for diffusion, although diffusion may still be used for certain applications as known to those skilled in this field.

Referring to FIG. 9, panel 178 includes LEDs 198, 198, 198, etc., shown as the right-most emitter in an emitter grouping. LEDs 198 may be 5050 RGBA LEDs, and are also referred to as RGB A diodes. LEDs 200, 200, 200, etc., shown as positioned in the middle of each grouping, may be warm white (tungsten) diodes. LEDs 202, 202, 202, etc., shown on the left in each grouping, may be cool white (daylight or phosphor) diodes. Panel 178 also includes resistors 206, 206, 206, etc., shown with each resistor in series with three diodes. While the diodes are spaced relatively close together, the resistors are spaced relatively far apart due to the relatively high current loading for the panel (approximately 200 watts for a two-foot square area) and the need to have sufficient space/material in which the heat generated during use can be dissipated. Panel 178 also includes solder pads 204 where the input leads 176 are attached. In the FIG. 9 exemplary embodiment, twelve conductors are used, with six positive leads and six negative leads. Preferably, at the controller end the six positive leads would be connected in common (in parallel), while at the panel end six separate leads are shown for increased flexibility in design and manufacture of the panels. Preferably, the six negative leads would be separate connections, with one connection for each of the six colors (red, green, blue, amber and two whites). The LEDs shown in FIG. 9 are the same type of LEDs shown in FIGS. 2-3, with, for example, LED 198 corresponding to LED 58 in FIG. 2 (5050 RGBA LED or RGBA diode).

FIG. 10 is an enlarged cut-out view of the connector end of panel 178, showing the 5050 RGBA diodes 198, solder pads 204, resistors 206, input leads 176, "5630" warm white (Tungsten) diodes 200, and "5630" cool (daylight) diodes 202.

Figure 11A:
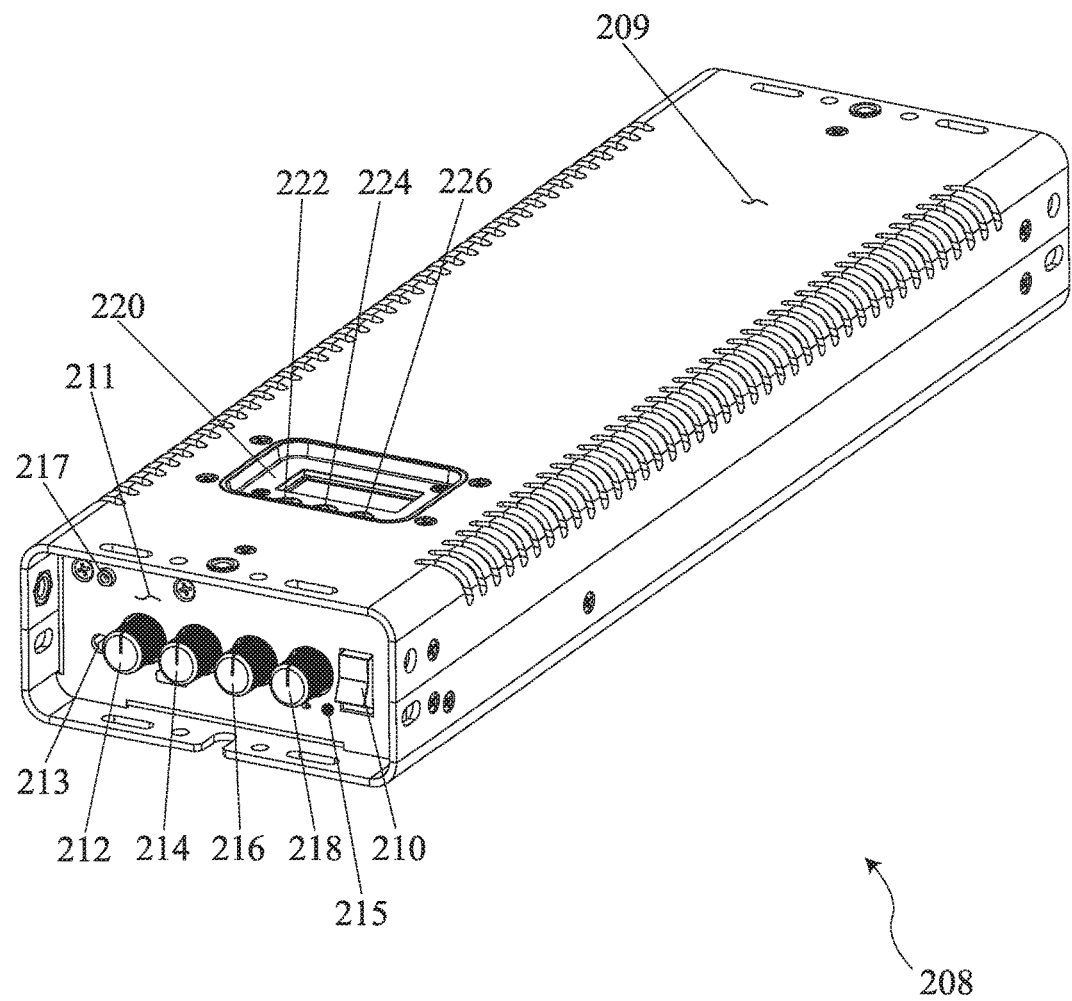
FIG. 11A is a front, perspective view of a preferred user interface embodiment for use in the preferred embodiment of the presently disclosed system and process.
Figure 11B:
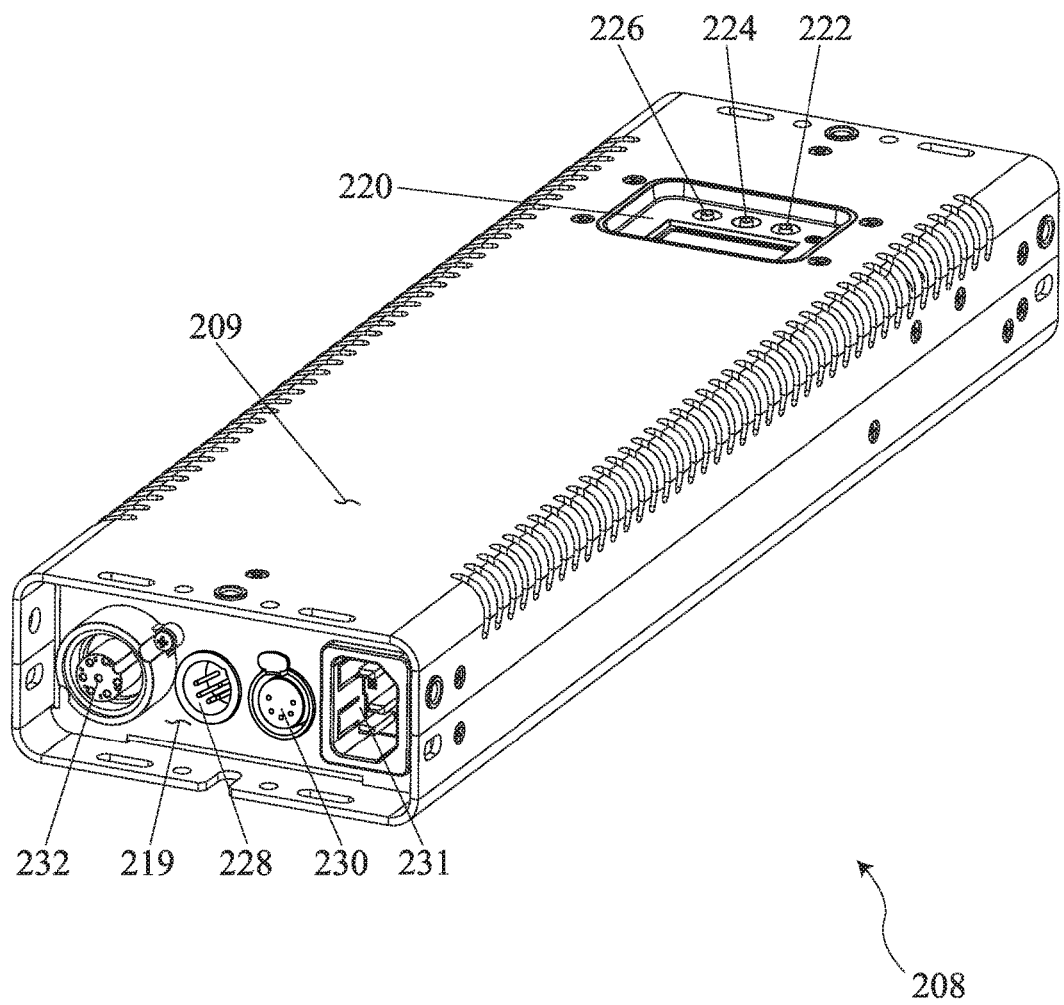
FIG. 11B is a rear, perspective view of the FIG. 11A controller.
Figure 11C:
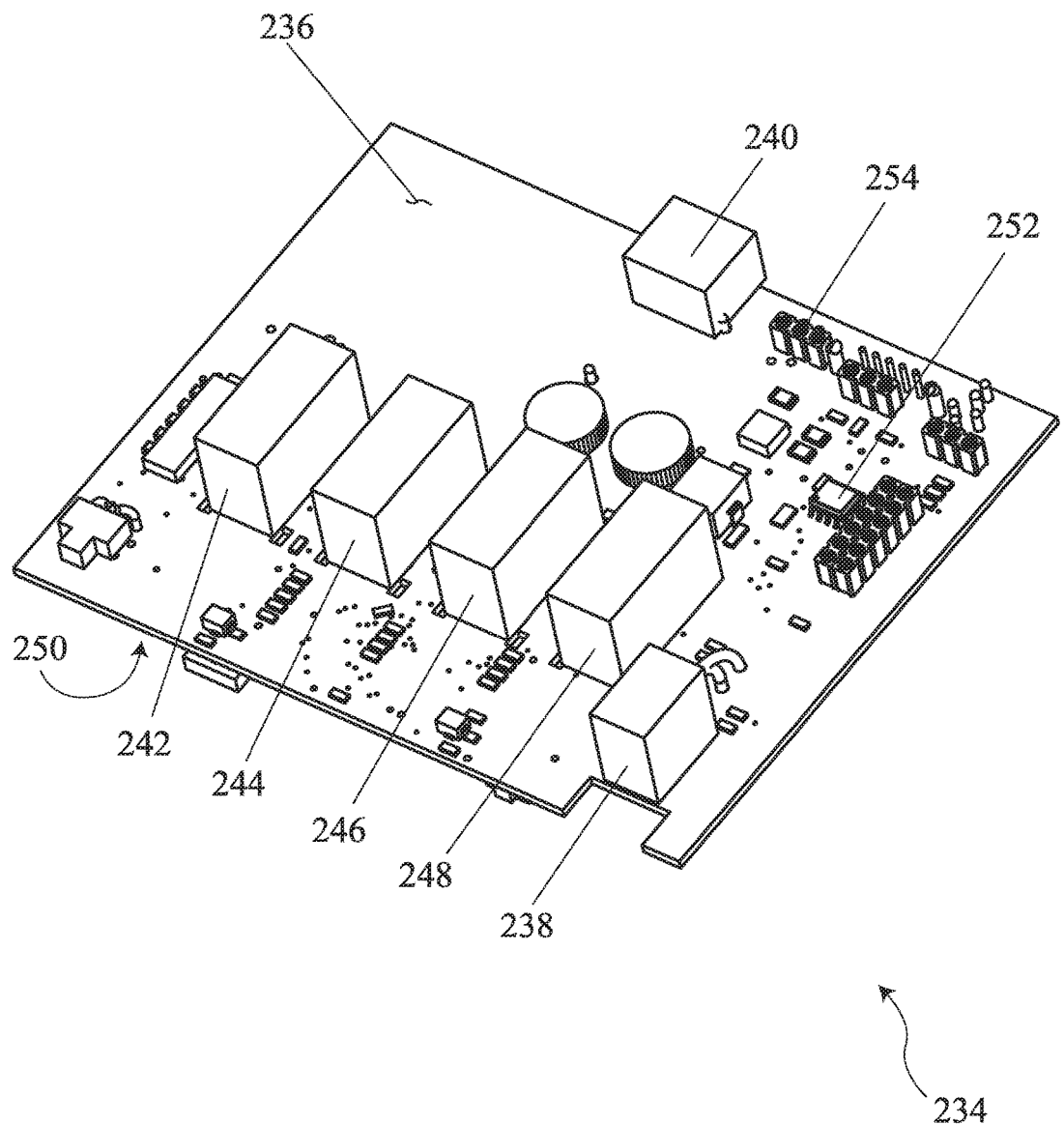
FIG. 11C is top perspective view of the FIG. 11A interface.
Figure 14:
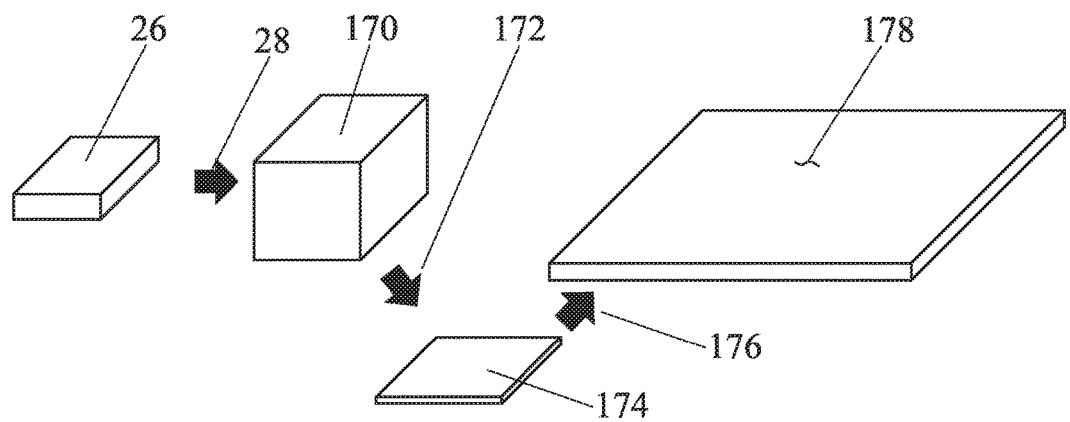
FIG. 14 is a schematic diagram of a preferred embodiment of the present system for use in the present process.

Referring to FIGS. 11A, 11B, 11C, 11D, 11E, 11F, 11G and 11H, details of the components a user interface, such as shown as interface 170 in FIGS. 8 and 14 are shown. In FIG. 11A an exemplary, preferred user interface 208 is shown enclosed in housing 209, having a front face 211 and several internal circuits. Interface 208 includes a three position power on/off switch 210 and rotary control dials at 212, 214, 216 and 218 for controlling each of four potentiometers mounted within the housing 209, as shown in FIG. 11C. Switch 210 is the main power on/off switch for the user interface 208. An internal, integrated power supply (not shown, but similar to FIG. 7 power supply 154) provides power to the user interface 208 and to the dimmer unit 174, as described below. The integrated power supply corresponds to power supply 30 as shown in FIG. 1, which corresponds to power supply 154 as shown in FIG. 7. User interface 208 combines some of the functions of DMX controller 34 and power supply 30 from FIG. 1. This power supply provides DC voltage for the control circuitry, which preferably would be at 5 volts DC, although other voltages could be used. Interface 208 also includes display 220 that is preferably a graphical OLED type display. Other types of screen displays, such as LCD, LED, etc., could be used and other types of control actuators could be used, so long as they function for their intended purpose(s). The interface also includes conventional mounting holes, not numbered, and three push buttons 222, 224 and 226 positioned on the top surface of the housing 209, adjacent the display 220, and that function to control the information displayed and to adjust settings. Display 220 provides several functions, including providing a graphical interface to adjust settings, to provide feedback information for the tactile control of the potentiometers, i.e., information about the current state of the hue, saturation, Kelvin values and intensity controlled by dials 212, 214, 216 and 218. Optionally, this information can be displayed on the screen for each value separately, or for all of the values simultaneously. Also, the information could be displayed during and/or immediately after a change is made to any of the values, such that the value(s) would be emphasized on the screen by enlarging the value(s), or displaying the changed value(s) to take up the entire screen view for a short period, so that during the changing of any value, identification and control would be easier. Modification of the control and display circuitry to provide such display variations is within the skill of a person ordinary skill in this field. The buttons 222, 224 and 226 preferably would be conventional push buttons that could function in any of a number of ways, such as a simple on/off button, or for incrementally changing or advancing values and navigating through display options. For example, one of the buttons could be used to select the camera type by scrolling through several options for different cameras and the selection of a particular camera would then enable certain, predesignated values to be used by the system when making color adjustments. Another of the buttons could be used to confirm and set the selection, and another button could be used to revert back to the main screen from the camera select screen.

Referring to FIG. 11B, a rear view of interface 208 is shown with rear or back face 219 and four panel-mounted connectors 228, 230, 231 and 232. Connectors 228 and 230 are mates, with 228 being a male, 5-pin XLR input connector and 228 a female, 5-pin XLR output connector, which are used and referred to as DMX connectors this field. In practice these connectors are in parallel, so that either connector could be used for input or output, and in the preferred embodiment one of the connectors is used and it is used for input for DMX protocol or other protocol signaling. Connector 232 is a 7-pin connector, referred to as a powerline 7 connector, sometimes referred in abbreviated form as a PL 7 panel-mount female connector. In the PL 7 connector, preferably 3 pins would be used for sending data signals (data plus, data minus and ground) and 4 pins would be used for DC voltage (2 pins for DC voltage plus and 2 pins for DC voltage minus). Connector 231 is the power connector. As will be appreciated by those skilled in this field, the number and size/capacity of the pins can vary, so long as enough pins of sufficient capacity to safely handle the current demands of the circuit are used.

Referring to FIG. 11C, a top perspective view of the circuit 234 and printed circuit board 236 of user interface 208 is shown. The circuit includes power switch 238 that corresponds to reference numeral 210 in FIG. 11A. Switch 238 is a 3-position rocker switch, with each position making contact at a different point, such as NKK rocker switch M2T13X001. In the present, exemplary embodiment, the switch is configured to function simply as an on/off power switch. Flipping the switch to "on" causes DC voltage from a power supply located elsewhere in the body of the user interface 208 (FIG. 11A) to enter through connector 240, such as Phoenix Contact fixed terminal block 5442565, where it would be stepped down, from e.g., 48 volts DC to whatever voltage is needed or designed to run the circuit, such as 12 volts or 5 volts DC. Conventional potentiometers 242 (hue), 244 (saturation), 246 (CCT) and 248 (overall intensity), such as ALPS RK097111T065 potentiometers, correspond to and are controlled by rotary dials 212, 214, 216, and 218, respectively, as shown in FIG. 11A. The signals generated by these potentiometers are converted into data streams by microprocessor/microcontroller 250, which is positioned on the opposite or bottom of the printed circuit board 236. Conventional power buffering and noise filtering components, such as capacitors are shown but not numbered on FIG. 11C. Microcontroller 250 receives the signals from the potentiometers and together with RS485 transceiver 252 converts these signals into a useable stream of serial data signals. The converted serial data stream is then sent through the output connector 254 shown in FIG. 11C and output connector 232 as shown on FIG. 11B.

Figure 11D:
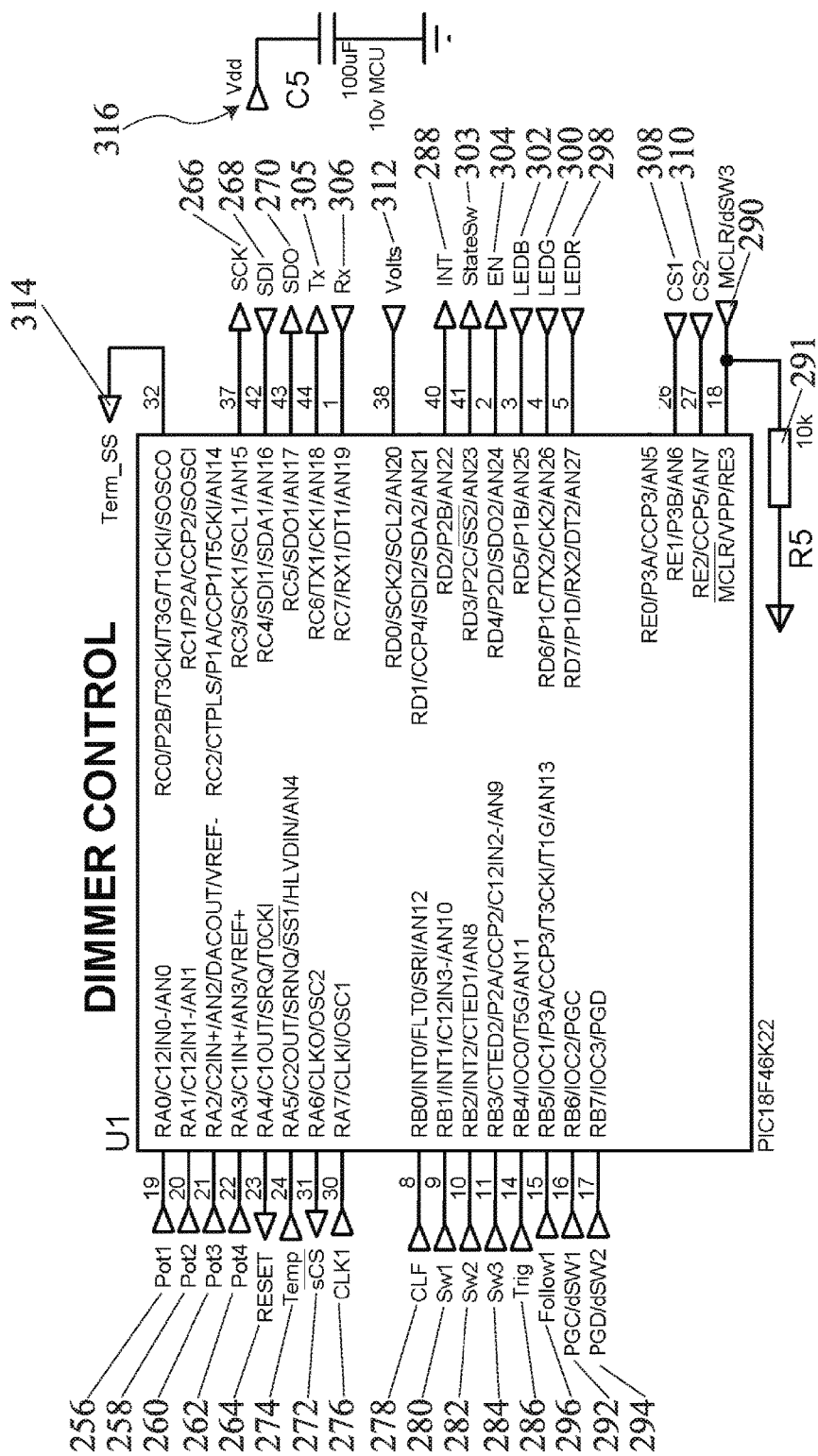
FIG. 11D is a schematic view of a preferred microprocessor configured for use in the presently disclosed system and process.

Referring to FIG. 11D, a preferred microprocessor, or dimmer control processor 254 (U1) is shown with reference numbers keyed to the present description of the system and with retaining alphanumeric signs from the manufacturer of the exemplary, commercially available microprocessor PIC18F46K22. The pin connections for potentiometers 256, 258, 260 and 262 (FIG. 11C), respectively are shown in the upper left area of FIG. 11D, and the processor 254 controls the resistance so that in this embodiment the voltage is maintained between 0 volts and 5 volts DC. Each potentiometers a simple divider circuit with a center wiper, such that turning the control dials 212, 214, 216 and/or 218 (FIG. 11A), respectively, changes the resistance within the voltage range of 0 to 5 volts in 1,023 steps or increments (in an 10-bit system). In the microprocessor 254, the corresponding microcircuits are analog-to-digital converters that convert the voltage into digital values that are then used by the software to conform the output digital data signals. Reset pin 264 functions to reset the LCD display, which is connected to the device at the pins that are used to display images on the device, including serial data clock pin 266 (SCK), serial data in pin 268 (SDI), serial data out pin 270 (SDO) and chip select pin 272 (sCS). Pin 276 (CLK1) is for the clock oscillator, which controls the frequency of the dimmer circuit to a very high degree of accuracy. Pin 274 is for monitoring the board temperature (Temp) and pin 278 (CLF) is the current limit flag that flags or tells the software to turn "off" the PWM outputs upon an over high current condition. Pins 280 and 282 (corresponding to switch 210 of FIG. 11A), 284 (corresponding to the programming switch 213 on FIG. 11A) and 286 (corresponding to 3.5 mm tip-ring-sleeve [TRS] input 217 shown on FIG. 11A, and is one of the two pins used for connecting to a remote input) are all external switches relating other controls for the device, such as the toggle switch, option select switch and trigger switches (remote trigger switch, input jack 217, such as would be connected to a conventional ⅛-inch 3.5 mm TRS connector, shown on FIG. 11A, and local trigger switch 213, and programming, push button 215 as also shown in FIG. 11A) that work together and are used to connect to a remote input (pins 286 and 288). In an exemplary embodiment, pins 288 and 286 work together with the remote control button switch. In an exemplary embodiment, the TRIG and ENT switches/pins 286, 288, respectively, work together to cause a change of state, such as a change from "HI" to "LOW". For example, a light could be made to turn "on" in response to the "HI" state and to turn "off" in response to the "LOW" state. Their functionality can be separated, as will be understood by one skilled in this field, because for example, in use as a remote camera shutter, which typically has two switches and a single, two-position button, these switches can be used to simply turn the shutter to "on" or "off" or "open" or "shut". The three push buttons 222, 224 and 226 on the display of FIG. 11A correspond to pins 290, 292 and 294 on the microprocessor. Referring to the follow pin 296, it could be programmed to provide, for example, 0 to 5 volts to, in turn, produce values 0 to 1023 (in an 10-bit system), that would represent some condition or thing that the light follows, such as music, or some other sound, or another light, how wet something is, etc. In other words, the follow pin is for special effects purposes and follows the course of or follows something else as that something else changes over time. Pin 304 is an enable pin that changes the function of the RS485 transceiver from a transmit state to a receive state. Tx pin 305 and Rx pin 306 are connected to RS485 and are used to transmit signals among the DMX controller, or other protocol controller and the light fixtures. For example, the signals transmitted and received could correspond to the net values of the light output, so that the microprocessor can make determinations such as whether a specific fixture is connected or not connected, current temperature, current speed, etc., as related to any specific fixture. Pins 308 and 310 are associated with local MOSFET drive control, and are analog voltage outputs that represent how much current is flowing through a (current sense) circuit. Pin 312 (Volts) is associated with another voltage divider circuit and indicates the current, external voltage drives the user interface. Pin 314 (Term_SS) controls the termination connection of the RS45 transceiver, and in some protocols, may be used as the head or master control. In an exemplary embodiment, state switch pin 303 is associated with the analog voltage that is controlled by a 3-position switch that may be used for a number of reasons, such as changing dimmer modes, for example. At pin 290 a 10 k pull-up resistor 291 is connected to the circuit and functions to ensure that in its normal state, pin 290 stays in a high state of 5 volts so that when a switch is pressed, the voltage goes from 5 volts to 0 volt. That pin 290 is connected to the microprocessor reset circuitry, and if pressed accidentally, the microprocessor can be reset. Also shown connected to the microprocessor circuit is noise filter circuit 316, using a 100 µF capacitor, also referred to as a bypass capacitor and which also functions to keep the incoming voltage to the microprocessor to be DC voltage.

Figure 11E:
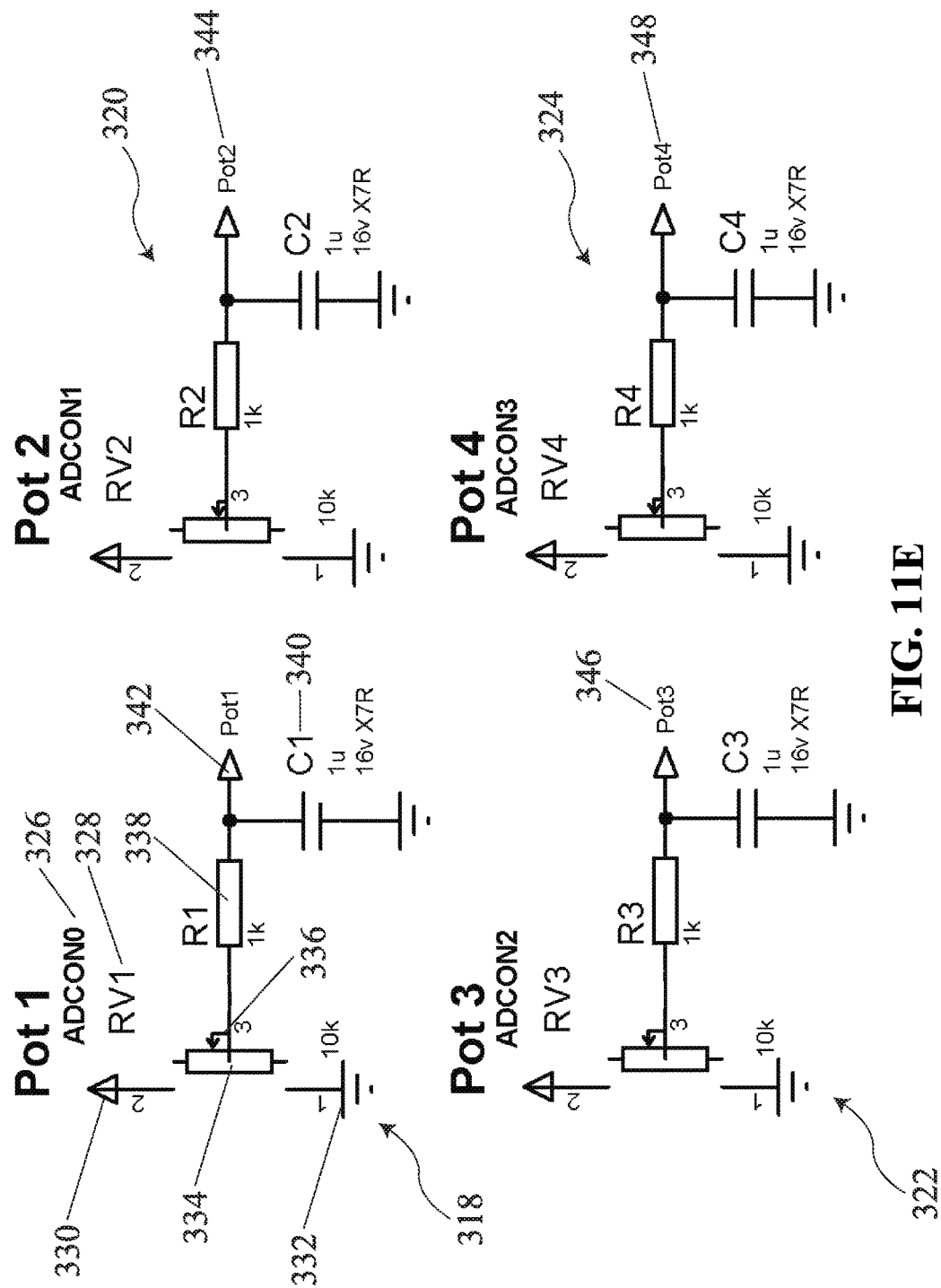
FIG. 11E is a circuit diagram for the potentiometers of the preferred embodiment.

Referring to FIG. 11E, circuits for the four potentiometers are shown. Circuit 318 for potentiometer 1 (Pot 1), 320 for Pot 2, 322 for Pot 3 and 324 for Pot 4. These circuits correspond to the signals or pins 256, 258, 260 and 262 shown in FIG. 11D, to the physical potentiometers 242, 244, 246 and 248 shown in FIG. 11C and to the control dials 212, 214, 216 and 218 shown in FIG. 11A. Each of these four potentiometer circuits preferably have the same components, and control current in a similar way, but differ in what parameter(s) they control, as apparent from the description herein. Thus, the components of circuit 318 will be described, and such description will apply to the other three potentiometer circuits 320, 322 and 324, as will be understood by those skilled in this field. The label "ADCON0" 326 refers to and means that the circuit includes an analog to digital converter and the last digits refer to the four potentiometers numbered "0", "1", "2" and "3". Referring to circuit 318, the circuit includes RV1 at 328, digital signal out indicated at 330, connection to ground 332, wiper resister 334 variable from 0 to 10 k Ohms and its wiper 336, 1 k Ohm resistor R1 at 338, output signal connection 342 to the Pot 1 pin 256 on the microprocessor 254 shown on FIG. 11D, and 1 µF, 16v X7R bypass capacitor C1 at 340. Each of these circuits controls the speed at which the analog-digital conversion takes place, the resolution, and alignment left or right, as will be appreciated by those skilled in this field.

Figure 11F:
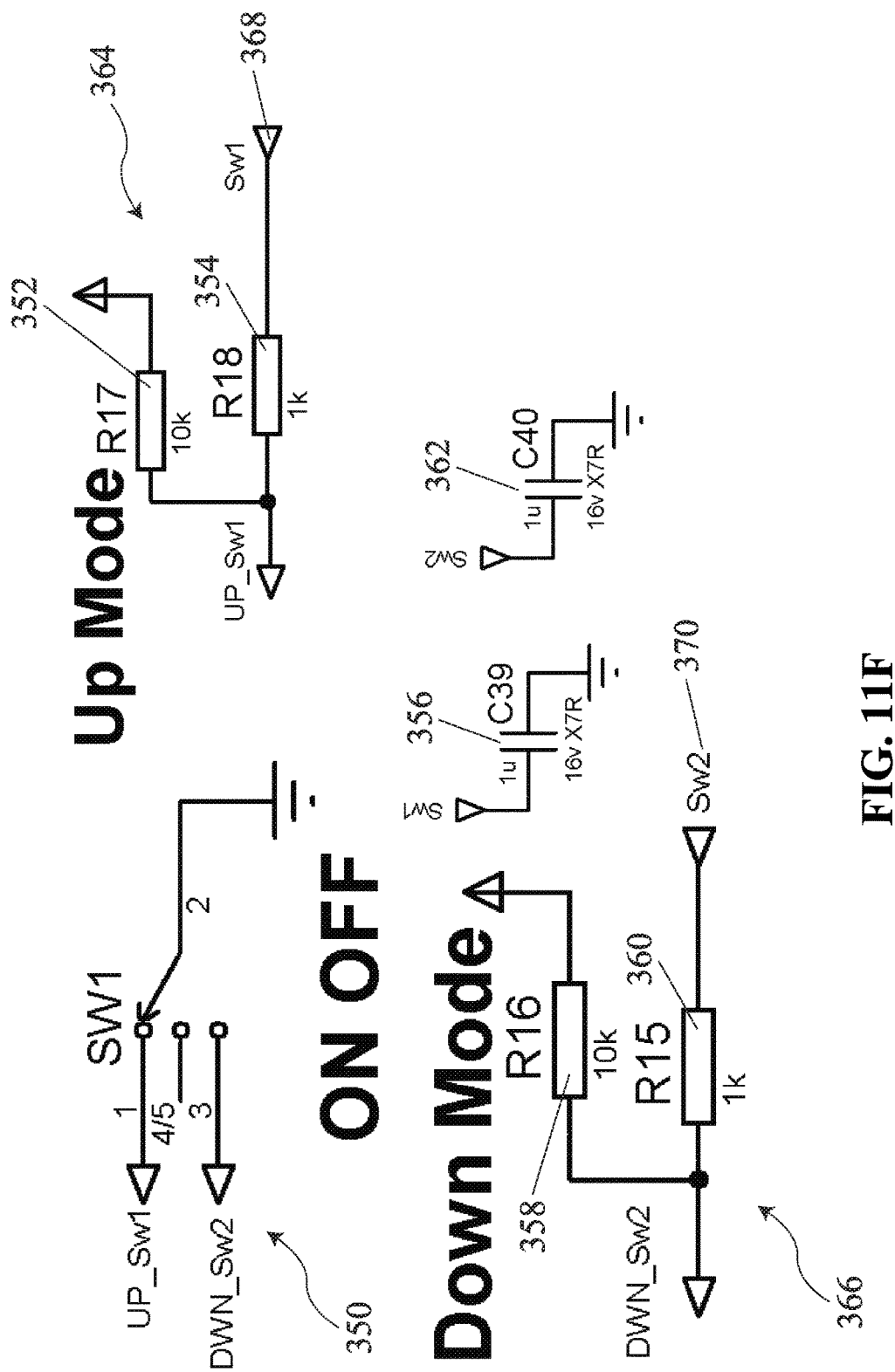
FIG. 11F is a circuit diagram for a preferred power switch of the preferred embodiment.

Referring to FIG. 11F, the circuitry for an exemplary power switch, or multiple state or multiple input switch 210 of FIG. 11A is shown as a 3-position switch 350 configured for two functions or modes. In the upper left drawing the switch is shown with an arrow pointing approximately 45-degrees up to connect to UP_Sw1, which places the circuit in the Up Mode shown on the upper right at 364. Connection 368 in the Up Mode area of FIG. 11F corresponds to SW1, which is pin 280 on FIG. 11D. Flipping switch 350 to the downward position, making contact with the lower contact places the circuit in the Down Mode shown at 366, and connection 370 in the Down Mode area of FIG. 11F corresponds to SW2, which is pin 282 on FIG. 11D. In this embodiment, the middle position of switch 350 is not connected. R17, shown at 352 is a pull-up resistor that keeps the microprocessor output (UP-Sw1) pin "HI", unless it is connected, which then pulls the output to "LO". R18, shown at 354 reduces the current flow through the microprocessor, as will be understood by those skilled in this field. A noise reduction circuit 356, including capacitor C39, preferably identical to that used with the potentiometers is also connected, and it also functions as a "debouncer," so that during switching the microprocessor sees, that is, is exposed to only a single state change, and reacts to that state change, rather reacting to any bounced signal(s) that might otherwise be created. In the Down Mode circuit 366, resistors R16, shown at 358 and R15, shown at 360, and debouncer circuit 362 are shown having analogous functions as in circuit 364. In one exemplary system, the middle position indicates that the circuit 210 is off in the off position, the up position places the circuit in the Up Mode and the down position places the circuit in the Down Mode. For example, in the Up Mode the circuit could be set to receive and act on input from the potentiometers, and in the Down Mode, to receive and act on DMX input 228 (or control input based on some other protocol) as shown in FIG. 11B. In general, the Up Mode and Down Mode circuits permit the system to input into the microprocessor different types of signals, and to provide input signaling for further processing by the software implementation of the system. For example, in one embodiment, placing the switch 210 in the middle position, the system could interpret the position to be the "Off Mode", and could turn off the display, set the PWM to 0 so the that PWM modules would be turned off, and the control commands to the fixtures would place them at 0 volts, or "off". So, in this instance the switch 210 would act like an "on"/"off" power switch, but would not directly open or close the power circuit to the fixture(s), as would be understood by those skilled in this field. Alternatively, the system could be adapted so that Up Mode would function for color compensation with no desaturation, and so that the Down Mode would function for desaturation with no color compensation.

Figure 11G:
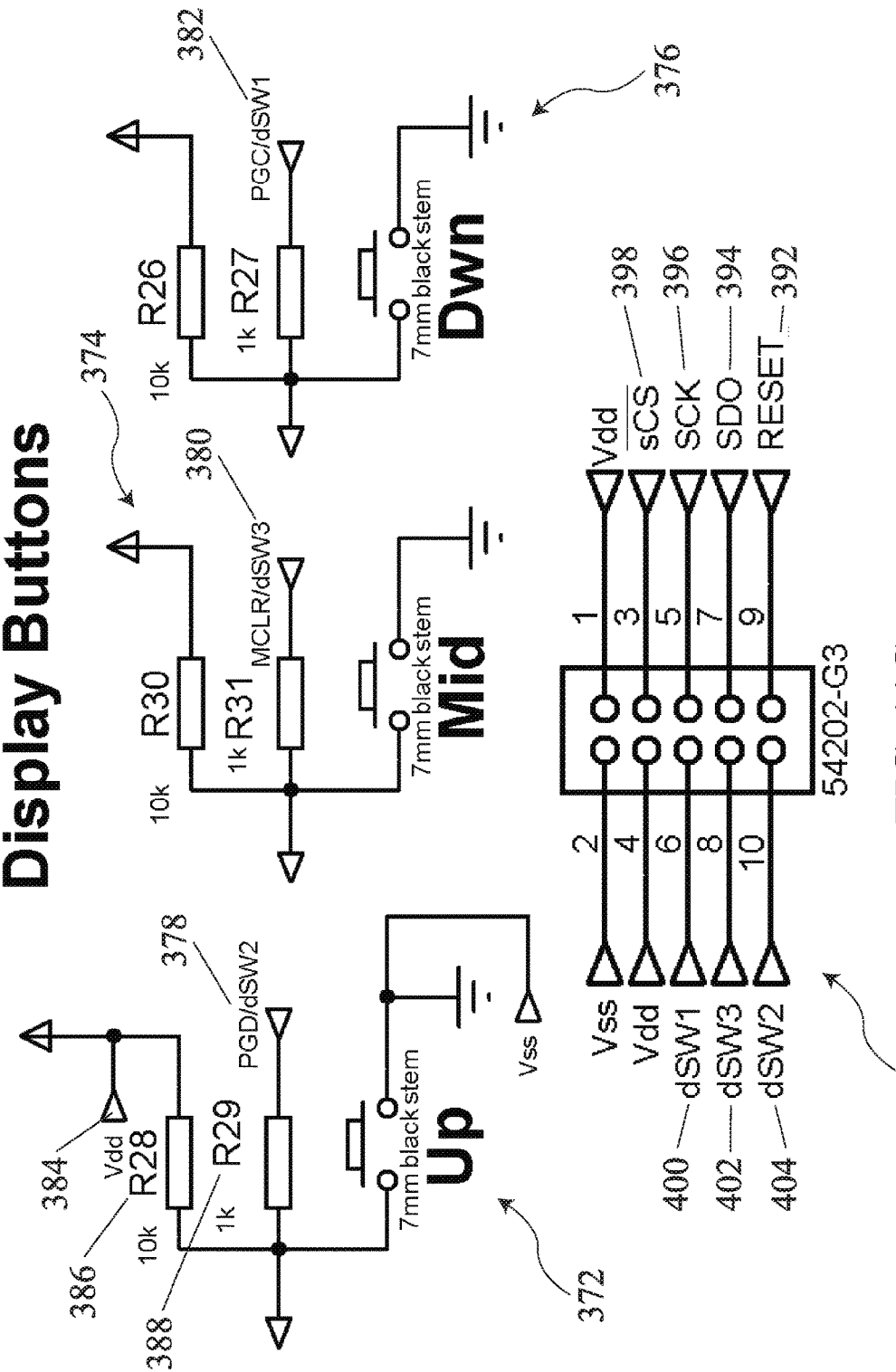
FIG. 11G is a circuit diagram for the circuits associated with the display buttons of the preferred embodiment.

Referring to FIG. 11G the circuits associated with display buttons or switches 222, 224 and 226 (shown in FIGS. 11A and 11B) are shown and will be described. The signals generated by these buttons are shown at 378, 380 and 382 in FIG. 11G and correspond to the pins at 290, 292 and 294 on FIG. 11D. All three switches are of the same construction, and only one of the switches, Up switch 378 will be described in detail. The up arrow is connected to Vdd at 384, the drain voltage of the circuit, which in this embodiment is 5 volts. R28, shown at 386 is a pull up resistor, and R29, shown at 388 is a current limiting resistor that limits the current flowing into the microprocessor, shown at 378 on FIG. 11G, and which corresponds to pin 294 on FIG. 11D. The circuits 374 and 376 have similar components, function in a similar way and are connected to pins identified in FIG. 11D, as will be understood by those skilled in this field. FIG. 11G also shows connector 390, which functions as a printed circuit board for the display components of the interface 208 and provides connection to the main circuit board of the interface 208 through a cable. Reset pin 392 interfaces with reset pin 264 on FIG. 11D; serial data out, SDO pin 394 interfaces with SDO pin 270 on FIG. 11D; serial data clock 396 interfaces with serial data clock 266 on FIG. 11D; chip select 398 corresponds to chip select pin 272 on FIG. 11D. Simulation switches dSW1 at 400, dSW2 at 404 and dSW3 at 402 correspond to buttons 376, 374 and 372 shown in the upper section of FIG. 11G. Vss and Vdd refer to the source voltage and the drain voltage, that is, the plus voltage and the minus voltage in the system Referring to FIG. 11H, the RS485 transceiver circuit 406 is shown, and functions to process incoming data streams and to output PMW values, plus (+) and minus (−) at outputs 416 and 418, respectively. In the preferred embodiment shown in FIG. 11H, the out data streams are in the preferred, 16-bit, prospective commercial embodiment of the current system, tentatively intended to be marketed as LiteNet™ brand protocol, with corresponding + and − signals, as described herein, as shown in Appendix 1. As will be appreciated by those skilled in this field, the output signals also can be conventional 8-bit signals based on conventional DMX protocol communication, or can be in accordance with other communication protocols, as will be understood by those skilled in this field. Transceiver U12, shown at 408, includes several connections or pins: RO (receive out); RE (receive enable); DE (transmit enable); and DI (transmit input). The Tx pin 410 on FIG. 11H corresponds to/connects to Tx pin 304 as shown on FIG. 11D; the EN pin 412 corresponds to EN pin 304 in FIG. 11D; and, Rx pin 414 corresponds to Rx pin 306 on FIG. 11D. Pins A and B are the DMX− and DMX+ (or other protocol, such as the preferred 16-bit protocol) signal pins in which the A pin and the B pin are opposite in direction/polarity from each other, such that when pin A is high, pin B is low, and vice versa. For the purpose of using DMX protocol, the enable pin is held low and it receives DMX signals. In the case of the preferred 16-bit protocol (sometimes referred to the prospective, LiteNet™ brand protocol herein), the enable pin is preferably held high, and transmits until a coded message is sent to the transceiver, telling it that there is a message to be received from the light source, such as the temperature, current voltage, etc. The circuit shown at 420 is a bypass capacitor circuit for the transceiver. Transceiver 408 is a conventional, commercially available Maxim Corporation MAX487 brand transceiver shown in the FIG. 11H embodiment, and which corresponds to component 252 shown in FIG. 11C. Conventional transient voltage suppressor circuit 422 functions somewhat like a Zener diode, in which the voltage on pins A and B cannot exceed a certain value that would cause damage to the transceiver, and if the voltage exceeds that predetermined value, the voltage would be discharged to ground. R72 at 426 and R73 at 424 are each 10 Ohm, 1206 size resistors, and R74 at 428 is a 120 Ohm, 1206 size termination resistor that is connected to the negative data signals. In the preferred 16-bit protocol of the present embodiments, the termination resister is preferably always connected because it is the head end of the RS485 loop. In the FIG. 11H embodiment, the suppressor circuit 422 is commercially available as a separate component, shown labeled as D14 and available in different voltages such as 5 volts, 10 volts, 12 voles, etc., and here shown as a SM712 brand voltage suppressor.

Potentiometer controls shown in FIG. 11A and their associated potentiometers and circuits shown in FIGS. 11B-11H function to control or change the hue (control 212), the saturation (control 214), the CCT Kelvin temperature (control 216) and overall intensity (control 218) as described herein. Controls 212, 214, 216 and 218 and their associated potentiometers control a range of values from zero to the maximum value, with the number of increments and the total value depending of the system design, such as an 8-bit, the presently preferred 16-bit or 32-bit system protocols. For example, in the preferred, 16-bit protocol system, the values would range from 0 to 65,535, which in terms of hue, or a color wheel, would generate signal values from 0 degrees to 360 degrees, as will be understood by those skilled in this field. In considering control 212 that controls the hue, the 0 value (or 0 degree) would correspond to fully saturated red and a value near the maximum value of 65,535 value (or 359 degrees) would correspond to red magenta. Also, in the case of control 218 that controls intensity or brightness of the light output, the 0 value would correspond to zero current flowing through that part of the circuit to the LED(s) and the maximum value would correspond to the maximum current or power flowing through that part of the circuit to the LED(s), such as the nominal 1 Watt of power used in several examples described herein.

Control 212 and its associated potentiometer 242 functions to pick the fully saturated hue or color that is output from the lighting panel (red, green, blue and mixtures of red, green and blue as found in the color wheel). For example, a control 212 value of about 33% of maximum, corresponding to about 120 degrees on the color wheel, would result in a green color or hue; and a value of about 66% or about 240 degrees would result in a blue color. Increasing the control 212 value to about 359 degrees would eventually result in a color that is a shade just under red. In other words, operation of control 212 would correspond to picking a color on the color wheel, so that the control 212 functions essentially as a color picker. Control 216 and its associated potentiometer 246 function to pick the particular white color (cool, warm or intermediate white) in degrees Kelvin or CCT. For example, if control 216 was set to the 0 value, that would correspond to 2,660 Kelvin white, or Tungsten) and if set to the maximum value of the potentiometer, then the LEDs would output 6,000 Kelvin (cool or daylight) white light. In other words, control 216 picks the exact CCT or Kelvin color temperature of white light to be emitted from the lighting panel. Control 214 and its associated potentiometer 244 function to cross fade between the chosen hue or color and the chosen white light, that is, to control desaturation of the chosen color in terms of the chosen CCT value and the chosen amount or percentage of white light in comparison to the amount of the chosen saturated color. In other words, control 214 reduces the intensity of the chosen hue or color as it increases the intensity of the chosen color temperature of white light. The cross fade circuitry can be set to reduce the intensity of the hue and increase the intensity of the chosen white at the same rate, at different rates, at a linear rate or at a non-linear rate, while maintaining the total power output of the lighting panel constant, as will be understood by those skilled in this field and as described herein. In short, operation of controls 212, 216 and 214 results in a chosen color at a chosen degree of saturation/unsaturation. Once that chosen color at the chosen degree of saturation is produced, then control 218 and its associated potentiometer control the intensity or brightness of the light output from the lighting panel. A 0 value for control 218 means that no power is supplied to the LEDs and no light is produced. A high value, such as 100%, means that 100% of the current or power needed to produce that color maximum intensity will flow through the circuit and through the LEDs. In other words, once a particular color and desaturation level is chosen using controls 212, 214 and 216, then the brightness of that chosen color is controlled by control 218 and its associated potentiometer.

Referring to FIGS. 12A through 12F, lighting control circuit 430, commonly referred to in this field as a "dimmer circuit", "dimmer unit" or "dimmer", and adapted for use in the present system is shown. Dimmer unit 430 corresponds to the dimmer unit 174 shown in FIG. 8 and the dimmer unit 174 shown in FIG. 14, and is a printed circuit board. The dimmer unit circuit board is encased within a housing (not numbered), and includes components and capabilities adapted to enable the presently described color compensation system. With reference to FIGS. 11A-11H, the output signals from the user interface 170, using the chosen communications protocol (8-bit DMX or the preferred 16-bit LiteNet™ brand protocol, for example) are the input data signals to the dimmer circuit 430. In the preferred embodiment a 16-bit protocol is preferred because it offers much greater resolution than an 8-bit protocol. For example, an 8-bit system has $2^8$ or 256 steps and a 16-bit system has $2^{16}$ or 65,356 steps, or degrees of resolution. Creation and use of a 16-bit protocol, based on the principles of an 8-bit protocol and general knowledge in this field is within the skill of a person skilled in this field. From a hardware perspective, many 16-bit components are commercially available, but at present some hardware components used in the presently disclosed system are limited to 10-bit communications. Therefore, some of the communications in the presently preferred system must be converted to and use a 10-bit communications protocol due to hardware limitations, as will be appreciated by those skilled in this field, and could be converted to 16-bit or higher resolution communication protocols, upon availability of 16-bit or higher hardware capability. For these reasons, while the present system preferably uses a 16-bit communication protocol, it can also use conventional 8-bit DMX protocol-based communication, and in some aspects uses a 10-bit communication protocol.

Figure 11H:
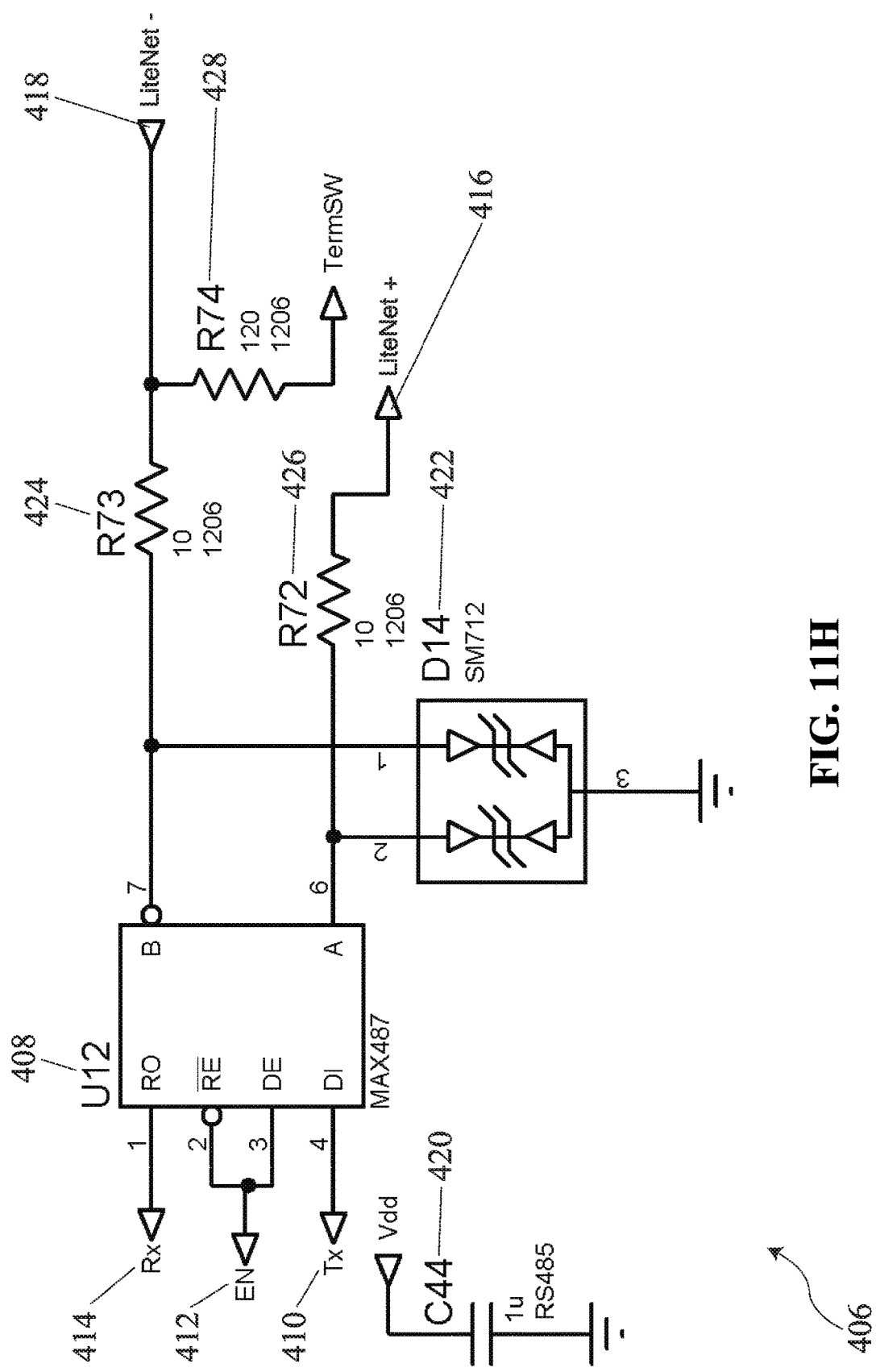
FIG. 11H is a circuit diagram for an exemplary, preferred transceiver circuit of the preferred embodiment.

The − and + data output signals as shown in FIG. 11H are transmitted preferably by wire to, and enter the dimmer unit 430 housing through the holes 436 and 438, respectively. Holes 432 and 434 permit access for DC− and DC+ power, respectively, that is used to power the components in the dimmer unit, and preferably, to power the LEDs on the lighting panel 178. The data and the power are transmitted on the wire that is connected to output 232, as shown in FIG.

Figure 12A:
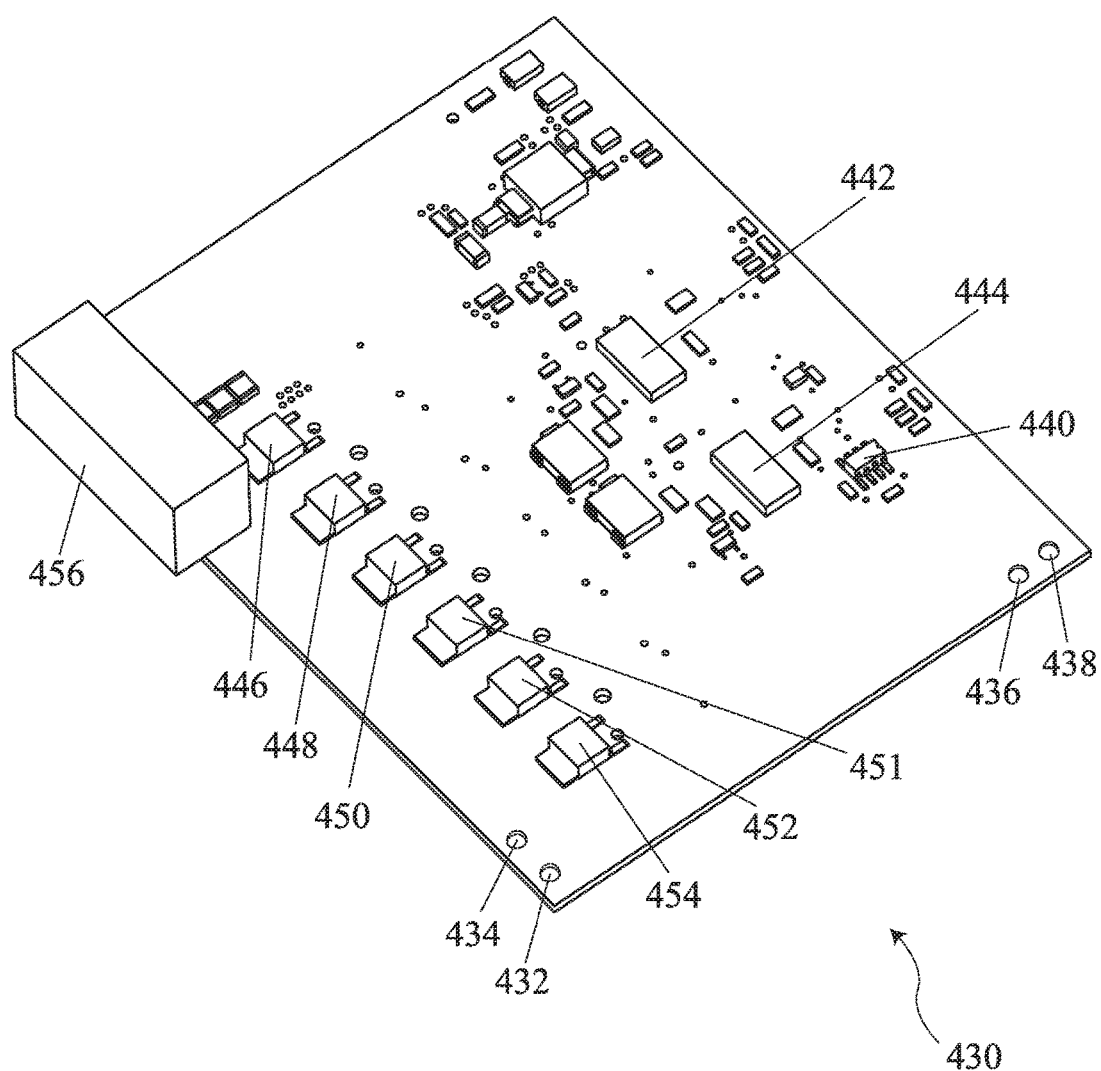
FIG. 12A is a front, top perspective view of a preferred dimmer unit for use in the present system and process.

11B. The incoming data is processed by RS485 transceiver 440, and converted into a single, up or down rolling signal data stream having its own communications protocol, as provided in Appendix 1. The data stream output from transceiver 440 is then sent to microprocessors 442 and 444. These microprocessors may be, and preferably are the same model as microprocessor 250 shown in FIG. 11C. The dimmer circuit microprocessors 442 and 444 send out PWM values or signals to MOSFET drivers that amplify the signals and then send them to MOSFETs 446, 448, 450, 451, 452 and 454 as shown in FIG. 12A, one MOSFET for each of the six colors. Each microprocessor controls or is associated with processing the signaling for three colors. Therefore, with the preferred embodiment using six colors, two microprocessors are used, and each controls three MOSFETs.

Because the outputs of the MOSFETs are PWM values, they control the intensity of the LEDs by turning them on/off for time(s) that correspond to intensity. For example, if the control signaling commands the intensity to be 100% for a particular LED or group of LEDs, then the MOSFETs provide power 100% of the time for a given duty cycle. Similarly, if the LEDs are to be at 50% intensity, the MOSFETs would provide power to the LEDs 50% of the time for a given duty cycle, and this would result in the appearance of the LEDs operating at 50% brightness or intensity. In the present, exemplary six-color lighting system (R, G, B, A, cool W and warm W), six MOSFETs are used, and in systems having a different number of colors, the number of MOSFETs would, preferably, be the same number as the number of colors. The output of the MOSFETs in circuit 430 is connected to a multi-position connector 456. The presently preferred connector 456 is a Phoenix-8 brand, 8-position connector commercially available from Phoenix Corporation. Connector 456 directly interfaces with the LEDs. In the preferred embodiment, dimmer unit 430 is attached to the back of the LED lighting panel 178.

Figure 12B:
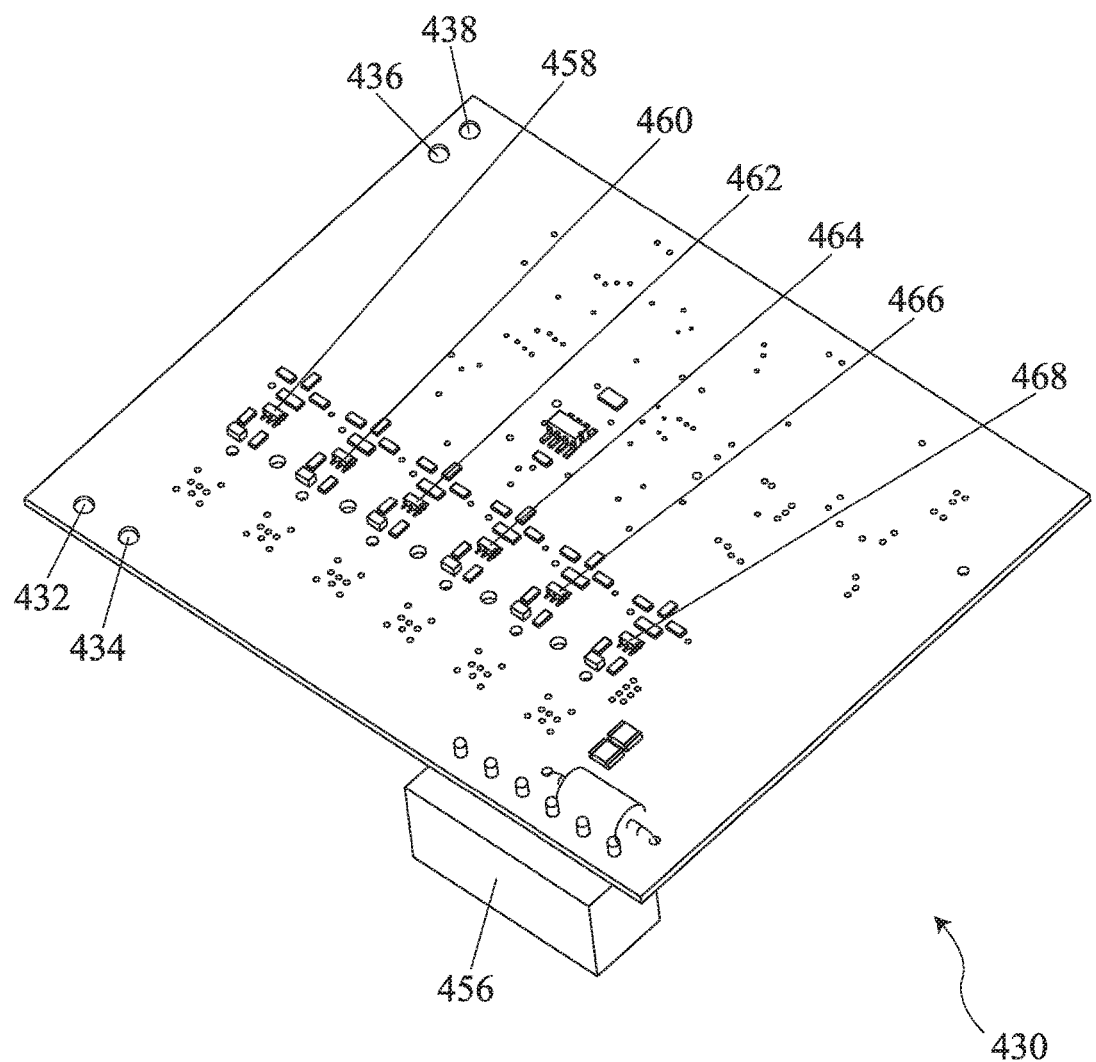
FIG. 12B is back or underside, perspective view of the FIG. 12A dimmer unit.

Referring to FIG. 12B, a perspective view of the underside or back side of dimmer unit 430 is shown. Inputs to the MOSFET drivers are shown at 458, 460, 462, 464, 466 and 468, and are described in detail with respect to FIGS. 12E and 12F. The output connector 456, the power input holes 432 and 434, and the + and − PWM value data signaling input and output holes 436 and 438 are also shown.

Figure 12C:
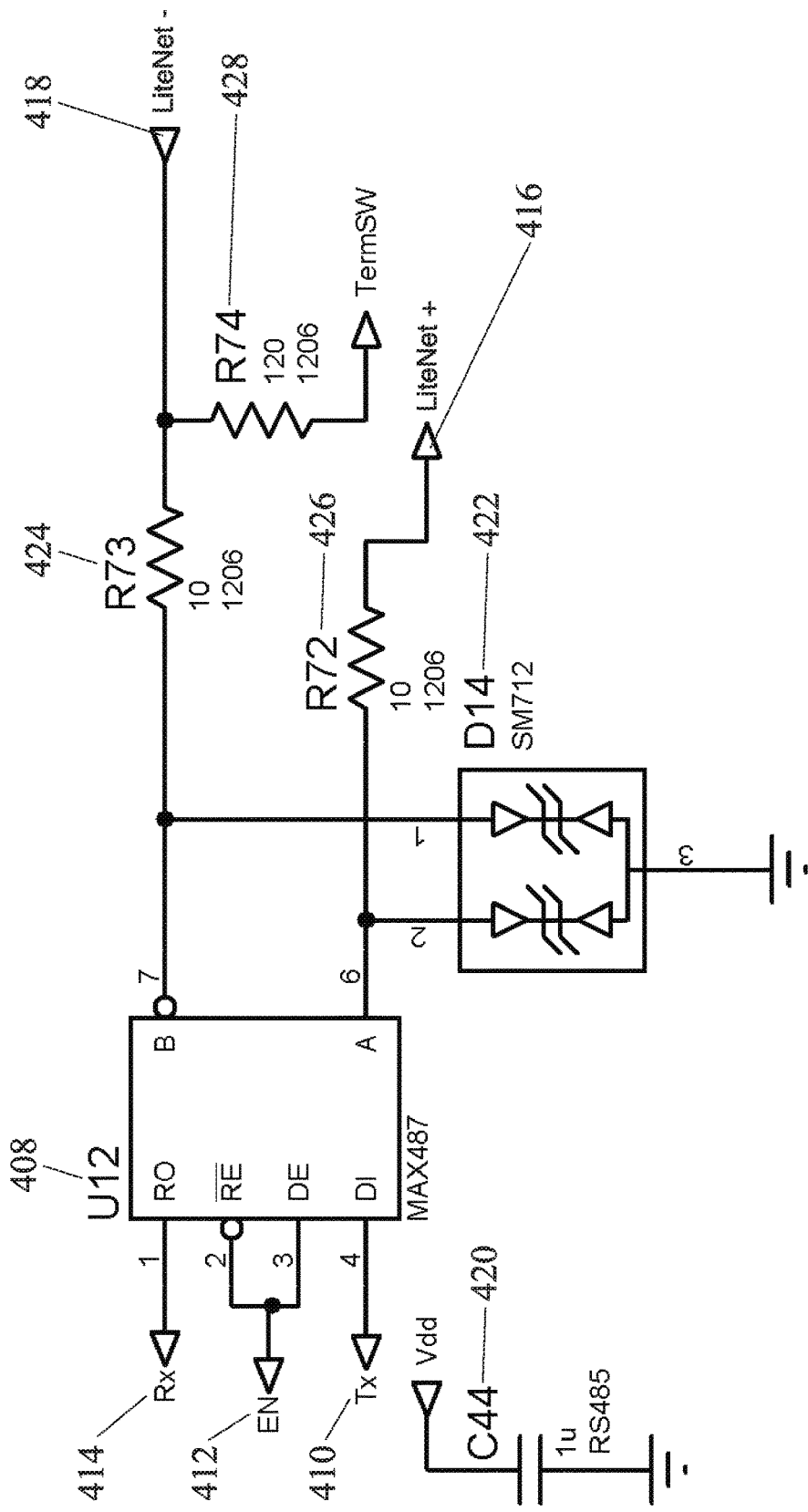
FIG. 12C is a circuit diagram for a preferred dimmer unit transceiver circuit for use in the present system and process.
Figure 12D:
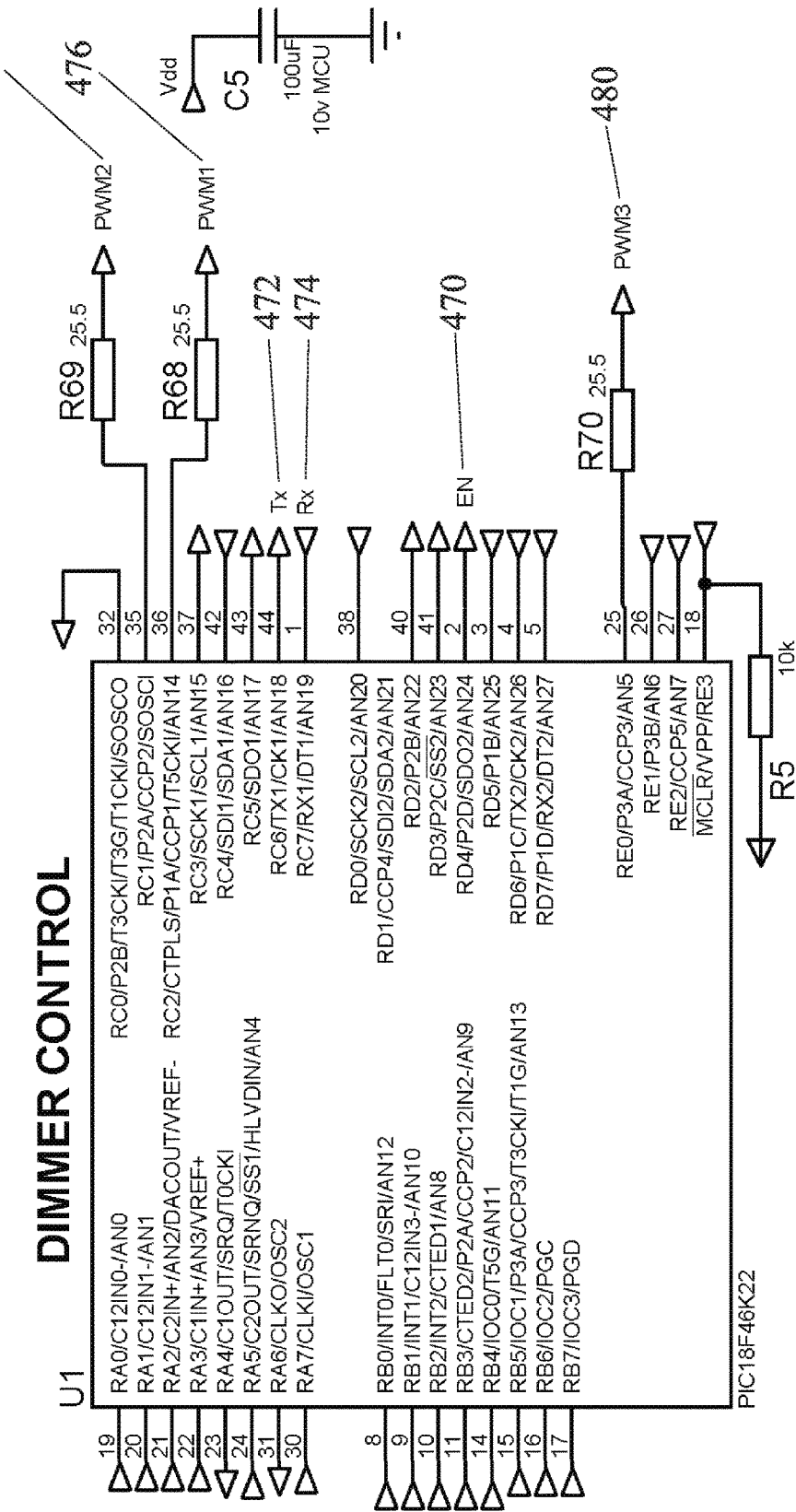
FIG. 12D is a circuit diagram for a preferred dimmer unit microcontroller and circuit for use in the present system and process.

Referring to FIG. 12C, exemplary MOSFET driver circuit 406 is shown, including an RS485 transceiver chip 408 (U12). This circuit is essentially the same as shown in FIG. 11H, and as described with reference to FIG. 11H. The receiving parts of the transceiver are at 414 (RO) and the enable signal at 412, where the + signals 416 and the − signals 418 (FIG. 11H) are received. The transmitting parts are at 410 (DI) and 412 (DE) through the enable pin (EN). When, for example, the user interface from FIG. 11D is enabled to transmit, the dimmer unit, FIG. 12D enable would be low, so that it could receive. Likewise, there would be no transmission from 472 on FIG. 12D because microcontroller 254 from FIG. 11D would be transmitting. No signaling would be coming over 472 on FIG. 12D, but signaling would be coming in, as 414 shown in FIG. 12C, i.e., signaling from the RS485 transceiver and going to pin 474 on the microcontroller. The signal is then decoded in the software, and expressed, as in accordance with one of the algorithms described herein, for example in FIG. 15, as PWM signals, either "HI" or "LO". When, for example, an enable, 0 or 5 volt signal arrives HI, as shown in FIG. 12D, such as a "0" signal tells the circuit to not enable transmit. Then the connection at 410 (DI) does not transmit any signal. As is apparent from this example and FIG. 12C, during normal operation, when one of the two transceivers is transmitting data, the other is receiving the data, and vice versa.

Referring to FIG. 12D, dimmer control microprocessor/microcontroller 254 is shown. For a six-color lighting system, the dimmer unit 430 would have two of such microprocessors, one for each of the three colors. Each microprocessor is, in the preferred exemplary embodiment, the same type/model of microprocessor as shown in FIG. 11D, but uses pins for different functions than are used in FIG. 11D. As shown in FIG. 11D, the microprocessor is used primarily for processing user interface signals. As shown in FIG. 12D, that exemplary microprocessor is used take the output from the FIG. 11D circuit, process them into PWM control signals and then sends the PWM control signals to the MOSFET drivers, and ultimately to the LED lighting panels. The FIG. 12D microprocessor includes pin 470 for an enable signal, transmit pin 472, receive pin 474, and pin outs for three PWM values, one value for each of three colors (being PWM values at 476 (PWM1), at 478 (PWM2) and at 480 (PWM3). The second microprocessor would output the PWM values for the other three colors.

Figure 12E:
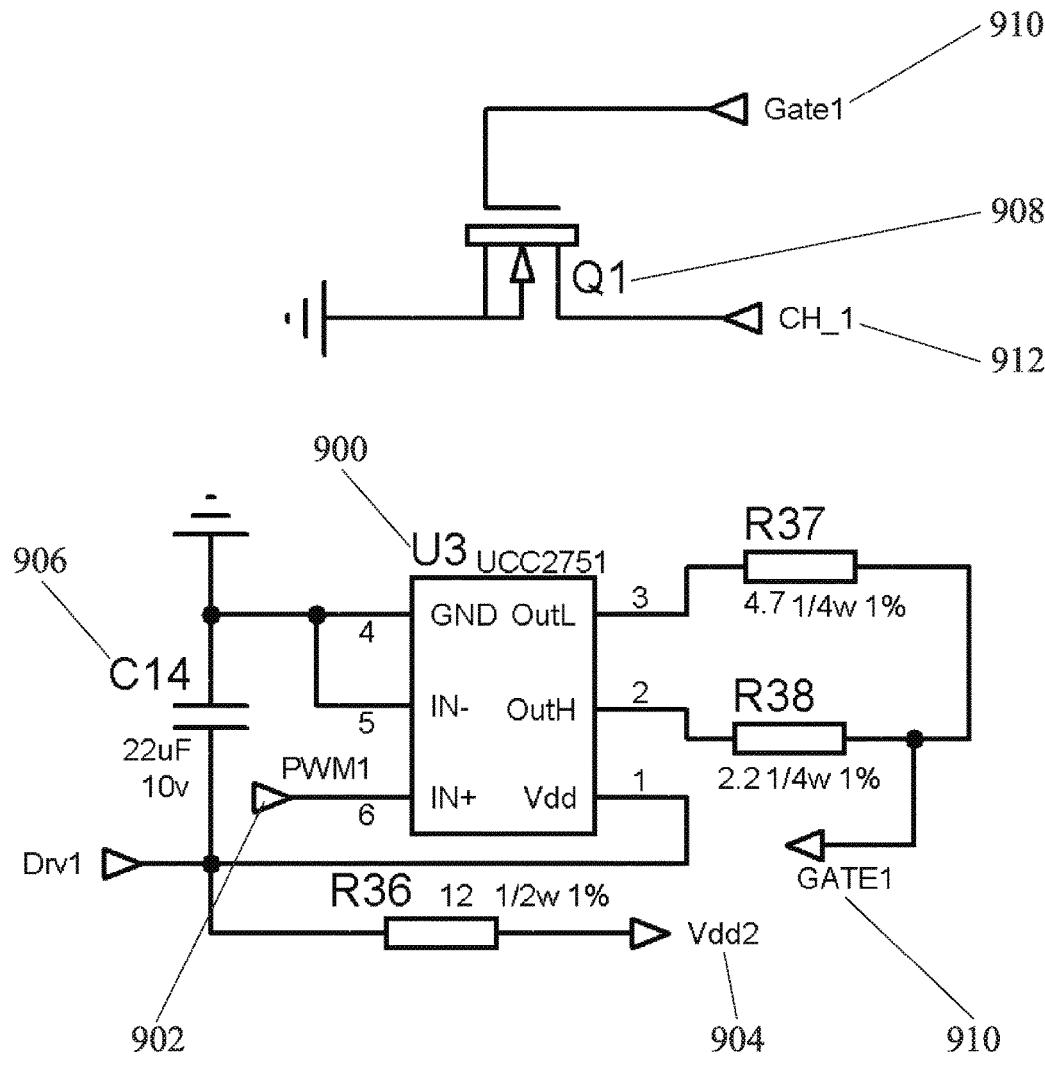
FIG. 12E is an exemplary, preferred circuit diagram for a MOSFET driver circuit for use in the present system and process.

Referring to FIG. 12E, an exemplary "low side" MOSFET driver circuit 914 and MOS 908 are shown. Driver circuits and MOSFETs for the other colors function in the same way. The exemplary PWM1 signal 902 (0 to 5 volts) goes into driver microprocessor 900 (U3) at the input +1 (designated as "IN+"). This means that not an inverted signal, i.e., that the polarity of output 476 shown in FIG. 12D and the polarity of the FIG. 12E input match, both + or both −. Microprocessor 900 (U3) is powered by voltage 904 (Vdd2), and charges capacitor 906 sufficient to drive the MOSFET 908 (Q1) when the capacitor discharges according the control signaling. When the capacitor 906 discharges, then current flows out of gate 910 of the MOSFET 908 and flows into resistor R38. MOSFET 908 shown in FIG. 12E is for one of the colors, and is replicated for the other five colors. The six MOSFETs are shown in FIG. 12A as 446, 448, 450, 451, 452 and 454. Referring again to FIG. 12E, channel signal 912 is a low side signal to an LED, brought in from connector 456, as shown in FIGS. 12A and 12B, where the LEDs make contact with and receive instructions from the dimmer unit 430.

Figure 12F:
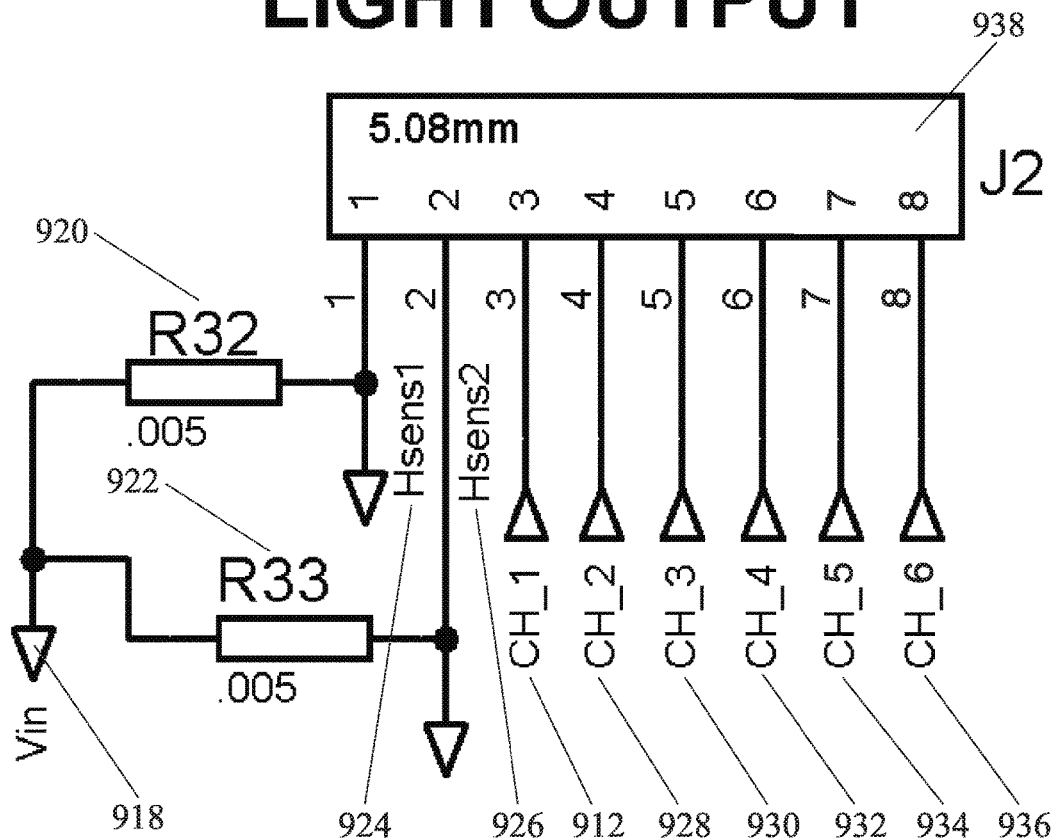
FIG. 12F is an exemplary, preferred light output circuit for use in the present system and process.

Referring to FIG. 12F, light output circuit 916 includes an 8-pin connector 938, which in the exemplary embodiment is a commercially available, Phoenix brand 1575284, 5.08 mm connector (also labeled J2 in FIG. 12F). Connector 938 functions to enable connecting signals for all six colors and two voltage sense signals for determining current flowing through the circuit. Power at the chosen voltage, such as 12, 24, 48 volts etc., enters at 918, and then passes through resistors 920, 922 and current sensing connections 924, 226, which are connected to the anode side of the circuit, at 918 (Vin). The current sense signals are connected to the microprocessor, so that the microprocessor can quickly turn the system off upon sensing an over current condition. The other six connections, 912 (red), 928 (green), 930 (blue), 932 (amber), 934 (warm white), 936 (cool white) are connected at the cathode side of the circuit, and connect directly to the LED strings at their cathodes. In this preferred, exemplary embodiment a common anode is used, so that all of the LEDs share the same part of the circuit. As one of the respective MOSFETs (one for each color) turns on, it connects the respective signal line to ground, which causes current to flow to the respective LED and to light up (turn on) that LED.

Figure 13:
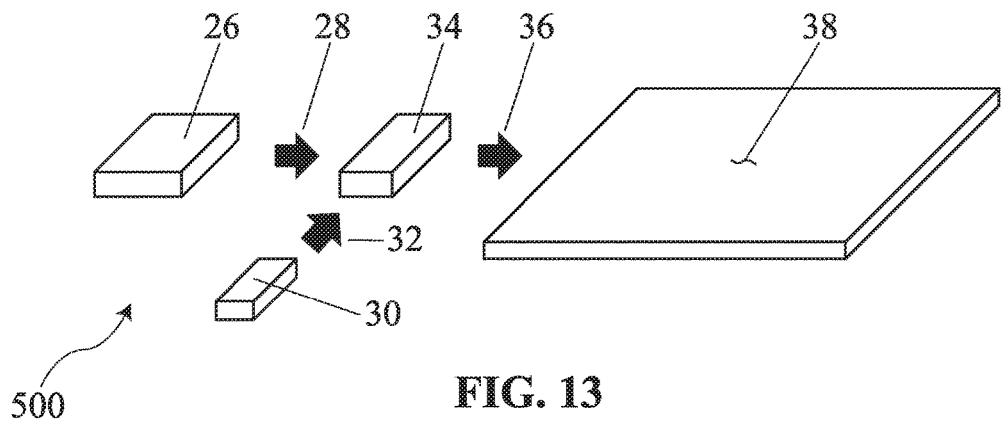
FIG. 13 is a schematic diagram of the major components of a conventional lighting system.

Referring to FIGS. 13 and 14 major components of the presently described system embodiment 502 will be described in relation to a conventional lighting system 500, and to describe one of the significant improvements that the presently disclosed systems have in comparison to conventional LED-based lighting systems. The FIG. 13 system 500 includes conventional DMX console 26 providing conventional DMX protocol signals 28 to conventional DMX controller 34 that is powered by a separate, conventional power supply 30. Conventional PWM control signals 36 are provided from the controller 34 to a conventional LED-based lighting panel 38. The present FIG. 14 system 502 includes console 27 that can provide, for example 8-bit DMX protocol signals, or signals using an alternate, preferred 16-bit protocol 29, to interface 170 (also referred to as a UI ballast circuit, or "ballast"), which includes an internal power supply. Interface 170 provides serial data (or data in accordance with 8-bit, 16-bit or other protocol) 172 to dimmer unit 174, which converts the serial (RS485) data, into PWM values 176 and then transmits those values 176 to lighting panel 178. Thus, in FIG. 13, the controller 34 functions as both the control circuit and the dimming circuit, and the PWM output 36 is sent to the lighting panel. Often the lighting panel(s) is/are at a relatively great physical distance away from the controller 34. In FIG. 14, the dimming unit 174 is a separate, stand-alone unit that functions as only the dimming circuit and is placed physically close to the lighting panel to minimize or eliminate voltage line loss. Preferably, dimming unit 174 is physically attached to the back side of lighting panel 178.

While the 16-bit (or other protocol) signals 172 are serial data and DC+ and DC− voltage, PWM signals 176 are voltage signals that constantly oscillate between "on" and "off". As is well known, line voltage suffers transmission loss, and as is also well known, suffers such loss to a much, much greater extent than does transmission of serial data through a conductive line. During typical use in this field, there is a significant distance or length between the controller 34 and the lighting panel 38, which length can, and in some instances does degrade the PWM values during transmission. In the presently described systems, however, the dimmer unit 174 is located physically close to each associated lighting panel 178 such that the PWM values 176 that are output from each dimmer unit/circuit 174 experience little or no voltage line loss prior to reaching each of the lighting panels 178. In conventional systems, there is often a relatively great physical distance between controller 34 in FIG. 13 and the panel 38. Thus, in conventional lighting systems the signaling that is typically transmitted a relatively great distance is PWM signal which suffers significant line loss. In contrast, the PWM values in the present systems travel only a relatively short distance and suffer little or no voltage line loss. Preferably, the dimmer units 174 will be positioned directly behind the lighting panels, thus providing a distance of less than 6-inches between the dimmer unit and the lighting panel input leads. Because of the reduced/eliminated line loss capability of the present systems, there is greatly increased ability to control the actual color output from the lighting panel in comparison to color control in conventional LED panel lighting systems. In such conventional systems, voltage line loss can result in the input voltage at a panel, or at specific LED diodes on a panel being less than the required voltage for a specific color in a specific LED. This situation could, for example, cause the actual color(s) output from the lighting panel to be different than the intended color(s) and/or to have different intensities from panel to panel (if the separate panels are located at different distances from the controller(s) and/or from one area of a panel to another area of that same panel, if the voltage at one area of the panel is different than the voltage at another area of the panel and/or either voltage is at a transition point for changing from one color to another color). In another example, consider two identical lighting panels, each of which is located at a different distance from the controller(s), with each panel programmed to emit red light. For one panel the distance is small, resulting in no significant voltage line loss, and for the other panel the distance is great enough to cause about ⅓ of the voltage to be lost. In such a situation, the first panel would emit full red, but the second panel, having only about ⅔ of the intended voltage would emit partial red. This problem is also present when more than one color is being powered.

Figure 15:
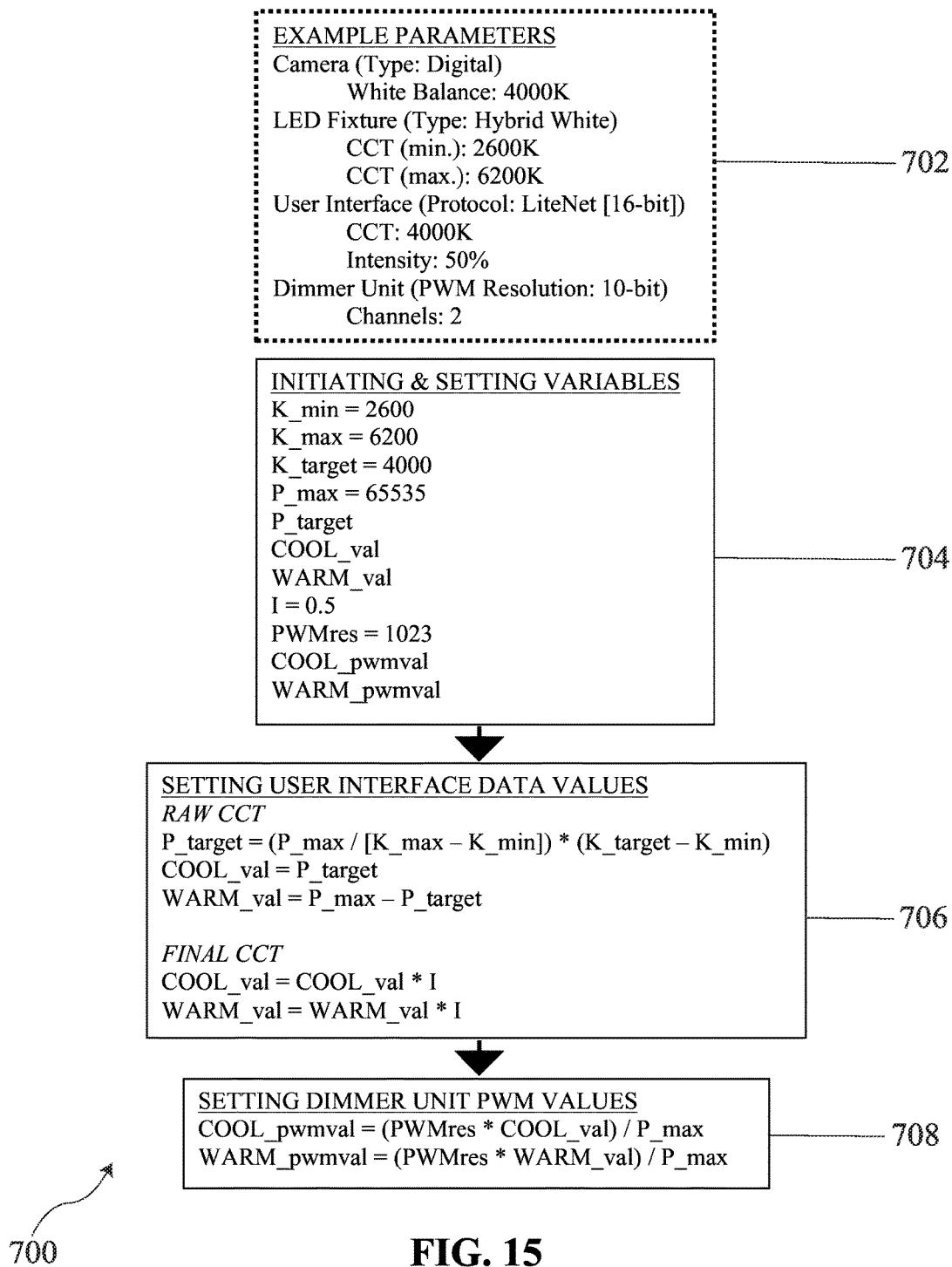
FIG. 15 is a flow chart showing a preferred, exemplary algorithm that enables color mixing and brightness compensation for two colors in the preferred embodiment.

Referring FIG. 15 an exemplary, preferred algorithm 700 for a two-white, or hybrid white LED lighting system embodiment is shown. The algorithm 700 takes DMX protocol signals, or other protocol input signals, such as 16-bit signals or 10-bit signals from a user interface, such as interface 170 of FIG. 14 and interface 208 of FIG. 11A, and converts that input into PWM values that are then used to drive a LED circuit or LED panel(s). In the FIG. 15 two-color embodiment, a warm white and a cool white are the two starting, or unblended colors. The algorithm 700 is comprised of pseudo code that is shown in four main processing sections 702, 704, 706 and 708.

Algorithm 700 is used for determining the PWM values needed to produce a specific color of white, at a specific intensity or brightness from blending or mixing two different white colors in a two-color white light mixing system that has one unmixed warm white channel and one unmixed cool white channel. FIG. 15 includes an exemplary calculation of the settings needed to achieve a user selected (predetermined) white light at 4,000 degrees Kelvin (K) and at a brightness or intensity of 50% of the maximum brightness of the specific lighting panel used. In general a specific white correlated color temperature (CCT) is selected as the final mixed color, and a final intensity or brightness for the final mixed color is chosen by the user, but in this example the CCT and the brightness are given. User inputs on user interface 208 (FIG. 11A) are operated by a user, in accordance with the novel algorithm of the present system and process, to achieve the final mixed white light to be output from conventional LED hybrid white panel 62 (FIG. 3) and at the final, chosen intensity. First section 702 of the algorithm includes (i) a camera with a 4,000K white balance setting (that is also the CCT that is the given final CCT for this example); (ii) LED hybrid white panel 62 comprised of an array of warm white LEDs with an associated color temperature of 2,600K and an array of cool white LEDs with an associated color temperature of 6,200K; (iii) user interface 208 connected to lighting fixture control circuit 430, typically referred to as a "dimmer," or "dimmer unit" (FIG. 12A) with user-selected settings corresponding to the desired light output of hybrid white panel 62—e.g., in this example the final color temperature of 4,000K and final intensity of 50% light output; and (iv) dimmer unit 430, which is operatively connected to and positioned physically between user interface 208 and panel 62.

Also referring to FIG. 15, section 704 of algorithm 700 lists variables sufficient for the system to function for its intended purpose and within the overall algorithm 700. "K_min" is an exemplary, constant value for the color temperature of the warm white LEDs of panel 62. For other LEDs and/or other embodiments, "K_min" may be lower or higher. "K_max" is an exemplary, constant value for the color temperature of the cool white LEDs of panel 62. For other LEDs and/or other embodiments, "K_max" may be lower or higher but will always be higher than "K_min" for a two-channel system. "K_target" is a variable representative of the desired or predetermined color temperature output from panel 62 selected by the user. "P_max" is the highest value allowed by the control signal protocol of user interface 208 (e.g., the 8-bit DMX protocol or the preferred 16-bit protocol although other n-bit protocols can enable the system). "P_target" is a variable chosen to group the overall algorithm 700 into meaningful sections. "COOL_val" and "WARM_val" are variables used for the intensities of the cool white channel and the warm white channel, respectively, for determining the color temperature, with brightness compensation both before and after the overall intensity variable "I" is applied or factored into the calculation. "I" is a variable for the predetermined light intensity output from panel 62 as selected by the user. "PWMres" is a variable that corresponds to the resolution of the output of the PWM microprocessor pin(s) (pins 476, 478, and 480 from FIG. 12D) on dimmer unit 430 (e.g., a 10-bit processor pin). "COOL_pwmval" and "WARM_pwmval" are variables that correspond to the intensities of the cool white channel and the warm white channel, respectively, used to obtain the predetermined color temperature after brightness compensation, after the application of intensity "I," and after conversion from the exemplary 16-bit control signal protocol to the preferred 10-bit resolution of the PWM processor pin.

Section 706 of algorithm 700 provides the equations for calculating the predetermined color temperature, FINAL CCT, from the system's starting values, with calculations shown both before and after the application of intensity "I." First, the RAW CCT is calculated by determining three intermediate values: "P_target"; COOL_val; and WARM_val. P_target is "P_max" divided by the difference between "K_max" and "K_min," which provides the number of bits per degree Kelvin for that protocol (8-bit, 10-bit or 16-bit, for example). Then the number of bits per degree Kelvin is multiplied by the difference between "K_target" and "K_min" in order to arrive at the "P_target" intermediate variable. "P_target" is set to equal "COOL_val." Then the intermediate variable "WARM_val" is calculated by subtracting "P_target" from "P_max". Because "P_max" represents the maximum value of the light output, the sum of "WARM_val" and "COOL_val" cannot exceed "P_max," and must be equal to "P_max", in accordance with one of the principles of the present system, that is, achieving desired color mixing and/or desaturation without changing the intensity of the unmixed colors and/or intensity of the unmixed colors at their prior level or degree of desaturation.

Then, in determining the final proportions of the constituent colors and at the final brightness or intensity, FINAL CCT, the intermediate, color compensated values (for this two-color, hybrid white color example), "COOL_val" and "WARM_val," are each multiplied by the intensity value "I," to yield the predetermined intensity at the predetermined color temperature of light output. Section 708 of algorithm 700 sets up a simple ratio between the "COOL_val" (and the maximum resolution of "P_max") and "COOL_pwmval" (and the maximum resolution of "PWMres") for the purposes of obtaining the "COOL_pwmval" that corresponds to the "COOL_val" but with a value that can be processed by the PWM processor pins 476, 478, and 480, which in this example can handle 10-bit values. Both the "WARM_val" and "WARM_pwmval" variables undergo the same operations as "COOL_val" and "COOL_pwmval." These 10-bit values are then output from the PWM processor pins on microprocessor 254 from FIG. 12D on dimmer unit 430 directly to PWM input 902 (FIG. 12E) of the MOSFET driver circuit 914 (FIG. 12E) on dimmer unit 430, as described in detail above with reference to FIG. 12E. For this example, dimmer unit 430 must have at least one microprocessor 254 (shown as microprocessors 442 or 444 from FIG. 12A) and at least two MOSFET driver circuits (shown as MOSFET driver circuits 458, 460, 462, 464, 466, and/or 468 from FIG. 12B) and at least two MOSFETS (shown as MOSFETs 446, 448, 450, 451, 452, and/or 454 from FIG. 12A), such that at least two colors can be accommodated.

Figure 16:
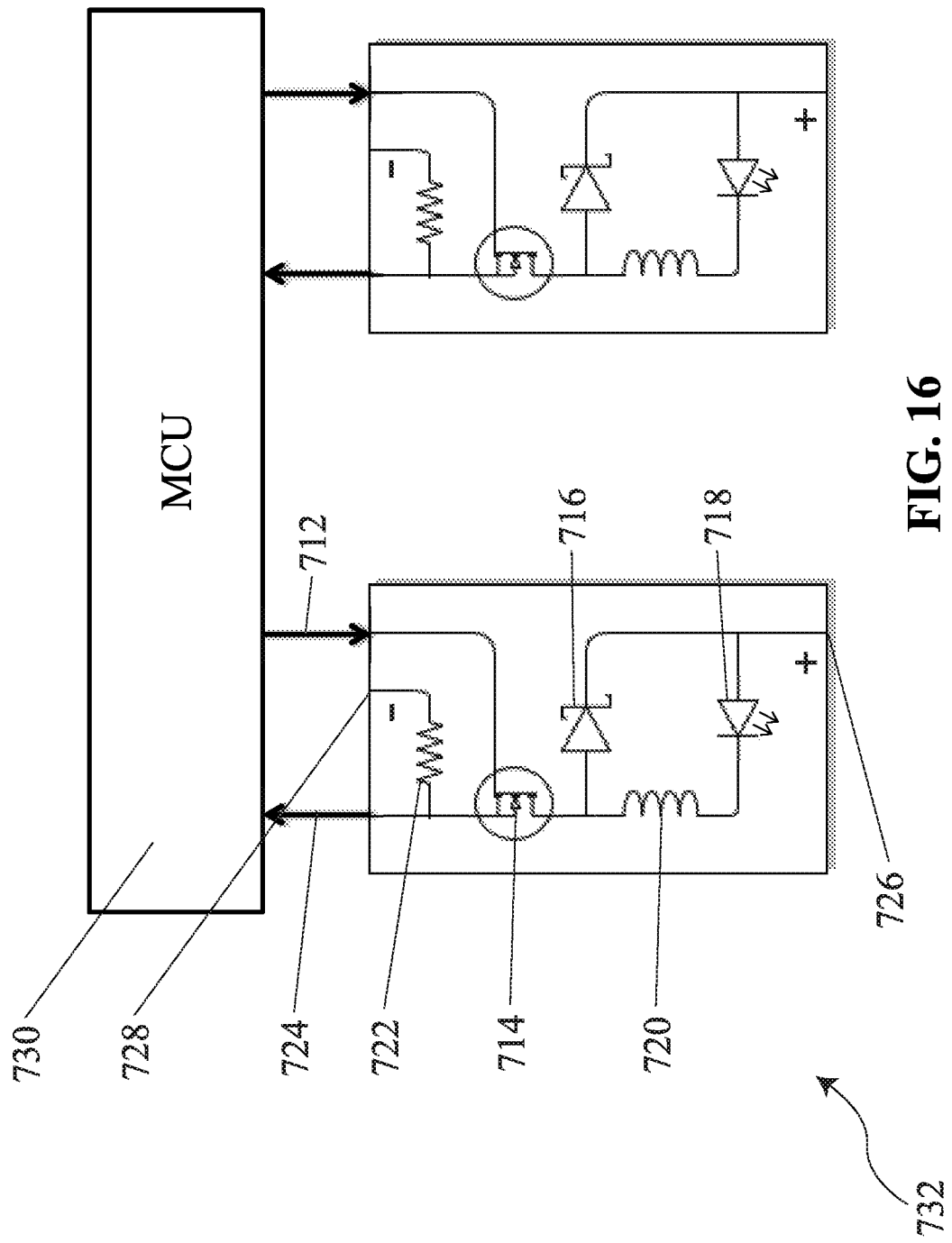
FIG. 16 is an exemplary schematic diagram showing current control for color mixing and brightness compensation for two colors in the preferred embodiment.

Referring to FIG. 16, current control LED circuit 732 is used for providing current to two different colors of LEDs 718, such as warm white and cool white LEDs. Current control LED circuit 732 is comprised of microcontroller unit (MCU) 730, LED 718, inductor 720, MOSFET 714, resistor 722, and Schottky diode 716. Data, such as CCT and brightness or intensity, as seen above in FIG. 15, and generated by, for example, DMX console 72 (FIG. 4) or user interface 208 (FIG. 11A) is sent to MCU 730. MCU 730 then processes this data and converts it into the signals needed for the algorithms of the present system and process, similar to those found in FIG. 15 described above, which are algorithms suited to the preferred PWM circuits of FIGS. 17, 20, and 22 (described below) as opposed to the presently described current control circuit (and also those of FIGS. 19 and 21) but can be adopted for such current control circuits, such as the one being presently described. Signal 712 starting from MCU 730 is a gate switch signal that is connected to the gate of MOSFET 714 and drives MOSFET 714, which turns on and off with a very high frequency (e.g., 400,000 Hz) that allows LED 718 to be connected to ground, which causes LED 718 to turn on in a configuration referred to as a low side driver, as MOSFET 714 is closer to ground or negative voltage 728 and LED 718 is closer to positive voltage 726. The specific type of LED 718 being used determines the magnitude of the requisite voltage. A low side driver configuration is used because that type of system is more efficient, and generates less heat, because the input voltage 726 drops significantly after passing through LED 718. Schottky diode 716 allows current that cannot pass through MOSFET 714 when it is off to pass back through LED 718 and inductor 720 and either through MOSFET 714 or back through Schottky diode 716, in that order, and not in the opposite direction. Inductor 720 is similar to a control valve in the sense that, due to the properties of an inductor, which would be known to those skilled in this field, the speed through which current flowing through inductor 720 is decreased. The combination of MOSFET 714 and the loop comprised of a Schottky diode 716 and inductor 720 comprises a buck current control circuit, which would be known to those skilled in this field. Current that flows through LED 718 and MOSFET 714 also flows through resistor 722 when MOSFET 714 is on, producing a slight voltage difference, which is used as feedback 724 to be sent to MCU 730 to determine how much current is flowing through the system so that signal 712 will either be active (if the current is less than the limit set in MCU 730) or inactive (if the current exceeds the limit set in MCU 730) as needed to drive MOSFET 714. As part of color compensation described above, when current to LED 718 increases, the current to the other LED in this two-LED current control system 732 decreases.

Figure 17:
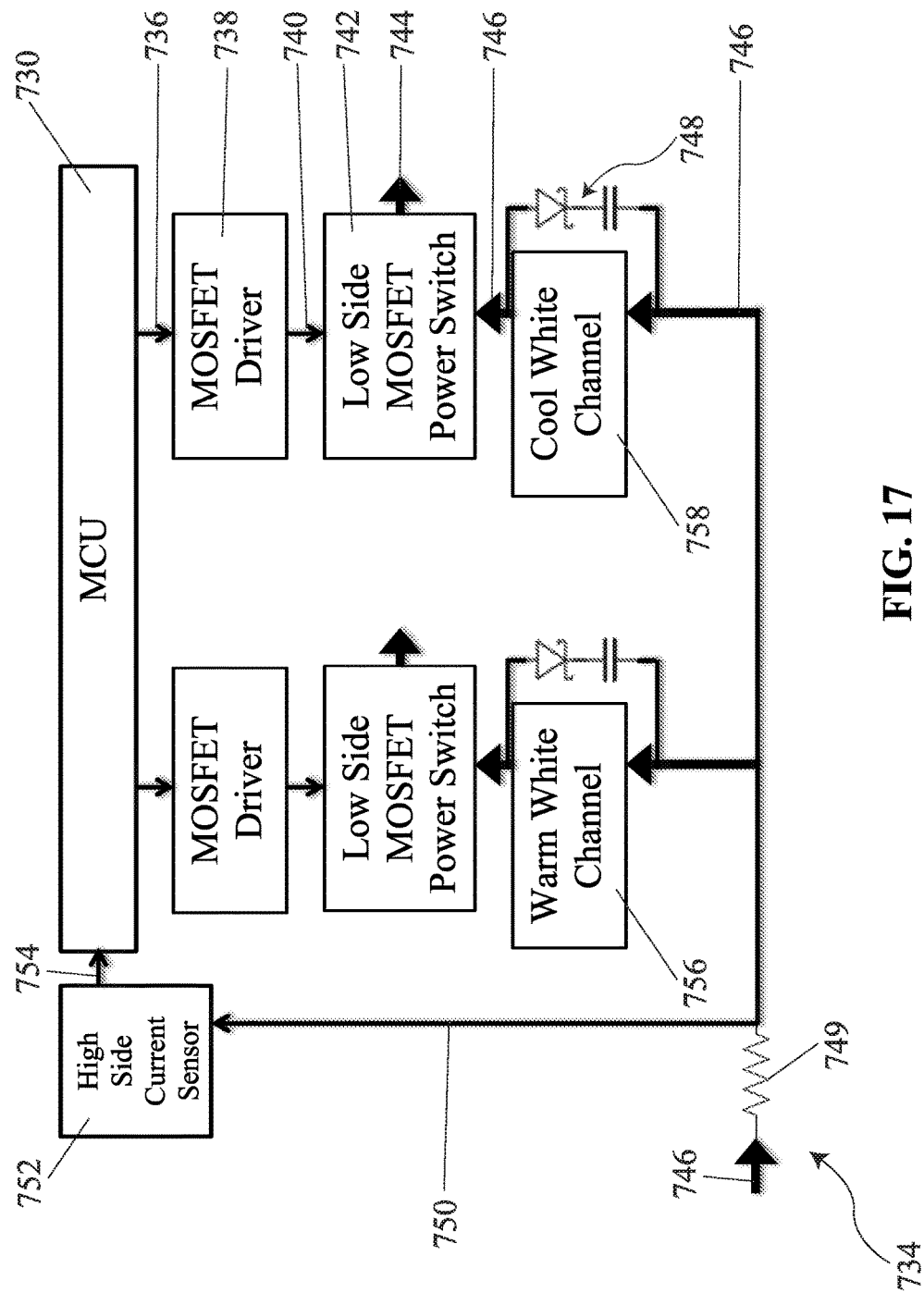
FIG. 17 is an exemplary schematic diagram showing a conventional pulse width modulation (PWM) control process for color mixing and brightness compensation for two colors in the preferred embodiment.

Referring to FIG. 17, pulse-width-modulation (PWM) LED circuit 734 is used for switching two different colors of LEDs 756 and 758 (e.g., warm white and cool white LEDs, respectively) on and off very rapidly as a means of increasing or decreasing the amount of current flowing through LED circuit 734, which directly relates to the increase or decrease, respectively, in intensity or brightness of LEDs 756 and 758. Circuit 734 includes microcontroller unit (MCU) 730, a MOSFET driver 738 for each LED color, low side MOSFET power switch 742 for each color, snubber circuit 748 for each color, warm white channel 756, cool white channel 758, resistor 749, and high side current sensor 752. Data, such as CCT and brightness or intensity, as seen above in FIG. 15, and generated by, for example, an 8-bit DMX console 72 (FIG. 4) or a 16-bit user interface 208 (FIG. 11A) is sent to MCU 730. MCU 730 then processes this data and converts it into the signals needed for algorithms, similar to and/or the same type as found in FIG. 15 described above, which algorithms enable the preferred PWM circuits of the presently described lighting systems, such as in FIGS. 20 and 22 (described below). MCU 730 outputs PWM signals 736 into each of the MOSFET drivers 738. PWM signals 736 have a specific period determined by the frequency of the signal and a duty cycle during which the signal is high for a portion of the period. PWM signals 736 have a resolution or number of discrete levels (e.g., 10-bit resolution or 1024 levels, including 0) based on the specifications of the PWM processor pins on MCU 730, which varies from MCU to MCU. PWM signals 736 are not powerful enough to drive the MOSFETs directly, because the MOSFETs requires a relatively large amount of energy to switch a relatively large LED load on and off very rapidly. Therefore, the MOSFET drivers 738 are used to amplify the PWM signals 736.

Amplified PWM signals 740 are connected to the gate of MOSFET 714 and drive the MOSFETs 714, which turn on and off with a very high frequency (e.g., at about 400,000 Hz) that allows cool white channel or cool white LED 758 to be connected to ground or negative voltage 744. This causes LED 718 to turn "on" in a configuration referred to as a low side driver, because MOSFET 742 is closer to ground or negative voltage 744 and cool white LED 758 is closer to positive voltage 746. The specific type of cool white or any other color LED being used determines the magnitude of the requisite voltage. The reason for using a low side driver configuration is so that the system is more efficient with less heat generation, because input voltage 746 will have dropped significantly after passing through LED 758. Snubber circuit 748 is comprised of a Schottky diode and a capacitor and is connected in parallel with LED 758. Snubber circuit 748 redirects the energy that does not flow through MOSFET 742 as a result of MOSFET 742 turning off. The energy is redirected back into LED 758 to protect from damaging MOSFET 742 and MCU 730 and to make circuit 734 more efficient. Resistor 749 creates a voltage differential between positive LED voltage 746 before resistor 749 and after resistor 749. This voltage differential is a relatively small differential but is large enough that high side current sensor 752 uses that to output a DC voltage 754 (e.g., 0 VDC to 5 VDC) that is sent to MCU 730, allowing MCU 730 to know how much current is flowing through the system. MCU 730 converts voltage 754 into a digital value, which allows MCU 730 to calculate the total current flowing through circuit 734 and to either increase or decrease the PWM signal 736 to ensure that the proper amount of current is flowing through circuit 734. As part of color compensation described above, when current to LED 756 increases, the current to LED 758 decreases, and vice versa.

Referring to FIGS. 18A, 18B, 18C, and 18D, algorithm 761 of the presently described system embodiment is used for determining the PWM values needed to produce a specific color of white, a fully saturated hue, or a color that results from the combination of a specific color of white (CCT) and a fully saturated hue (described above as a hue desaturated with hybrid white), at a specific intensity or brightness from blending or mixing four different fully saturated hues and two different white colors in a preferred six-color light mixing system that has one unmixed red channel, one unmixed green channel one unmixed blue channel, one unmixed amber channel, one unmixed warm white channel, and one unmixed cool white channel. Algorithm 761 is based on the principles of FIG. 15 algorithm 700, adding four fully saturated hues in addition to the two white colors in algorithm 700, as will be appreciated by those skilled in this field. While four fully saturated hues and two white colors are used in this preferred embodiment, more or fewer hues and more white colors may be used as also would be understood by someone skilled in this field.

Figure 18A:
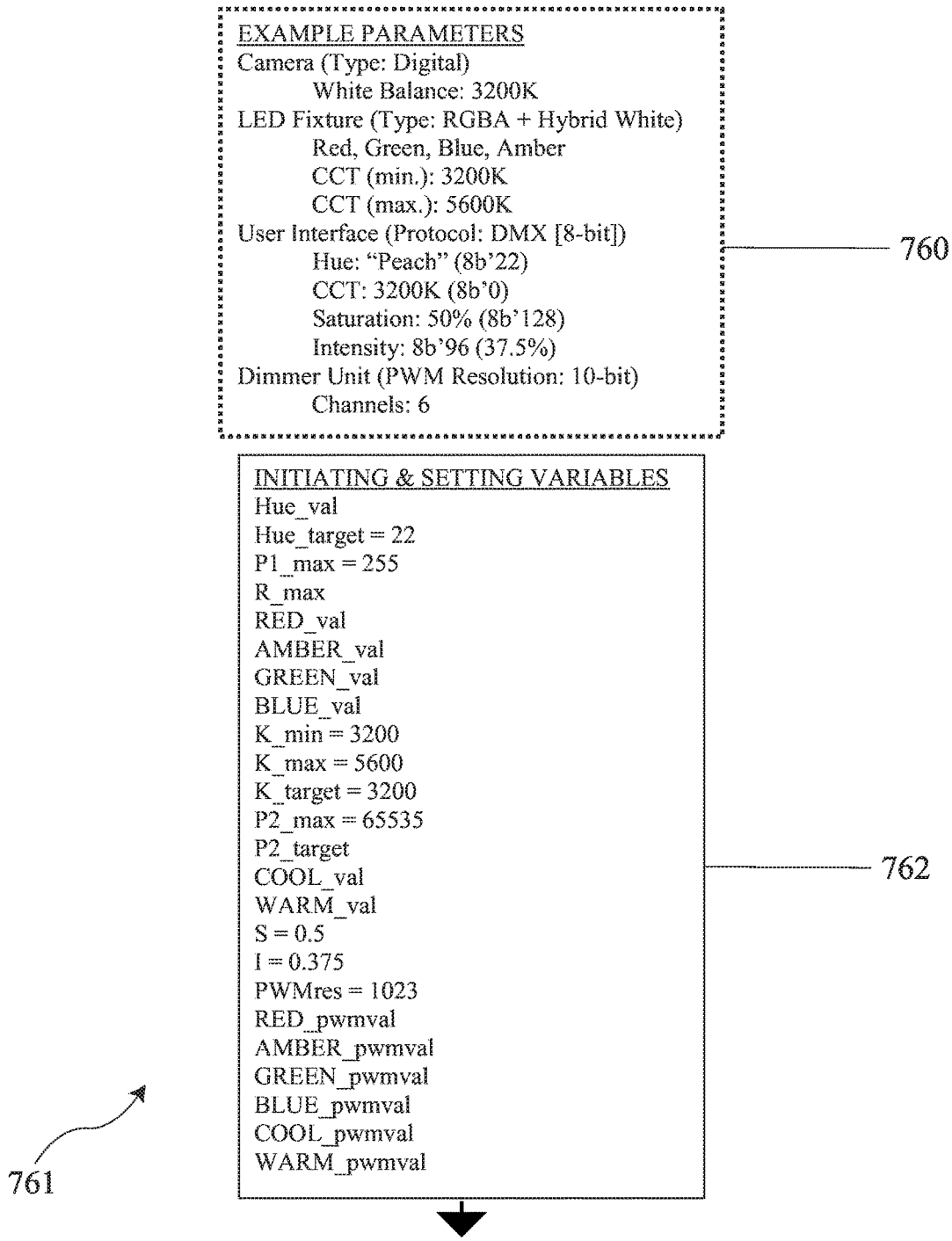
FIG. 18A is a flow chart showing a first part of a preferred, exemplary algorithm that enables color mixing, color brightness compensation and desaturation for six colors.

FIGS. 18A, 18B, 18C, and 18D include exemplary calculations of the settings needed to achieve a predetermined light with a specific peach hue with a 50% desaturation using white light at 3,200K and at a brightness or intensity of 37.5% of the maximum brightness of the specific lighting panel used. In general either a specific color of white, a fully saturated hue, or a color that results from the combination of a specific color of white and a fully saturated hue (described above as a hue desaturated with hybrid white) is selected as the final mixed color, and a final intensity or brightness for the final mixed color is chosen, but in this example the hue, CCT, saturation, and the brightness are given. User inputs on user interface 208 (FIG. 11A) are operated by a user, in accordance with the algorithm, to achieve the final mixed color light (either a specific color of white, a fully saturated hue, or a hue desaturated with hybrid white) to be output from LED six-color panel 178 (FIG. 9) and at the final, chosen intensity. Referring to FIG. 18A, first section 760 of the algorithm includes (i) a camera with a 3,200K white balance setting (that is also the CCT that is the user selected final CCT for this example); (ii) LED six-color panel 178 comprised of an array of RGBA LEDs, an array of warm white LEDs with an associated color temperature of 3,200K and an array of cool white LEDs with an associated color temperature of 5,600K; (iii) user interface 208 connected to dimmer unit 430 (FIG. 12A) with user-selected settings corresponding to the desired light output of six-color panel 178—e.g., in this example the final hue of peach, the final CCT of 3,200K, the final saturation of 50%, and final intensity of 37.5% light output; and (iv) dimmer unit 430, which is operatively connected to and positioned physically between user interface 208 and panel 178, preferably attached to the back side of panel 178.

Also referring to FIG. 18A, section 762 of algorithm 761 lists variables sufficient for the system to function for its intended purpose and within the overall algorithm 761. The definitions for "K_min," "K_max," "K_target," "COOL_val," "WARM_val," "I," "PWMres," "COOL_pwmval," and "WARM_pwmval" are the same here as those definitions found for these variables in the FIG. 15 example. In this example, "P2_max" and "P2_target" are the same as the FIG. 15 variables "P_max" and "P_target," respectively. "Hue_val" is a variable representative of the desired or predetermined hue output from panel 178 selected by the user after being converted through multiplication of "Hue_target" with another number (the process of which described below) to the appropriate n-bit number. In this example, "Hue_val" is converted to a 16-bit number to work with a 16-bit protocol. "Hue_target" is a variable representative of the desired or predetermined hue output from panel 178 selected by the user and is very similar to "Hue_val," with the only difference being that "Hue_target" may not be in the format of an appropriate n-bit number for further calculation in this algorithm 761, thereby requiring further manipulation as described above with "Hue_val." "P1_max" is the highest value allowed by the control signal protocol of DMX console 72 (FIG. 4) (e.g., the 8-bit DMX protocol). "R_max" is a variable that takes as its value the larger of the two values provided in the conditional "if statements" in section 764 and is predefined in the software of user interface 208 for a given six-color system, with its value changing as the conditions of one of the "if statements" are met. "RED_val," "AMBER_val," "GREEN_val," and "BLUE_val," are variables used for the intensities of the red, amber, green, and blue channels, respectively, for determining the final mixed color, with brightness compensation both before and after being mixed with brightness-compensated hybrid white and both before and after the overall intensity variable "I" is applied or factored into the calculation. "S" is a variable for the predetermined saturation level—that is, a level that results in the combination of a specific CCT and a fully saturated hue—for panel 178. "RED_pwmval," "AMBER_pwmval," "GREEN_pwmval," and "BLUE_pwmval," are variables that correspond to the intensities of the red, amber, green, and blue channels, respectively, used to obtain the predetermined hue after brightness compensation, the application of saturation "S," the application intensity "I," and after conversion from the exemplary 16-bit control signal protocol to a preferred 10-bit resolution of the PWM processor pin.

Sections 764 (FIG. 18B), 766 (FIG. 18C), 768 (FIG. 18D), and 770 (FIG. 18D) of algorithm 761 provide the equations for calculating the predetermined final mixed color, FINAL MIXED COLOR, from the system's starting values, with calculations shown both before and after the application of intensity "I." First, in sections 764, 766, and 768, the RAW HUE is calculated by determining "Hue_val," "R_max," "AMBER_val," "GREEN_val," and "BLUE_val." "Hue_val" is "Hue_target" multiplied by the quantity of "P1_max" plus 1, which converts the "Hue_target" value into a 16-bit value, per this example. This 16-bit "Hue_val" value meets the conditions of only one of the subsequent "if statements," allowing for the appropriate calculations to be done to calculate the appropriate values for the red, amber, green, and blue channels. Once conditions are met for one of the "if statements," "R_max" assumes a predetermined value written into the code, which is equal to the maximum value of a given range. This range is derived from the ratios between the wavelengths of the specific colors—red, amber, green, and blue—such that there is a dominant color and an adjusting color. For example, based on the properties of the color peach, given the colors red, amber, green, and blue, that peach is created by mixing the unmixed colors red and amber. To create the color peach, a ratio between the intensities of red and amber must be obtained such that amber is the dominant color and red becomes the adjusting color. In this particular example, conditions for the second "if statement" ("Hue_val"=4369 to 8738) from section 764 are met. Given the subsequent calculations for the second "if statement," "RED_val" equals the quantity of "Hue_val" divided by "R_max" multiplied by "P2_max" such that a value as small as 50% of "P2_max" and as large as "P2_max" itself is calculated. In this particular, example, "RED_val" will never exceed but can only be less than or equal to the value of the dominant color amber ("AMBER_val"). These calculations establish a ratio between the intensities of the red and amber channels such that the mixing of these channels results in the color peach. A simple ratio is then provided such that the combination of "AMBER_val" and "RED_val" shall not together exceed the value of "P2_max," which is 65535 in this example using a 16-bit protocol; this ensures color compensation as described above for the purpose of maintaining a constant brightness.

Figure 18D:
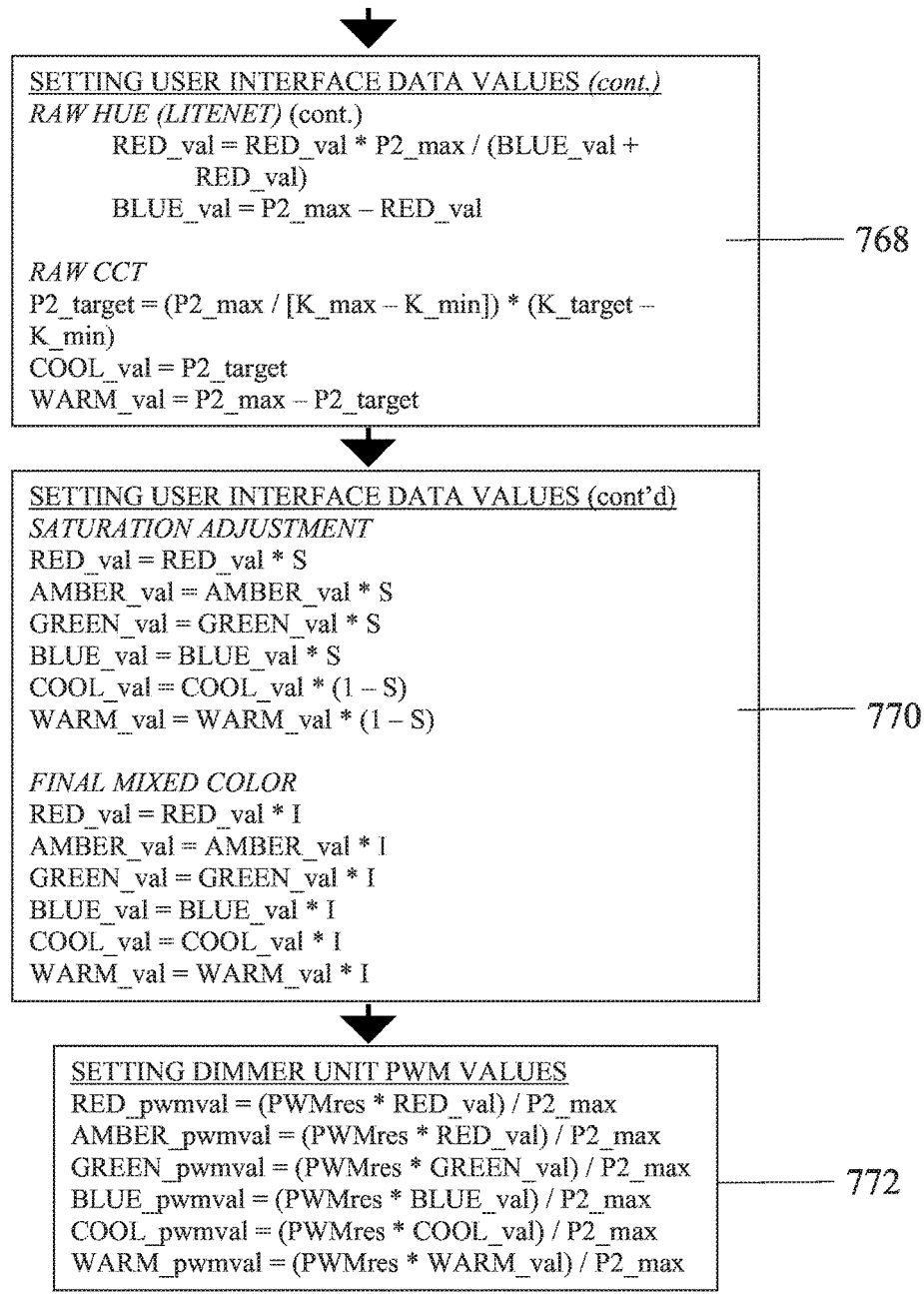
FIG. 18D is the fourth, continuing part of the FIGS. 18A, 18B and 18C flow charts.

Once the RAW HUE is calculated, the RAW CCT must be calculated (FIG. 18D section 768). These calculations are analogous to those from FIG. 15, section 706 described above. Then, in determining the SATURATION ADJUSTMENT (i.e., the ratio between the RAW HUE and RAW CCT, described above as alternative desaturation), the intermediate, color compensated values (for this six-color example), "RED_val," "AMBER_val," "GREEN_val," and "BLUE_val" are each multiplied by the saturation value "S" while "COOL_val" and "WARM_val" are each multiplied by 1 minus the saturation value "S" (a variable which takes as its value a number between and including 0 to 1) to yield the predetermined saturation at the predetermined final mixed color of light output (FIG. 18D section 770), an example of alternative desaturation described above. Then, in determining the final proportion of the constituent colors and at the final brightness or intensity, FINAL MIXED COLOR, the intermediate color compensated values with saturation adjustment (for this six-color example) are each multiplied by the intensity value "I," to yield the predetermined intensity at the predetermined final mixed color of light output (FIG. 18D section 770). FIG. 18D section 772 of algorithm 761 sets up a simple ratio between "RED_val" (and the maximum resolution of "P2_max") and "RED_pwmval" (and the maximum resolution of "PWMres") for the purpose of obtaining the "RED_pwmval" that corresponds to the "RED_val" but with a value that can be processed by the PWM processor pins 476, 478, and 480 (FIG. 12D), which in this example uses 10-bit values. The variables of "AMBER_val," "AMBER_pwmval," "GREEN_val," "GREEN_pwmval," "BLUE_val," "BLUE_pwmval," "COOL_val," "COOL_pwmval," "WARM_val," and "WARM_pwmval" undergo the same operations as "RED_val" and "RED_pwmval." These 10-bit values are then be output from the PWM processor pins on microprocessor 254 from FIG. 12D on dimmer unit 430 directly to PWM input 902 (FIG. 12E) of the MOSFET driver circuit 914 (FIG. 12E) on dimmer unit 430, as described in detail above with reference to FIG. 12E. For this example, dimmer unit 430 must have at least two microprocessors 254 (shown as microprocessors 442 and 444 from FIG. 12A) and at least six MOSFET driver circuits (shown as MOSFET driver circuits 458, 460, 462, 464, 466, and 468 from FIG. 12B) and at least six MOSFETS (shown as MOSFETs 446, 448, 450, 451, 452, and 454 from FIG. 12A), such that at least six colors can be accommodated.

Figure 19:
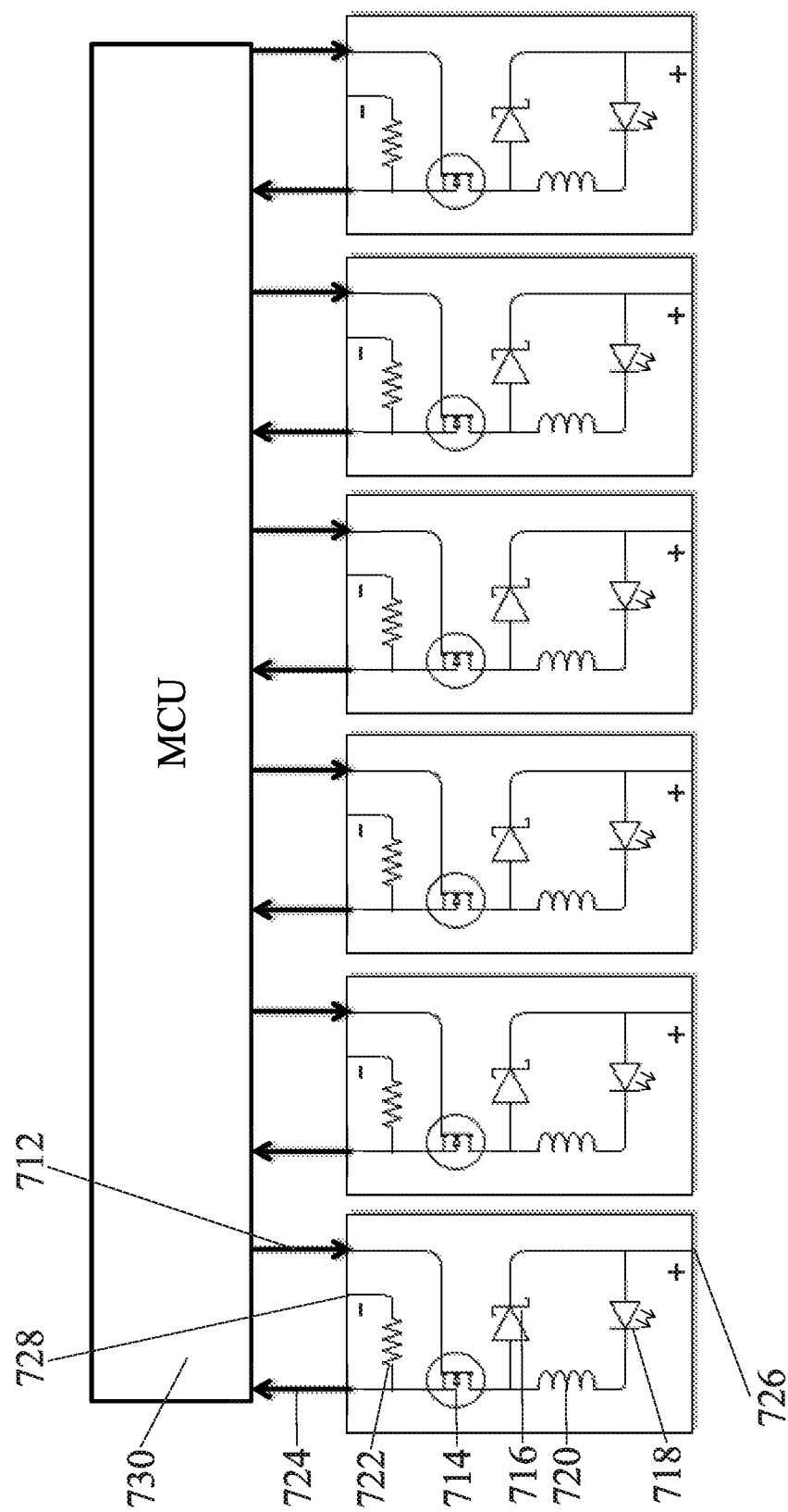
FIG. 19 is an exemplary schematic diagram showing current control for color mixing, brightness compensation and desaturation for six colors.

Referring to FIG. 19, the current control LED circuit shown behaves the same as current control circuit 732 from FIG. 16, with the exception that the FIG. 19 embodiment is used for providing current to six different colors of LEDs 718 (such as red, green, blue, amber, warm white, and cool white LEDs).

Figure 20:
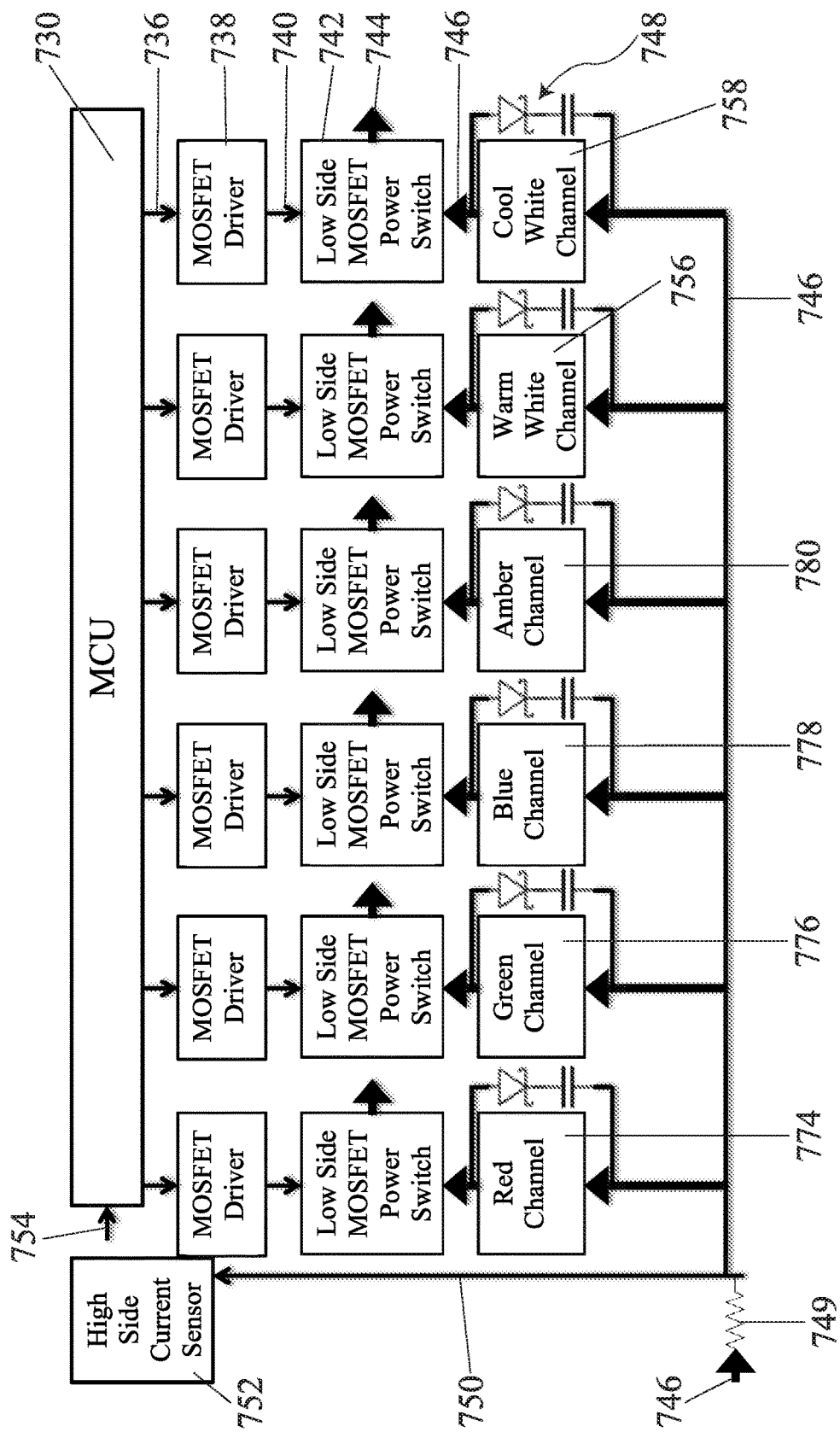
FIG. 20 is an exemplary schematic diagram showing a PWM control process for color mixing, brightness compensation and desaturation for six colors.

Referring to FIG. 20, the PWM LED circuit shown behaves the same as PWM circuit 734 from FIG. 17, with the exception that the FIG. 20 embodiment is used for controlling six different colors of LEDs—e.g., red channel or LED 774, green LED 776, blue LED 778, amber LED 780, warm white LED 756, and cool white LED 758, although other unmixed colors may be used.

Figure 21:
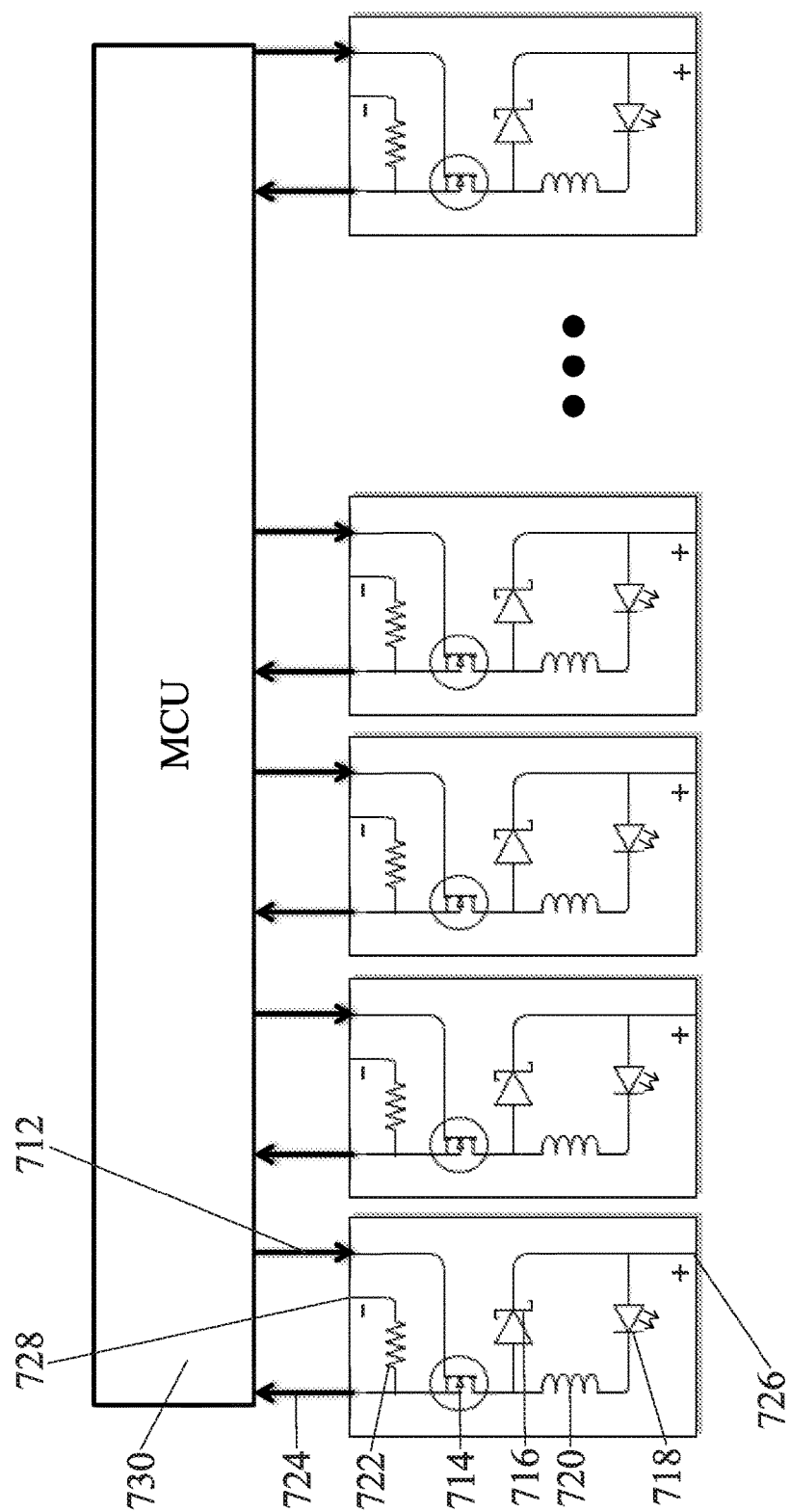
FIG. 21 is an exemplary schematic diagram showing current control for color mixing, brightness compensation and desaturation for n colors; and, FIG. 22 is exemplary schematic diagram showing a PWM control process for color mixing, brightness compensation and desaturation for n colors.

Referring to FIG. 21, the current control LED circuit shown behaves the same as current control circuit 732 from FIG. 16 and the FIG. 19 current control LED circuit, with the exception that the FIG. 21 embodiment is used for providing current to "n" different colors of LEDs 718, where "n" can be any whole integer number greater than or equal to 1.

Figure 22:
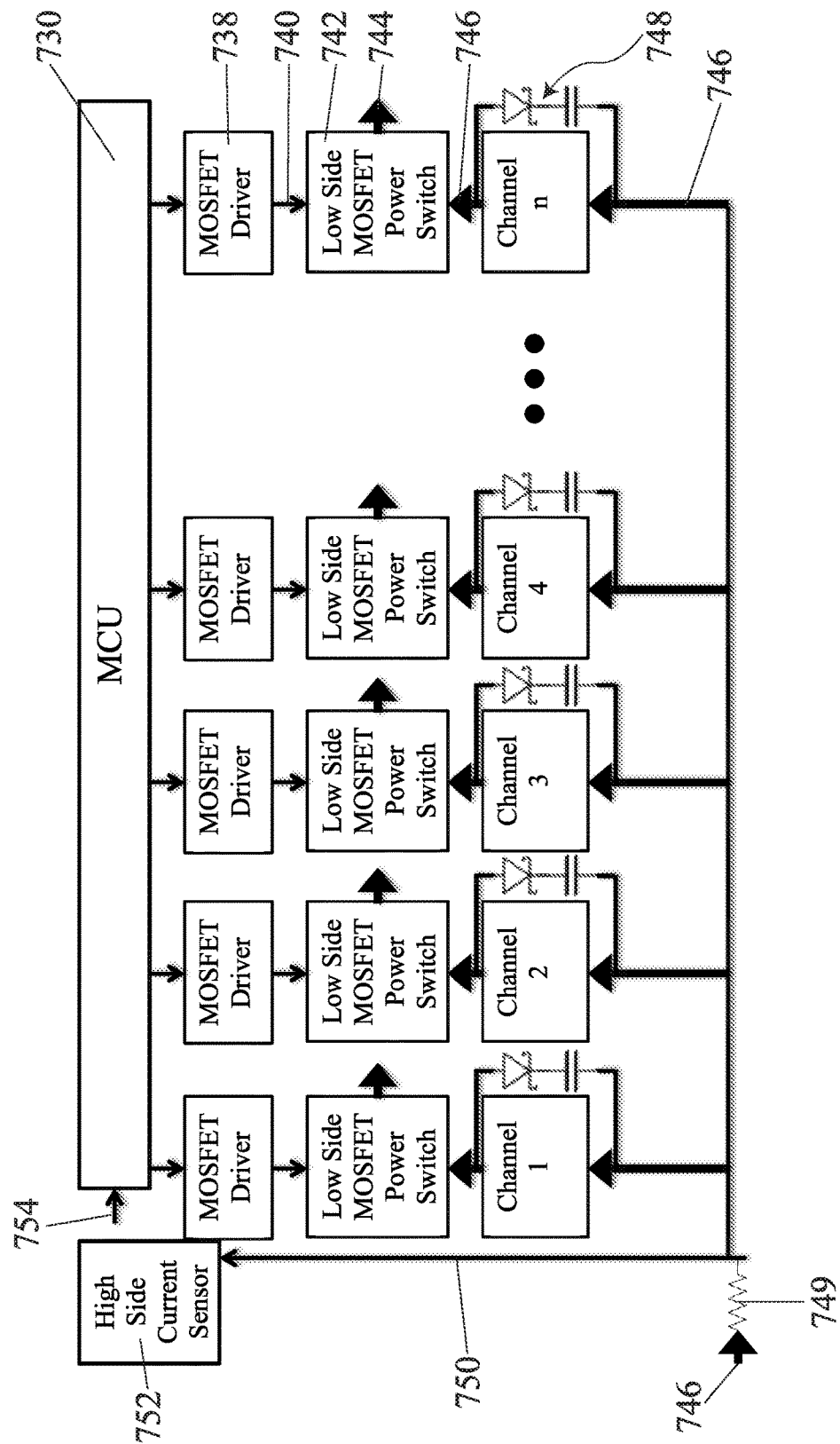

Referring to FIG. 22, the PWM LED circuit shown behaves the same as PWM circuit 734 from FIG. 17, with the exception that the FIG. 20 embodiment is used for controlling "n" different colors of LEDs, where "n" can be any whole integer number greater than or equal to 1.

Luminaire Brightness and Hue Control

Again referring to FIG. 8, dimmer unit 174 preferably converts signals 172 generated by user interface 170 in accordance with the user's instructions and sends the converted signals, as shown at arrow 176, to lighting source(s), fixtures or luminaires 178. The converted signals are referred to as PWM signals as described above. The luminaires then provide illumination at a particular hue and at a particular brightness, per the PWM signals, as shown at arrow 180 to illuminate an object 182 for recording by a camera 186, as described above. Pseudocode for each of several, various, exemplary embodiments is provided in FIGS. 15, 18A, 18B, 18C and 18D. Power (current) control and hue control is accomplished through conventional pulse width modulation (PWM) control for an exemplary 6-channel system, as are shown in FIGS. 19 and 20 and described herein. Other 2-channel and n-channel systems are described above. As is well known in this field, PWM control is accomplished by managing the duty cycle of the LED(s), such that, for example, if the duty cycle has no pulse, the circuit is "off". If the duty cycle is set to be a full duty cycle, then the corresponding LED(s) are at 100% power. If the duty cycle is set to have the LED(s) powered on for 50% of the time, the human eye would perceive this as the LED(s) operating at 50% power. Control of the brightness or intensity of LED-based light by use of the PWM technique is well known in this field.

The most preferred type of camera for use in the present system is a digital video camera that includes conventional sensors. As will be appreciated by those skilled in this field, non-digital video cameras as well as digital and non-digital still cameras may be used in accordance with the principles of the presently described systems and processes. The preferred luminaires are conventional red (R), green (G), blue (B), white and amber (A) light emitting diode (LED) type lighting sources. As will also be appreciated by those skilled in this field, digital cameras do not see, that is, do not sense specific colors in the way that human vision sees colors illuminated by natural or artificial light. Digital cameras do not have brains, like humans, and do not automatically adjust their sensors to account for the quantity or quality of light. For a digital camera, a color as "white" is represented by a combination of values generated by several color sensors positioned in the camera. These color sensors sense or "see" color differently than the human eye senses or "sees" color.

Sensors in cameras "see" or sense the color(s) reflected from the objects and send signals representative of the seen or sensed colors to a display. The display then displays an object image of the actual object that has been illuminated by light source(s) and recorded by the camera. The object image is displayed to a viewer, typically a human viewer who observes the object image with his or her eyes. In accordance with the presently disclosed system and process, the intended purposed of the controller is to cause the light source(s) to illuminate an object, so that the viewer sees the object image on a display as if the viewer was observing the object directly with the viewer's eyes and under natural, sunlight illumination. Because of differences between natural light and artificial light, such as LED-based light, and the different ways that digital cameras sense and process LED-based light, there is a need for several types of light compensation. The presently disclosed systems and processes thus enable compensation for the differences (i) between natural light and artificial light that illuminates an object and (ii) between how the human eye processes light reflected from a natural light illuminated object and how a digital camera processes light reflected from an artificial light illuminated object. Thus, the present systems and processes compensate for the artificial light source and for the digital camera sensors so that the object image shown on the display appears to the human viewer to have the same colors and brightness as does the actual object illuminated by natural light. If the object is white, the object image on the display appears to be the same white at the same brightness or same intensity; if the object is orange, the image of the orange object on the display also appears to have the color that is same hue or shade of orange and at the same intensity or brightness. If the object is a yellow banana, the image of the banana on the display also appears to have the same hue of the color yellow and the same brightness. The dimmer unit enables the user, via the user interface, to adapt and control the output of the artificial illumination to match or correlate with the camera's capability to sense colors reflected from the object recorded by the camera, and thus to control the colors shown on a display so that the colors of the image object match or closely match the colors the viewer would see of the actual object when illuminated by natural light.

The presently disclosed systems and methods also enable calibrating light output from a particular luminaire, or group of luminaires to suit the needs or requirements of particular camera sensors and/or to suit the specification of a particular film stock in addition to calibrating for that camera's settings, including white balance settings.

Calibration for Variations in Intensity/Brightness and Hue Among Luminaires and Cameras With reference to the process of calibrating to account for variations in light sensitivity of each camera, and as referred to herein, the term camera sensor(s) generally refers to conventional light sensors used on digital cameras, such as charge coupled devices (CCDs) or complementary metal oxide semiconductors (CMOS). For instance, if twice as many red pickups (sensors) are positioned on the camera in comparison to the number of green or blue pickups, processing only half as much red output would be necessary in comparison to processing the green and blue output from the green and blue LEDs in order to result in illumination that would have the same relative intensities of the original light reflected from the object. An example of intensity calibration for sensor(s) in accordance with the presently described systems and processes is provided in Appendix 2.

Luminaire calibration takes into account variations in each camera's RGB sensor's brightness sensitivity will be described. Calibrating the luminaire(s) for variations in sensitivity of the sensors used in individual cameras is an important aspect of the present systems and processes. Such calibration involves taking into account the ratio of red, green, and blue pickups on a particular camera sensor and using this information to determine the appropriate intensities of, for example, the red, green, and blue LEDs on the luminaire in order to result in artificial light output that corresponds to that particular camera's light sensitivity.

Such calibration involves determining certain set points for each light controller, such that when a particular camera is used to record images, the system automatically compensates to set the light output of the artificial light luminaire(s) so that the image object seen by a human viewer appears to be illuminated by natural light. In conventional systems, each time a different camera was used to record a scene, a separate, "trial and error" effort had to be made to calibrate or choose particular settings for the luminaires so that they would output light that compensated for the variations in the light sensitivity of each camera. In the presently described preferred embodiment systems, this same "trial and error" effort may be used, especially in those instances in which published technical specifics are unavailable or nonexistent or in those instances when such an effort is preferred to allow for a more subjective, artistic calibration. Such a "trial and error" calibration is written into the user interface software.

With reference to Appendix 2, camera 1 has red, green and blue pickups within its sensor, and with the ratio of sensitivity of each color to each other color to be 3, 1 and 1.5 for R, G and B, respectively. The weight of each sensor's sensitivities is the inverse of the sensitivity, such that when sensitivity to red is three times the sensitivity to green, then only one-third as much red light would be needed to properly provide or output red from that camera. The weight of each sensor's sensitivity is shown in the Appendix 2 example. A second camera example is provided in Appendix 2 for the same luminaire.

With reference to Appendices 3 and 4, luminaire calibration also takes into account variations in each camera's RGB sensor's hue sensitivity, as exemplified in Appendix 3, and then combines the brightness sensitivity calibration with the hue sensitivity calibration to result in an "all-camera" calibration, as shown in Appendix 4. Consider, for example that an actor's dress is a particular shade of red and that the particular shade of red is perceived by a human as and is output from a luminaire as light at 625 nm. Consider a two camera example, in which video camera 1 is comprised, in part, of sensors that regard "red" as being 650 nm light. Therefore, in order for the camera to record light that is later to be displayed as red light with a hue corresponding to the 625 nm light output of the luminaire as seen by a human viewer, the light output of the luminaire(s) must be adjusted or calibrated so that it transmits light that camera 1, through its sensors, perceives to be 650 nm light. Once the luminaire(s) output a shade of red light suited to camera 1's red pickups in its sensor, camera 1 will sense the light to be exactly the same hue of red that the human would see as the actual color of the red dress.

In addition to intensity or brightness calibration, calibration for the hue of the light output is an important aspect of recording images in this field, and the present systems and processes also provide for and enable brightness and hue calibration to result in a calibration referred to as all-camera calibration. Hue calibration involves taking into account the specific wavelengths of color recognized by the red, green, and blue pickups on a particular camera sensor and using this information to determine the appropriate ratios of light output from the red, green, and blue LEDs to achieve the appearance of outputting the wavelengths of color that match those picked up by the camera sensor. In other words, hue calibration is a process of adjusting the wavelength of light colors so that the hue of colors output from the camera is matched to, or approximates the hue of the colors output from the luminaire as viewed by the human (and thus input into the camera). For example, an exemplary all-camera calibration for a two-camera system is shown in Appendix 4. For a particular camera that has red pickups that recognize a wavelength of 650 nm as being red while the exemplary luminaire is comprised of red, green, and blue LEDs with wavelengths of 625 nm, 525 nm, and 465 nm, respectively, then the camera would be calibrated such that the camera would use 94.9% of the luminaire's red LED output and 5.1% of the luminaire's blue LED output, with the detailed calculations shown in Appendix 4.

Along with providing for calibrating for relative color intensity and hue, the presently disclosed systems and methods also provide for or enable maintaining constant light output intensity, or brightness of the light, regardless of the color(s) being mixed. This process is referred to herein as intensity or brightness compensation. As an example of intensity compensation, consider a luminaire that is comprised of red, green, and blue LEDs each of which is powered though a separate control channel in the controller, such as a conventional DMX-IT 512 controller, and during operation draws a total of 3 Watts (W) of power (1 W per color, that is 1 W per channel) total. Starting with full power (1 W) to the red LED, the goal of this example is to mix colors to achieve a yellow color. For this example, the ratio of red, green, and blue pickups on the camera sensor, each to each other is 1:1:1 and the wavelengths of light recognized by each color of the pickups matches the wavelengths of each color emitted by the LEDs, respectively. As an example of a conventional mixing to achieve a yellow color, 1 W of green would be added to the original 1 W of red, and would result in 2 W of total power consumption, and with a resulting yellow color that would be twice as bright or twice as intense as each of the constituent colors red and green. In the presently disclosed system and method, however, intensity of the resulting light, or total power consumption is maintained not solely through the addition of a second light to the first or base light, but rather by the combined, preferably simultaneous addition of the second light and subtraction of the base light at the same rate of power change, respectively, to achieve the desired hue of the resulting light. More specifically, the simultaneous addition and subtraction of the constituent lights is achieved by simultaneously, and at the same rate of change (W/second), reducing the power to the base color LED and increasing the power to the second color LED. For the purpose of the present disclosure this combined addition and subtraction of light output is referred to as "crossfading". For instance, in an example of a preferred embodiment crossfading process, mixing red and green to yield a yellow that is 50% red and 50% green is achieved by crossfading output between red and green LEDs (which results from simultaneously increasing power to the green channel and decreasing power to the red channel at the same rate), (or by whatever combination of output from the LEDs is necessary to achieve the red and green as seen by the camera, once intensity calibrated, as described herein). By this crossfading, equal parts of red and green are mixed (after the initial intensity calibration) and total power consumption is maintained at 1 W. Thus, use of the presently disclosed system and method in this example of mixing to yellow means that the yellow would be produce with 0.5 W of power to the red LED(s) and 0.5 W of power to the green LED(s). In this example, total power to the constituent LEDs is maintained constant during the entire process of color mixing from red to yellow, and the resulting yellow would have the same brightness as each of the constituent colors.

Alternative Desaturation

In addition to the color compensation and cross fading process embodiments referred to above, the presently disclosed systems and methods also provide for and enable a method of desaturation described in detail herein and referred to as alternative desaturation. Conventional desaturation typically employs unused colors and adds those colors to the used colors in amounts that would result in white and thus would desaturate the used color(s) to some predetermined amount or degree. For example, to conventionally desaturate a fully saturated red color, unused color from green and blue LEDs would be added to the red. As the amount of green and blue is added to the red, the red color becomes increasingly desaturated, up to full desaturation, when the light output of each of the blue and green LEDs is increased up to and equals the light output of the red LEDs. As is well known, an equal combination of red, green, and blue theoretically results in a human-perceived output of white. In contrast to this conventional way of desaturating a base color, the presently disclosed system and method desaturate a base color light while maintaining the light output brightness/intensity at a constant value and accomplish the desaturation with a high quality white light, as described below.

Another aspect of the presently described systems and processes relate to the color white, more specifically, use of a high quality white to desaturate primary or mixed colors. In this field, an industry term, color rendering index (CRI) has been used to characterize the quality of white light in some contexts. For example, for a specific color illuminated by sunlight, the CRI provides a way of measuring or comparing how that specific color looks under a specific, artificial lighting condition as compared to how that color looks under sunlight. For the purpose of the present systems and processes, use of high quality light is preferred when white light is used, and with white phosphor LED-based light considered to be high or the highest quality of artificial white light, as compared to white light produced from mixing RGB light. As used herein the term "high quality white light" refers to a phosphor-corrected white, or white light that is emitted from a phosphor white LED.

Additionally, in a preferred embodiment, the phosphor-corrected, high-CRI white would not be produced by a single phosphor-corrected white LED but rather would be the result of combining at least two such LEDs, each with a different correlated color temperature (CCT) (i.e., Kelvin temperature). As used herein, a combination of two different Kelvin, phosphor-white LEDs, each with a different Kelvin temperature is referred to as hybrid white. Use of such different white LEDs is included in the presently described systems and processes. Preferably one of phosphor white LEDs is chosen such that its light output is skewed toward a warm tungsten type or hue of light and the other phosphor white LED's light output is skewed toward a higher Kelvin temperature white, that is, a cooler white such as found at midday under natural lighting conditions. The warmer white is preferably a 3000K white and the cooler white is a 6000K white. Thus, for instance, to desaturate a fully saturated red through a preferred embodiment of the presently disclosed systems and methods, white would be achieved not by the addition of green, and/or blue but rather by crossfading between the fully saturated red and a Kelvin-adjustable, phosphor-corrected white comprised of two or more phosphor-corrected white LEDs, and with the resulting white color being a predetermined. Kelvin temperature white chosen according to the artistic effect the user/director wants to produce.

The physical embodiment of the FIG. 8 user interface 170 used in the presently disclosed systems and methods employs the aforementioned methods of color compensation and rendition in such a way that is specific on a per-camera basis for any camera, be it digital or analog, and regardless of whether it is a still picture camera or a motion picture camera. In typical uses in this field, multiple cameras are used, with each camera, or each camera model having unique sensitivity to red, green and blue light sources. As will be appreciated by those skilled in this field, and in order to achieve uniform results in terms of color hue, brightness and saturation, each camera must also be calibrated or normalized, each relative to the other in order to achieve realistic and uniform results. An example of a preferred camera calibration process for a two camera system is provided in Appendix 4, although other methods of calibration may be used as described above.

In one embodiment or example of the presently disclosed systems and processes, the user inputs the make and model of the specific camera to be used, or collects the relevant data corresponding to the specific camera to be used. Then, that camera's specific data/information is preferably stored in the form of a lookup table in the controller's memory or in a remote memory, for example. This is one preferred way the camera's relevant information can be obtained and used for the purposes of color compensation, rendition and desaturation. Alternatively, a specific camera's specifications could be determined through a feedback system, in which the camera's specification data is fed to the controller, and at which point the controller could either then use a lookup table that was predefined with those specs or could, in real-time determine the camera's specifications. These are two exemplary methods for obtaining camera specifications and related data. As will be appreciated by those skilled in this field, once the controller has been programmed or provided with the identity of the camera is being used, that camera's settings can be optionally input into the controller, either manually or through a conventional feedback system. These settings include, but are not limited to the white balance of the camera. With this information, the controller of the presently disclosed system and method can then be operated by the user to calibrate, compensate, desaturate and render colors.

The systems and processes according to the present disclosure overcome the drawbacks of known artificial light correction systems and processes by maintaining the intensity level of the light when fading from one color to another, and/or when saturating or desaturating a color. This is achieved is by gradually lowering the intensity of the original color while mixing, that is, while the intensity of the added color is increased until the desired color is reached. Also, once the desired color has been reached or set, the light intensity can be dimmed or raised without changing the color.

This presently disclosed compensated color mixing process works for both color-mixing as well as for blending of white colors. When mixing RGB and blending with white, the present systems and processes preferably mix RGB light with two or more high quality, Kelvin adjustable white, that is, high CRI white, LED-sourced light.

While conventional color mixing systems and processes provide high, but often uneven light output, i.e., brightness, for a chosen mixed color, the presently described systems and processes are directed to consistent brightness regardless of the chosen color, desaturated or not, and provide the best possible known white light when desaturating.

Color Mixing with Brightness Compensation

The present systems and processes mix red, green and blue LED-sourced light with brightness compensation. Although typical, conventional RGB mixing alters the brightness while color adjustments are made, the preferred present process balances the mix so that the combined brightness of the mixed color light preferably is initially set to be the brightness of one of the constituent colors. This is accomplished by choosing a power, such as the power to the LEDs of one of the constituent light channels, and then decreasing the power to that channel as the power the other constituent channel(s) is raised from zero power to the power required to achieve the desired, mixed light. In an example where all 3 of R, G and B are mixed in this way, the power to the three channels of all three colors is combined to equal to the power of one channel, e.g., the power of the first channel, as if that first channel were producing 100% output while the other channels produces 0% output.

As an example of compensated RGB color mixing according to the present process, consider one of the constituent colors of the desired color to be pure red. In this example, the red channel would be on at a predesignated or "full" power, which for this example would be one watt (1 W) of power output to the red LED. To change the red color to another color, for example, yellow, the light from the green channel is introduced, that is, power is supplied to the channel that is input to the green LED Conventional color mixing methods simply add green, in this example, up to 1 W of green, without subtracting red. For this example, the conventional method results in increased brightness, that is 1 W of red plus 1 W of green, which would be 2 W of total power to the LEDs and produce a yellow brightness corresponding to 2 W total, with the yellow intensity double or about double the brightness of the constituent colors. In the preferred present process, the colors red and green are cross-faded, and the total power output is maintained at a predetermined value, such as 1 W as in the above example. The ratio of red to green in the final, yellow color mix would be the same in both the conventional process and the present conventional process. However, in the conventional process the total power would be 2 W, but in the present process the total power to the LEDs would be 1 W. In the conventional process the resulting yellow would be twice as bright as the resulting yellow in the present process.

Whichever of the two or three red, blue and green colors are mixed in the present process, the total power output would be maintained at a constant level, such as 1 W. Considering a continuation of color mixing through the color spectrum with the third channel, blue, mixed with green, the power of blue could be increased from 0% to full power and simultaneously the power of green could be decreased from full power to 0%, in the same way as in the red to green crossfading example. In these examples, the term color spectrum refers to the well-known color wheel, typically represented as a circle, starting at red, and continuing through green and blue, and then continuing to and terminating at red, the starting point. For the purpose of the present systems and processes, the process of maintaining a constant total output power during and at the completion of color mixing is referred to as compensated RGB color mixing.

A preferred process of RGB color mixing employs an algorithm that uses six-channels. The exemplary 6-channel algorithm is provided in FIGS. 18A, 18B, 18C, and 18D. Modification of the 6-channel algorithm for a different number of channels, such as 2, 4 or 8 is within the skill of one skilled in this field. Also, modification of any such algorithm for use with other operating systems and applications is also within the skill of a person of ordinary skill in this field. For example, the first (or, in some applications, the only) control provides coarse adjustment from red to red in a circular pattern, going through the entire spectrum of RGB. A preferred system and process also includes use of a conventional console, as shown in FIGS. 4 and 5, and described above, having a total of 256 increments corresponding to the entire RGB spectrum. With the control value set at 0 with this controller, red will be the resulting color. As the control value is increased from 0 to 255 (the maximum value), red fades to green and then to blue and then back to red, at 255. A second control could be used to provide fine adjustment of the color mixing, such as a second control that would provide increments between each adjacent integer of 256 increments of gross color control. For example, a second control could provide 10 increments of control (i.e., power or current to the LED(s), such as between settings 200 and 201, i.e., 200.1, 200. 2, etc.

Color Mixing and Desaturation

The present systems and processes also enable desaturation of red, green and blue LED light, and desaturation in combination with color mixing. These color mixing and desaturation processes preferably use two or more independently adjustable phosphor-white LEDs. In this context the term adjustable refers to and means adjustable Kelvin temperature. In one example, with the control value set at 0, 3000K white light will be set as the output color. As the control value is increased from 0 to 255, the 3000K white light would change to 6000K white light, at which point the control value would be at full value. The desaturation saturation aspect of this combined color mixing and desaturating process preferably uses a separate 16-bit control, but could use an 8-bit control, although the resolution would not be as good as with a 16-bit system and control. At the control value for white light set at 0, such as in this example, fully saturated color will result from the light produced by one of the primary color LEDs or the mixed light produced by mixing light from two or more of the LEDs. As the control value of the white light is increased from 0 to 255, fully saturated color would be crossfaded to fully desaturated color, through simultaneous decreasing power to the base color LED(s) and increasing power to the white LED(s) and at the same rate, similar to the way in which crossfading is described above. Also, in this example of desaturation of a mixed color, a third 16-bit control, referred to as the master control, would be included in the control circuit and would be used to adjust the power output of the resulting compensated and desaturated light to a desired level of brightness by controlling the power the LEDs.

In an exemplary process, the following general steps would be taken, not necessarily in this order, and could be taken for any of many combinations of chosen primary or mixed RGB colors and of any chosen degree of saturation, of many degrees of desaturation. First, an initial or base RGB color is chosen and then, preferably, the Kelvin temperature corresponding to the base color is determined or chosen. Next, a desired or resulting saturation/desaturation level/degree is then chosen. It will be appreciated by those skilled in this field that when producing fully saturated colors, there will be no output from the white LED emitters. This process is in contrast to conventional desaturation processes, where during desaturation of mixed RGB colors, the unused colors from the RGB LEDs are used rather than white light from dedicated, or separate white LEDs. For example, during conventional desaturating of pure red, light from each of the green and blue LEDs is added equally until the appearance of white light is achieved. The present process eliminates conventional desaturation in RGB color mixing and instead uses targeted, adjustable Kelvin temperature, high quality white light from dedicated white LEDs. The high quality white light is used in favor of adding red, green and/or blue to desaturate.

In one preferred embodiment, color mixing and desaturation of RGB LED-based light with two or more independently Kelvin adjustable phosphor-white LEDs is used. In this embodiment compensated RGB is combined with adjustable desaturation. In this embodiment the RGB color compensation process as described above is used to create the desired color and to maintain the brightness of the resulting color at constant, predetermined level, or to change the brightness of the resulting color by changing the power to the constituent LEDs at a uniform rate, regardless of the color chosen. In this context the resulting color is referred to as a locked group, just as the Kelvin-adjustable white color, as described above, is referred to as a locked group. Consider an example in which the chosen RGB color is a red, at 1 W of power, and the chosen white color is 3000K, also at 1 W of power. In this example a single adjustment of the controller would cause crossfading of the overall brightness of the red with the overall brightness of the white light, with the total power to the LEDs maintained at one watt. Starting at 100%, full power (e.g., 1 W) red, then power of the white LEDs would be zero percent power, i.e., zero watts. Crossfading the two locked groups would result in desaturating red from fully saturated to a desired desaturation value, as power to red would be decreased simultaneously as power to the white LED(s) would be increased at the same rate. Crossfading could continue until full power white resulted, at which point the red would be at zero percent, i.e., zero watts. This preferred process uses high quality, Kelvin-adjustable white light to desaturate the chosen compensated RGB color light. This is in contrast to conventional desaturation processes that employ RGB colors to desaturate the chosen RGB color. The conventional process results in poor and inconsistent desaturated color due to insufficient representation of some of the colors in the spectrum, also results in slight variations in RGB color over the lifespan of the RGB emitters.

Another conventional method of desaturation adds a single white channel of light to the base color light, and this conventional desaturation method is referred to as a conventional, four-color method. In this four-color conventional method a single, i.e., non-Kelvin adjustable white channel is added to desaturate the chosen RGB color along with the unused red, green and/or blue. The single white channel provides additional desaturation in comparison to the conventional desaturation method that uses only otherwise unused RGB light. The four-color conventional desaturation method is in contrast to the present desaturation method in that the present, preferred embodiment process uses five colors: red, green, blue, white and white. Producing Kelvin adjustable white requires at least two channels of white light. Thus, the presently preferred desaturation process requires at least a five colors, does not use the unused colors from color mixing and the white light is Kelvin adjustable white light.

Just as red, green, and blue provide relatively accurate saturated colors such as, for example, the type needed for a movie scene showing an automobile interior driving down Las Vegas Boulevard, the use of two or more full spectrum phosphor-based light sources such as high CRI (color rendering index) white LEDs offers more appropriate and often desired adjustable white, which can be calibrated to the sensitivity and settings of the camera, as described above.

Thus, the presently disclosed desaturation methods preferably employ two or more phosphor-white LEDs to desaturate the base-color, by diminishing the intensity of the base-color and simultaneously increasingly the intensity of the white color until the desired desaturation is achieved. Continued decreasing of the base color intensity and increasing the white color intensity would result in completely replacing the base color when the base color is to be fully desaturated.

Preferred Color Compensation and Desaturation Processes That May be Employed Instead of Camera Adjustments The present color compensation and desaturation systems processes have applicability to the film and television industries in that they it may be used to control the recording and playback of scenes illuminated with artificial light instead of controlling or partially controlling the artificial light solely with the camera setting(s). In this aspect of the presently described systems and processes, two or more significantly different CCTs of phosphor-white LED sources such as LEDs that produce 3000K and 6000K white light, respectively, are blended with each other to provide adjustable, full spectrum white light. The ability to diminish the base-color combined with the controlled increase of the white light from the two or more white channels results in desaturated light that can be calibrated to suit a particular camera's sensors and white balance settings.

While the human eye has the ability to correct for different color situations and create white, cameras do not have that ability. The selection of cameras is wide and varies from professional grade systems to DSLR Prosumer systems.

For example, Arri Alexa brand cameras and technology presently are considered to be the industry standard in digital motion picture camera systems. However, in real world applications the resulting images produced by Arri Alexa brand cameras have a slight green cast. It is believed that the camera's red sensor has a relatively difficult time accurately capturing the red area of the light spectrum. As is known to those skilled in this field, a digital imaging technician (DIT) can compensate for this green cast by applying a −3 to −5 green correction on Arri Alexa camera's settings, in order for the camera to output a neutral white color.

Also, in the view of some in this field, Sony brand digital motion picture cameras have a slight magenta cast to their resulting images. As is also known in this field, a DIT may make adjustments for RED in the warm/cool settings in a Sony brand camera to correct this problem. This type of correction, that is, correction/calibration/adjustment to the camera settings is needed to correct the camera output so that the white or neutral output on a vectorscope would appear to the human eye like the color white would appear to the human eye under natural lighting conditions. The present color compensation systems and processes enable adjustments to the luminaire(s) so that no adjustment to the camera settings is needed to address these problems associated with known cameras.

Although specific embodiments of the disclosure have been described, various modifications, alterations, alternative constructions, and equivalents are also encompassed within the scope of invention as set forth in the claims.

The specification and drawings are, accordingly, to be regarded in an illustrative rather than a restrictive sense. It will, however, be evident that additions, subtractions, deletions, and other modifications and changes may be made thereunto without departing from the broader spirit and scope of invention as set forth in the claims.

APPENDIX 1

JDS LiteNet Protocol
R2.x James David Smith, Soundsculpture Incorporated

| Rev | By | Date | Description |
|---|---|---|---|
| 2.1 | JDS | | Initial proposal. |
| 2.2 | JDS | 20 Apr. 2017 | Combined compensation on/off, normal/test, etc., into single Mode command. |
| 2.3 | JDS | 22 Apr. 2017 | Changed byte order from H:L to L:H to accommodate unions/structures in c code. Added Modes Table. |
| 2.4 | JDS | 24 Apr. 2017 | Added notes that GET messages Added degrees F. sensor, so temperature can be queried for C. or F. Added notes on sensor reply data format (16-bit signed integer, 10ths of unit). Moved ALL_OFF, ALL_FULL, ALL_TOGGLE to Modes, along with NORMAL (w/compensation) and RAW (comp disabled). Added GET/SET/REPLY_SENSOR_MINMAX to clear MAX and MIN values (also cleared on power-up). |
| 2.5 | JDS | 27 Apr. 2017 | Added sensor read types for LIVE, MAX, and MIN. Added RESET_SENSOR_MINMAX to clear MAX and MIN values (also cleared on power-up). Highlighted messages are fully implemented and functional, prerelease f/w v0.010. |
| 2.6 | JDS | 8 May 2017 | When dimmer receives SET_OFFSET_6 message, values of zero are ignored, previous calibration value notl overwritten by zero. |

Format Overview

| Byte # | Ptr | 7 | 6 | 5 | 4 | 3 | 2 | 1 | 0 | |
|---|---|---|---|---|---|---|---|---|---|---|
| 1 | 0 | 0 | 1 | 0 | 1 | 0 | 1 | 0 | 1 | 0x55 start byte |
| 2 | 1 | S | A | A | A | A | A | A | A | Device Address (0 = global, 1-127) |
| 3 | 2 | ~S | V | V | V | V | V | V | V | Protocol Version (0-127) |
| 4 | 3 | S | T | T | M | M | M | M | M | Message: Source (0, 1), Message type (0-3), Message (0-32) |
| 5 | 4 | d | d | d | d | d | d | d | d | Data payload, packet length is variable and will be determined by V and M via lookup table. Data payload length is not limited to an 8-bit (or any other) length. Multi-byte data will send least-significant bytes first, i.e. dimmer channel value is sent as LLLLLLLL followed by HHHHHHHH. Get messages omit parameter bytes but include specifiers (i.e. Group Slot, Sensor ID) |
| 6 | 5 | d | d | d | d | d | d | d | d | |
| 7 | . | . | | | | | | | | |
| n | . | . | | | | | | | | |
| n + 1 | | CH | CH | CH | CH | CH | CH | CH | CH | 8-bit Checksum, method TBD |

Start byte value 0x55 supports Microchip (and others) auto-baud function, which reads a series of 0x55 bytes to determine baud rate. LiteNet devices will effectively ignore any length followed by a valid protocol version byte, or unless precisely 6 bytes Message Types 0-127 are Master → Slave, Types 128-255 are Slave → Master.
S (byte 4, bit 7)

0 MASTER (messages from UI to dimmers)
1 SLAVE (response messages from dimmers to UI)
For packet parsing and integrity checking, S is duplicated in byte 2, bit 7, and inverted S is in byte 3, bit 7.

APPENDIX 1-continued

JDS LiteNet Protocol
R2.x James David Smith, Soundsculpture Incorporated

TT (byte 4, bits 5-6) Message Type

0 SET_DIMMERS (SD)
1 GET_DIMMERS (GD)
2 SET_COMMAND (SC)
3 GET_COMMAND (GC)

TTMMMMM (by 4, bits 0-7)

| | S | T | T | M | M | M | M | M | |
|---|---|---|---|---|---|---|---|---|---|
| M → S | M = 0 | SD = 0 | | 0x0 | | | | | Reserved |
| | 0 | 0 | | 0x1 | | | | | Reserved |
| | 0 | 0 | | 0x2 | | | | | Reserved |
| | 0 | 0 | | 0x3 | | | | | Reserved |
| | 0 | 0 | | 0x4 | | | | | SET_6 Set 6-channel dimmer levels |
| | 0 | 0 | | 0x5 | | | | | SET_8 Set 8-channel dimmer levels |
| | 0 | 0 | | 0x6-0xF | | | | | Reserved for additional SET_DIMMER commands |
| | 0 | 0 | | 0x06 | | | | | SET_CH1 |
| | 0 | GD = 1 | | 0x0 | | | | | Reserved |
| | 0 | 1 | | 0x1 | | | | | Reserved |
| | 0 | 1 | | 0x2 | | | | | Reserved |
| | 0 | 1 | | 0x3 | | | | | Reserved |
| | 0 | 1 | | 0x4 | | | | | GET_6 Request: dimmer levels of 6-channel dimmer |
| | 0 | 1 | | 0x5 | | | | | GET_8 Request: dimmer levels of 8-channel dimmer |
| | 0 | 1 | | 0x6-0xF | | | | | Request: levels for additional SET_DIMMER commands |
| S → M | S = 1 | SD = 0 | | 0x0 | | | | | Response: Reserved |
| | 1 | 0 | | 0x1 | | | | | Response: Reserved |
| | 1 | 0 | | 0x2 | | | | | Response: Reserved |
| | 1 | 0 | | 0x3 | | | | | Response: Reserved |
| | 1 | 0 | | 0x4 | | | | | REPLY_6 Response: dimmer levels of 6-channel dimmer |
| | 1 | 0 | | 0x5 | | | | | REPLY_8 Response: current levels of 6-channel dimmer |
| | 1 | 0 | | 0x6-0xF | | | | | Response: levels for any additional SET_DIMMER commands |

| | S | T | T | M | M | M | M | M | |
|---|---|---|---|---|---|---|---|---|---|
| M → S | M = 0 | SD = 0 | | 0x10 | | | | | Reserved |
| | 0 | 0 | | 0x11 | | | | | Reserved |
| | 0 | 0 | | 0x12 | | | | | Reserved |
| | 0 | 0 | | 0x13 | | | | | Reserved |
| | 0 | 0 | | 0x14 | | | | | SET_OFFSET_6 Set 6-channel color correction offsets |
| | 0 | 0 | | 0x15 | | | | | SET_OFFSET_8 Set 8-channel color correction offsets |
| | 0 | 0 | | 0x16-0x1F | | | | | Reserved for additional SET_OFFSET commands |
| | 0 | GD = 1 | | 0x10 | | | | | Reserved |
| | 0 | 1 | | 0x11 | | | | | Reserved |
| | 0 | 1 | | 0x12 | | | | | Reserved |
| | 0 | 1 | | 0x13 | | | | | Reserved |
| | 0 | 1 | | 0x14 | | | | | GET_OFFSET_6 Set 6-channel color correction offsets |

APPENDIX 1-continued

JDS LiteNet Protocol
R2.x James David Smith, Soundsculpture Incorporated

|  |  |  |  |  |  |  |  |  |
|---|---|---|---|---|---|---|---|---|
|  |  | 0 | 1 |  | 0x15 |  |  | GET_OFFSET_8 Set 8-channel color correction offsets |
|  |  | 0 | 1 |  | 0x16-0x1F |  |  | Reserved for additional GET_OFFSET commands |
| S → M | S = 1 | SD = 0 |  | 0x10 |  |  |  | Response: Reserved |
|  | 1 | 0 |  | 0x11 |  |  |  | Response: Reserved |
|  | 1 | 0 |  | 0x12 |  |  |  | Response: Reserved |
|  | 1 | 0 |  | 0x13 |  |  |  | Response: Reserved |
|  | 1 | 0 |  | 0x14 |  |  |  | REPLY_OFFSET_6 Set 6-channel color correction offsets |
|  | 1 | 0 |  | 0x15 |  |  |  | REPLY_OFFSET_8 Set 6-channel color correction offsets |
|  | 1 | 0 |  | 0x16-0x1F |  |  |  | Reserved for additional REPLY_OFFSET commands |

|  |  | S | T | T | M | M | M | M | M |  |
|---|---|---|---|---|---|---|---|---|---|---|
| M → S | M = 0 | SC = 2 | 0x0 |  |  |  |  |  |  | SAVE_ALL Save all setting in NV memory (may not be required) |
|  | 0 | 2 | 0x1 |  |  |  |  |  |  | SET_FACTORY_DEFAULTS |
|  | 0 | 2 | 0x2 |  |  |  |  |  |  | SET_ADDR Set main device address (device ID) |
|  | 0 | 2 | 0x3 |  |  |  |  |  |  | SET_BAUD Set communications baud rate |
|  | 0 | 2 | 0x4 |  |  |  |  |  |  | Reserved |
|  | 0 | 2 | 0x5 |  |  |  |  |  |  | RESET_SENSOR_MIN-MAX |
|  | 0 | 2 | 0x6 |  |  |  |  |  |  | SET_GROUP_ADDR. Followed by 2 bytes: ID Slot (0-8), New ID value for ID Slot (0-255) |
|  | 0 | 2 | 0x7 |  |  |  |  |  |  | SET_MODE. Followed by single payload byte representing mode. See Modes table. |
|  | 0 | 2 | 0x8 |  |  |  |  |  |  | SET_SENSOR_CALIBRATION Set offsets to ensure sensor responses are accurate |
|  | 1 | 2 | 0x9-0xF |  |  |  |  |  |  | Reserved for additional SET commands |
|  | M = 0 | GC = 3 | 0x0 |  |  |  |  |  |  | Reserved |
|  | 0 | 3 | 0x1 |  |  |  |  |  |  | Reserved |
|  | 0 | 3 | 0x2 |  |  |  |  |  |  | GET_ADDR message is header with no payload; device address is in header byte 2. |
|  | 0 | 3 | 0x3 |  |  |  |  |  |  | GET_BAUD request communications baud rate |
|  | 0 | 3 | 0x4 |  |  |  |  |  |  | GET_STATUS |
|  | 0 | 3 | 0x5 |  |  |  |  |  |  | GET_SENSOR (packet details below) |
|  | 0 | 3 | 0x6 |  |  |  |  |  |  | GET_GROUP_ADDR |
|  | 0 | 3 | 0x7 |  |  |  |  |  |  | GET_MODE request mode. See Modes table. |
|  |  | 3 | 0x8 |  |  |  |  |  |  | GET_SENSOR_CALIBRATION request offsets being used for sensor calibration. |
|  | 1 | 0 | 0x9-0xF |  |  |  |  |  |  | Reserved for additional GET commands |

APPENDIX 1-continued

JDS LiteNet Protocol
R2.x James David Smith, Soundsculpture Incorporated

| S → M | S = 1 | SC = 2 | 0x0 | Reserved |
|---|---|---|---|---|
| | 1 | 2 | 0x1 | Reserved |
| | 1 | 2 | 0x2 | REPLY_ADDR response is header with no payload; device address is in header byte 2. |
| | 1 | 2 | 0x3 | REPLY_BAUD response with communications baud rate |
| | 1 | 2 | 0x4 | REPLY_STATUS |
| | 1 | 2 | 0x5 | REPLY_SENSOR |
| | 1 | 2 | 0x6 | REPLY_GROUP_ADDR |
| | 1 | 2 | 0x7 | REPLY_MODE response with mode. See Modes table. |
| | | | 0x8 | REPLY_SENSOR_CALIBRATION response with sensor offsets. |
| | 1 | 0 | 0x9-0xF | Reserved for additional REPLY commands |

Payload for SET/REPLY_6 and SET/REPLY_OFFSET_6:
Word data in payload will be sent low-byte first.
GET_6 and GET_OFFSET_6 omit this payload, shortening the packet by 16 bytes.

| Byte # | 7 | 6 | 5 | 4 | 3 | 2 | 1 | 0 | |
|---|---|---|---|---|---|---|---|---|---|
| 5 | L | L | L | L | L | L | L | L | Daylight Dimmer, LOW Byte |
| 6 | H | H | H | H | H | H | H | H | Daylight Dimmer, HIGH Byte |
| 7 | L | L | L | L | L | L | L | L | Tungsten Dimmer, LOW Byte |
| 8 | H | H | H | H | H | H | H | H | Tungsten Dimmer, HIGH Byte |
| 9 | L | L | L | L | L | L | L | L | Red Dimmer, LOW Byte |
| 10 | H | H | H | H | H | H | H | H | Red Dimmer, HIGH Byte |
| 11 | L | L | L | L | L | L | L | L | Green Dimmer, LOW Byte |
| 12 | H | H | H | H | H | H | H | H | Green Dimmer, HIGH Byte |
| 13 | L | L | L | L | L | L | L | L | Blue Dimmer, LOW Byte |
| 14 | H | H | H | H | H | H | H | H | Blue Dimmer, HIGH Byte |
| 15 | L | L | L | L | L | L | L | L | Amber Dimmer, LOW Byte |
| 16 | H | H | 4 | H | H | H | H | H | Amber Dimmer, HIGH Byte |

SET_ADDR Message:
GET/REPLY_ADDR omits this payload, making the message just the header and checksum. The address is in header byte 2

| Byte# | 7 | 6 | 5 | 4 | 3 | 2 | 1 | 0 | |
|---|---|---|---|---|---|---|---|---|---|
| 5 | 0 | | | DEV_ID | | | | | 7-bit primary device address, not changeable by user (0-127). |

SET/REPLY_GROUP_ADDR Message:
GET_GROUP_ADDR omits the second payload byte (byte 6), shortening the packet by 1 byte.

APPENDIX 1-continued

JDS LiteNet Protocol
R2.x James David Smith, Soundsculpture Incorporated

| Byte# | 7 | 6 | 5 | 4 | 3 | 2 | 1 | 0 | |
|---|---|---|---|---|---|---|---|---|---|
| 5 | 0 | 0 | 0 | 0 | 0 | GROUP_ID_SLOT | | | Group ID Slot Number (0-7) |
| 5 | 0 | | | DEV_ID | | | | | 7-bit device ID saved in Slot Number (0-127, 0 = Slot Not Used) |

To accommodate unknown addition sensors in future versions, the data payload for SENSOR messages will start with a SENSOR ID: SET/REPLY_SENSOR Message:
GET_SENSOR omits the last 2 payload bytes (byte 6, 7), shortening the packet by 2 bytes.

| Byte# | 7 | 6 | 5 | 4 | 3 | 2 | 1 | 0 | |
|---|---|---|---|---|---|---|---|---|---|
| 5 | | | | SENSOR_ID | | | | | Sensor ID |
| 6 | L | L | L | L | L | L | L | L | Sensor Value, HIGH Byte |
| 7 | H | H | H | H | H | H | H | H | Sensor Value, LOW Byte |

Sensor IDs:
These assignment can be treated as:

| Byte# | 7 | 6 | 5 | 4 | 3 | 2 | 1 | 0 | | | |
|---|---|---|---|---|---|---|---|---|---|---|---|
| 5 | READ TYPE | | SENSOR_ID | | | | | | Sensor ID (0-64). READ TYPE: 00 = LIVE, 01 = MAX, 10 = MIN. | | |
| 0 | 48 V | | Input voltage (nominal 48 V) | | | | | | Live Sensor Values (READ TYPE 0) | | |
| 1 | 24V | | Regulated voltage (nominal 24 V) | | | | | | | | |
| 2 | A | | Current sensor (A) | | | | | | | | |
| 3 | deg C. | | Temperature sensor (degrees C.) | | | | | | | | |
| 4 | deg F. | | Temperature sensor (degrees F.) | | | | | | | | |
| 5-63 | | | Reserved for future sensor types | | | | | | | | |
| 64 | 48 V | | Input voltage (nominal 48 V) | | | | | | MAX - highest recorded since powerup or RESET_SENSOR_MINMAX (READ TYPE 1) | | |
| 65 | 24 V | | Regulated voltage (nominal 24 V) | | | | | | | | |
| 66 | A | | Current sensor (A) | | | | | | | | |
| 67 | deg C. | | Temperature sensor (degrees C.) | | | | | | | | |
| 68 | deg F. | | Temperature sensor (degrees F.) | | | | | | | | |
| 69-127 | | | Reserved for future sensor types | | | | | | | | |
| 128 | 48 V | | Input voltage (nominal 48 V) | | | | | | MIN - lowest recorded since powerup or RESET_SENSOR_MINMAX (READ TYPE 2) | | |
| 129 | 24 V | | Regulated voltage (nominal 24 V) | | | | | | | | |
| 130 | A | | Current sensor (A) | | | | | | | | |
| 131 | deg C. | | Temperature sensor (degrees C.) | | | | | | | | |
| 132 | deg F. | | Temperature sensor (degrees F.) | | | | | | | | |
| 133-192 | | | Reserved for future sensor types | | | | | | | | |
| 193-255 | Reserved for future READ TYPE (AVERAGE?) | | | | | | | | | | |

Sensor data value is a 16-bit integer in 10ths of a unit. Examples:
Response to Sensor 1 (regulated V): 239 = 23.9 VDC
Response to Sensor 2 (current): 15 = 1.5 A
Response to Sensor 5 (degrees F.): 1026 = 1.016 F.

REPLY_STATUS Message returns a 2-byte payload providing up to 16 status flags:
GET_STATUS carries no payload and is 2 bytes shorter than REPLY_STATUS.

APPENDIX 1-continued

JDS LiteNet Protocol
R2.x James David Smith, Soundsculpture Incorporated

Byte0

| | | |
|---|---|---|
| Bit0 | LEDS commanded to be | 1 = ON, 0 = OFF |
| Bit1 | Input Voltage Normal (48 V +/− 2.0 V) | 1 = OUT, 0 = OK |
| Bit2 | Regulated Voltage Normal (24 V +/− 0.2 V) | 1 = OUT, 0 = OK |
| Bit3 | Current safe (less than 3 A, 72 W) | 1 = OUT, 0 = OK |
| Bit4 | Temp safe (less than 85 C./185 F.) | 1 = OUT, 0 = OK |
| Bit5 | Color Compensation (OFFSET) | 1 = ON, 0 = OFF |
| Bit6 | Reserved | 0 |
| Bit8 | Reserved | 0 |

RETURN Status - two byte response - cont.

0x20

Byte0

| | | |
|---|---|---|
| Bit0 | Number of Channels (bits 0-3) | b0 Min 1, Max 16 |
| Bit1 | " | b1 |
| Bit2 | " | b2 |
| Bit3 | " | b3 |
| Bit4 | Reserved | 0 |
| Bit5 | Reserved | 0 |
| Bit6 | Reserved | 0 |
| Bit7 | Reserved | 0 |

Modes Table:

0 NORMAL operation with dimmer level compensation (OFFSET) active.
1 RAW DIMMER mode with compensation disabled.
2 ALL_OFF sets all dimmers at zero, overrides dimmer levels.
3 ALL_FULL sets all dimmers at full, overrides dimmer levels.
4 ALL_TOGGLE toggles between ALL_OFF and ALL_FULL.
  If switching from NORMAL or RAW, first toggle slate is ALL_OFF.
5 Reserved (for additional modes, i.e. HSL)
6 Reserved
7 Reserved
8 TEST MODE 1
9 Reserved (future addition of other test modes)
10 Reserved
11 Reserved
12 Reserved
13 Reserved
14 Reserved
15

APPENDIX 2

Calibrating to Sensor (Intensity) (1/3)

CAMERA 1

$S_1$ = Ratio of Sensors = $(R_{S1}, G_{S1}, B_{S1})$ $R_{S1} = 3$ $G_{S1} = 1$ $B_{S1} = 1.5$ $W_1$ = Weight of Sensors = $(1/R_{S1}, 1/G_{S1}, 1/B_{S1}) = (R_{W1}, G_{W1}, B_{W1})$ $R_{W1} = 1/R_{S1} = 1/3$ $G_{W1} = 1/G_{S1} = 1/1 = 1$ $B_{W1} = 1/B_{S1} = 1/1.5 = 2/3$

CAMERA 2

$S_2$ = Ratio of Sensors = $(R_{S2}, G_{S2}, B_{S2})$ $R_{S2} = 1$ $G_{S2} = 1$ $B_{S2} = 2$ $W$ = Weight of Sensors = $(1/R_{S2}, 1/G_{S2}, 1/B_{S2}) = (R_{W2}, G_{W2}, B_{W2})$ $R_{W2} = 1/R_{S2} = 1/1 = 1$ $G_{W2} = 1/G_{S2} = 1/1 = 1$ $B_{W2} = 1/B_{S2} = 1/2 = 1/2$

APPENDIX 2-continued

Calibrating to Sensor (Intensity) (1/3)

LUMINAIRE $P$ = Power of Colors = $(R, G, B)$ $R = 1$ W $G = 1$ W $B = 1$ W $P1^*$ = Weighted Power of Colors, Camera 1 = $P1 = (RR_{W1}, GG_{W1}, BB_{W1})$ $R1^* = 1/3$ W $G1^* = 1$ W $B1^* = 2/3$ W $P2^*$ = Weighted Power of Colors, Camera 2 = $P2 = (RR_{W2}, GG_{W2}, BB_{W2})$ $R2^* = 1$ W $G2^* = 1$ W $B2^* = 1/2$ W ∴ Each color should be attenuated as prescribed by $P^*$, the "weighted power," based on the ratio of the sensors.

APPENDIX 3

Calibrating to Sensor (Hue) (2/3)

CAMERA 1

Wavelengths of Color (Sensor)
RC1 = 650 nm
GC1 = 510 nm
BC1 = 475 nm

CAMERA 2

Wavelengths of Color (Sensor)
RC2 = 620 nm
GC2 = 520 nm
BC2 = 470 nm

LUMINAIRE

Wavelengths of Color (Luminaire)
RL = 625 nm (1 W)
GL = 525 run (1 W)
BL = 465 nm (1 W)

Hue, Adjusted, Camera 1 (Luminaire)
(x = % of second color to add to create new color)

$R_{C1} = R_L + (B_L x) = 625 + (465x) = 650 \rightarrow x = 0.053763 \rightarrow R_L + 0.538 B_L = 100\% \ R_L + 5.38\% \ B_L$ $G_{C1} = G_L - (B_L x) = 525 - (465x) = 510 \rightarrow x = 0.032258 \rightarrow G_L + 0.0323 B_L = 100\% \ G_L + 3.23\% \ B_L$ $B_{C1} = B_L + (G_L x) = 465 + (525x) = 475 \rightarrow x = 0.019048 \rightarrow B_L + 0.0190 G_L = 100\% \ B_L + 1.90\% \ G_L$ Hue, Adjusted, Camera 2 (Luminaire)
(x = % of second color to add to create new color)

$R_{C2} = R_L - (G_L x) = 625 - (525x) = 620 \rightarrow x = 0.0095238 \rightarrow R_L + 0.0095 G_L = 100\% \ R_L + 0.95\% \ G_L$ $G_{C2} = G_L - (B_L x) = 525 - (465x) = 520 \rightarrow x = 0.010753 \rightarrow G_L + 0.018 B_L = 100\% \ G_L + 1.08\% \ B_L$ $B_{C2} = B_L + (G_L x) = 465 + (525x) = 470 \rightarrow x = 0.0095238 \rightarrow B_L + 0.0095 G_L = 100\% \ B_L + 0.95\% \ G_L$

APPENDIX 4

ALL CAMERA CALIBRATION (3/3)

CAMERA 1

$S_1$ - Ratio of Sensors - $(R_{S1}, G_{S1}, B_{S1})$
$R_{S1} = 3$
$G_{S1} = 1$
$B_{S1} = 1.5$
$W_1$ = Weight of Sensors = $(1/R_{S1}, 1/G_{S1}, 1/B_{S1}) = (R_{W1}, G_{W1}, B_{W1})$
$R_{W1} = 1/R_{S1} = 1/3$
$G_{W1} = 1/G_{S1} = 1/1 = 1$
$B_{W1} = 1/B_{S1} = 1/1.5 = 2/3$
Wavelengths of Color (Sensor)
$R_{C1} = 650$ nm
$G_{C1} = 510$ nm
$B_{C1} = 475$ nm

CAMERA 2

$S_2$ = Ratio of Sensors = $(R_{S2}, G_{S2}, B_{S2})$
$R_{S2} = 1$
$G_{S2} = 1$
$B_{S2} = 2$
W = Weight of Sensors = $(1/R_{S2}, 1/G_{S2}, 1/B_{S2}) = (R_{W2}, G_{W2}, B_{W2})$
$R_{W2} = 1/R_{S2} = 1/1 = 1$
$G_{W2} = 1/G_{S2} = 1/1 = 1$
$B_{W2} = 1/B_{S2} = 1/2 = 1/2$
Wavelengths of Color (Sensor)
$R_{C2} = 620$ nm
$G_{C2} = 520$ nm
$B_{C2} = 470$ nm

APPENDIX 4-continued

ALL CAMERA CALIBRATION (3/3)

LUMINAIRE

P = Power of Colors = (R, G, B)
R = 1 W
G = 1 W
B = 1 W
Wavelengths of Color (Luminaire)
$R_L = 625$ nm (1 W)
$G_L = 525$ nm (1 W)
$B_L = 465$ nm(1 W)
$P_1^*$ = Weighted Power of Colors, Camera 1 = $P_1 = (RR_{W1}, GG_{W1}, BB_{W1})$
$R_1^* = 1/3$ W
$G_1^* = 1$ W
$B_1^* = 2/3$ W
$P_2^*$ = Weighted Power of Colors, Camera 2 = $P_2 = (RR_{W2}, GG_{W2}, BB_{W2})$
$R_2^* = 1$ W
$G_2^* = 1$ W
$B_2^* = 1/2$ W
Hue, Adjusted, Camera 1 (Luminaire)
$R_{C1} = 100\% \ R_L + 5.38\% \ B_L$
$G_{C1} = 100\% \ G_L + 3.23\% \ B_L$
$B_{C1} = 100\% \ B_L + 1.90\% \ G_L$
Hue, Adjusted, Camera 2 (Luminaire)
$R_{C2} = 100\% \ R_L + 0.95\% \ G_L$
$G_{C2} = 100\% \ G_L + 1.08\% \ B_L$
$B_{C2} = 100\% \ B_L + 0.95\% \ G_L$
Intensity, Adjusted, Camera 1 (Luminaire)
(x = % of second color to add to create new color)
(y = attenuation factor to maintain constant power output)
$R_{C1} = R_L + (B_L x) = 625 + (465x) = 650 \rightarrow x = 0.053763$
$\gamma \rightarrow 1\gamma + x\gamma = 1 \rightarrow \gamma(1 + x) = 1 \rightarrow \gamma = 1/(1 + x) \rightarrow y = 0.949$
$R_{C1} = 0.949$ W $[R_L] + 0.051$ W $[B_L]$ (1 W total)
$R_{C1}^* = (R_{C1})(R_1^*) = (0.949$ W $[R_L] + 0.051$ W $[B_L])(1/3) = (0.3163$ W $[R_L] + 0.017$ W $[B_L])$
Intensity, Adjusted, Camera 2 (Luminaire)
(x = % of second color to add to create new color)
(y = attenuation factor to maintain constant power output)
$R_{C2} = R_L - (G_L x) = 625 - (525x) = 620 \rightarrow x = 0.0095238$
$\gamma \rightarrow 1\gamma + x\gamma = 1 \rightarrow y(1 + x) = 1 \rightarrow \gamma = 1/(1 + x) \rightarrow \gamma = 0.991$
$R_{C2} = 0.991$ W $[R_L] + 0.009$ W $[G_L]$(1 W total)
$R_{C2}^* = (R_{C2})(R_2^*) = (0.991$ W $[R_L] + 0.009$ W $[G_L])(1) = (0.991$ W $[R_L] + 0.009$ W $[G_L])$

The invention claimed is:

1. A method for color mixing of light produced by constituent LED light sources, the constituent LED light sources including red emitting LEDs, green emitting LEDs, blue emitting LEDs, amber emitting LEDs, warm white emitting LEDs and cool white emitting LEDs positioned on an LED lighting panel emitting a first color of light at a first intensity to produce for digital camera light sensors a resulting color of light at the first intensity comprising:

providing a current to a first selected one of the constituent LED light sources to produce a first color of light at the first intensity;

providing a current to a second selected one of the constituent LED light sources to produce a second, different color of light at a second intensity;

the second intensity lower than the first intensity; and, increasing the current to the second selected one of the constituent LED light sources and simultaneously decreasing the current to the first selected one of the constituent LED light sources until the resulting color of light is produced at said first intensity.

2. The method of claim 1 wherein said resulting color of light is a Kelvin degree white, said first selected one of the constituent LED light sources produces relatively low Kelvin degree white color of light and said second selected one of the constituent LED light sources produces relatively high Kelvin degree white color of light.

3. The method of claim 1 further:
provides a current to a third selected one of the constituent LED light sources to produce a relatively low Kelvin temperature white color of light and having a first Kelvin white light intensity;
providing a current to a fourth selected one of the constituent LED light sources to produce a relatively high Kelvin temperature white color of light and having a second Kelvin white light intensity;
increasing the current to the fourth selected one of the constituent LED light sources and simultaneously decreasing the current to the third selected one of the constituent LED light sources to create a resulting Kelvin temperature white color of light produced at said first Kelvin white light intensity; and,
mixing said resulting Kelvin temperature white color of light with said resulting color of light.

4. A process for mixing of light produced by artificial light sources and sensed by digital camera light sensors so that a resulting image mimics natural light when viewed by a human on media including television, motion pictures and computer monitors comprising:
providing an LED light source having constituent LED light sources;
the constituent LED light sources including red light emitting LEDs, green light emitting LEDs and blue light emitting LEDs;
producing a first color of light at a first intensity from a first selected one of the constituent LED light sources;
producing a second, different color of light at a second intensity from a second selected one of the constituent LED light sources;
the second intensity lower than the first intensity; and,
mixing the first color of light with the second color of light to produce a resulting color of light by increasing the second intensity and decreasing the first intensity until the resulting color of light is produced at the first intensity.

5. The process for mixing light of claim 4 wherein the constituent LED light sources further include amber light emitting LEDs.

6. The process for mixing light of claim 4 wherein the constituent LED light sources further include warm white light emitting LEDs and cool white light emitting LEDs.

7. The process for mixing light of claim 4 wherein:
increasing the second intensity includes increasing a current to the second selected one of the constituent light sources; and,
decreasing the first intensity includes decreasing a current to the first selected one of the constituent light sources.

8. A process for mixing of light produced by artificial light sources and sensed by digital camera light sensors so that a resulting image mimics natural light when viewed by a human on media including television, motion pictures and computer monitors comprising:
providing a plurality of constituent LED light sources;
the plurality of constituent LED light sources including red light emitting LEDs, green light emitting LEDs and blue light emitting LEDs;
producing a first color of light at a first intensity from a first selected one of the constituent LED light sources;
producing a second, different color of light at a second intensity from a second selected one of the constituent LED light sources;
the second intensity lower than the first intensity; and
mixing the first color of light with the second, different color of light to produce a resulting color of light by increasing the second intensity and decreasing the first intensity until the resulting color of light is produced at the first intensity.

9. The process of claim 8 wherein the plurality of constituent LED light sources further includes amber light emitting LEDs.

10. The process of claim 8 wherein the plurality of constituent LED light sources further include white light emitting LEDs.

11. The process of claim 8 wherein increasing the second intensity and decreasing the first intensity is performed by pulse width modulation control.

12. The process of claim 8 wherein increasing the second intensity and decreasing the first intensity is performed by duty cycle control of the plurality of constituent LED light sources.

* * * * *